United States Patent
Törmänen

(10) Patent No.: US 12,325,957 B2
(45) Date of Patent: Jun. 10, 2025

(54) APPARATUS FOR AND METHOD OF MEASURING SUSPENSION FLOWING IN TUBE FRACTIONATOR

(71) Applicant: VALMET AUTOMATION OY, Espoo (FI)

(72) Inventor: Matti Törmänen, Espoo (FI)

(73) Assignee: VALMET AUTOMATION OY, Espoo (FI)

( * ) Notice: Subject to any disclaimer, the term of this patent is extended or adjusted under 35 U.S.C. 154(b) by 1011 days.

(21) Appl. No.: 17/148,822

(22) Filed: Jan. 14, 2021

(65) Prior Publication Data

US 2021/0214893 A1    Jul. 15, 2021

Related U.S. Application Data

(60) Provisional application No. 62/960,857, filed on Jan. 14, 2020.

(51) Int. Cl.
*D21G 9/00* (2006.01)
*G01N 15/0205* (2024.01)
*G01N 15/14* (2006.01)

(52) U.S. Cl.
CPC ......... *D21G 9/0054* (2013.01); *D21G 9/0018* (2013.01); *D21G 9/0027* (2013.01); *G01N 15/0205* (2013.01); *G01N 2015/1486* (2013.01)

(58) Field of Classification Search
CPC . G01N 22/343; G01N 21/534; G01N 15/0205
See application file for complete search history.

(56) References Cited

U.S. PATENT DOCUMENTS 4,171,916 A * 10/1979 Simms ................ G01N 33/343
162/263
4,514,257 A * 4/1985 Karlsson ............. G01N 21/534
162/254

(Continued)

FOREIGN PATENT DOCUMENTS

FI          126614 B     3/2017
JP       S57-168142 A   10/1982

(Continued)

OTHER PUBLICATIONS

Feb. 14, 2023 Search Report issued in Finnish Patent Application No. 20225693.

(Continued)

*Primary Examiner* — Lam S Nguyen
(74) *Attorney, Agent, or Firm* — Oliff PLC

(57) ABSTRACT

An apparatus for measuring flowing suspension includes a radiation source that directs wave motion to the suspension, a flow causing particles of the suspension to be sorted by size. A measuring arrangement measures first values of a first parameter of the wave motion interacted with the suspension at a first wavelength band of the wave motion, and measures second values of at least one of the following: a second parameter of the wave motion interacted with the suspension, and the first parameter of the wave motion interacted with the suspension at a second wavelength band of the motion, the measurement of the first and second values being synchronized. The arrangement forms at least one comparison being configured to relate to one of the first and one of the second values, and forms a distribution with at least one of first values as a function of one of the comparisons.

18 Claims, 29 Drawing Sheets

(56) References Cited

U.S. PATENT DOCUMENTS

| | | | |
|---|---|---|---|
| 6,774,994 B1 | | 8/2004 | Wyatt et al. |
| 7,788,969 B2 | * | 9/2010 | Verdegan .......... G01N 15/0205 |
| | | | 73/61.69 |
| 2008/0121026 A1 | | 5/2008 | Verdegan |

FOREIGN PATENT DOCUMENTS

| | | |
|---|---|---|
| JP | 2003-520960 A | 7/2003 |
| JP | 2012-522910 A | 9/2012 |
| WO | 01/53810 A1 | 7/2001 |
| WO | 2007/003700 A1 | 1/2007 |
| WO | 2007/122289 A1 | 11/2007 |
| WO | 2010/116030 A1 | 10/2010 |
| WO | 2013/175077 A1 | 11/2013 |
| WO | 2015/075319 A1 | 5/2015 |
| WO | 2018/065674 A1 | 4/2018 |
| WO | 2019/002699 A1 | 1/2019 |
| WO | 2020/005289 A1 | 1/2020 |

OTHER PUBLICATIONS

Karinkanta, Pasi et al. "Use of tube flow fractionation in wood powder characterisation"; Biomass and Bioenergy; vol. 99; 2017; pp. 122-138.

Apr. 19, 2021 International Search Report issued in International Patent Application No. PCT/FI2021/050017.

May 15, 2024 Office Action issued in Finnish Patent Application No. 20225693.

Aug. 6, 2024 Office Action issued in Japanese Patent Application No. 2022-542895.

* cited by examiner

APPARATUS FOR AND METHOD OF MEASURING SUSPENSION FLOWING IN TUBE FRACTIONATOR

FIELD

The invention relates to an apparatus for and a method of measuring suspension flowing in a tube fractionator.

BACKGROUND

Tube flow fractionation is based on a flow rate gradient caused by flow resistance of the tube wall in the cross-sectional direction of the tube. The flow rate is higher in the middle of the tube compared with the edge area of the tube, close to the wall. Due to turbulence, some particles will move along into the vicinity of the tube whereas others will stay in the middle of the tube in the quicker flow. Larger particles have a stronger probability to be swept away in the quicker flow in the middle of the tube. Particles travelling in the middle of the flow will pass particles travelling more slowly in the edge areas and, thus, will be the first to arrive at the end of the tube. Tube flow fractionation hence enables particles to be sorted into various size classes. Sample fractions can be guided to separate containers based on the flow at different moments of time or measured as a function of time.

A fractionator may be based on this tube flow fractionation principle. Such a fractionation may utilize an optical measurement module and optical measurement to measure flow fractions. Based on the currently used calculation method, the signals of the optical measurement module are calibratable into Bauer-McNett distributions.

There are a few patents on tube flow fractionation. For example, patent documents FI20095381 and WO2010116030A1 describe the analysis of a sample taken before the headbox based on two moments of time. Based on these signal values at two different moments of time, particle size can be modelled. The prior art fractionator measurements are sensitive to temperature and flow speed variation, which increase inaccuracy in the measurement results.

Hence, there is a need to improve the measurements.

BRIEF DESCRIPTION

The present invention seeks to provide an improvement in the measurements.

The invention is defined by the independent claims. Embodiments are defined in the dependent claims.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" example or embodiment in several locations, this does not necessarily mean that each such reference is to the same example or embodiment(s), or that the feature only applies to a single example or embodiment. Single features of different examples or embodiments may also be combined to provide other embodiments. Furthermore, words "comprising" and "including" should be understood as not limiting the described examples or embodiments to consist of only those features that have been mentioned and such examples or embodiments may also contain features/structures that have not been specifically mentioned. All combinations of the examples or embodiments are considered possible if their combination does not lead to structural or logical contradiction.

It should be noted that while Figures illustrate various examples or embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

This document describes a new calculation apparatus and method that enables wave motion measurements to be more extensively utilized and the technical solutions of the fractionator to be simplified.

Figure 1:
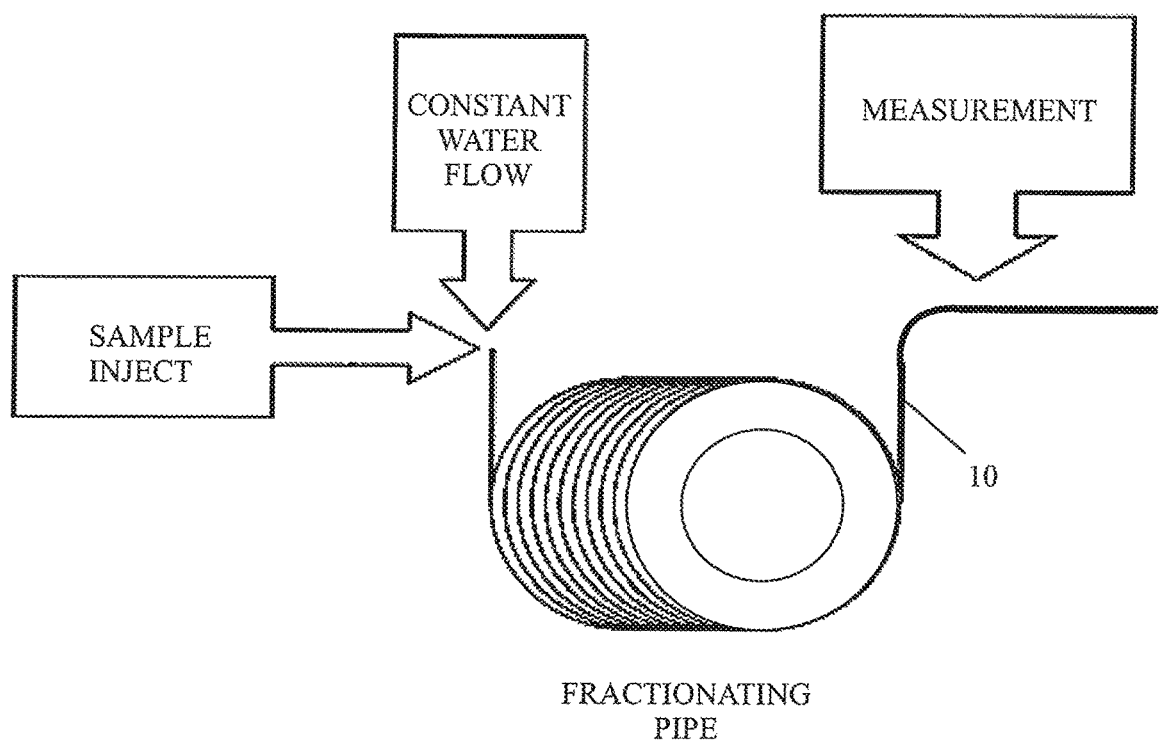
FIG. 1 illustrates an example of principle of fractionation.

Examine now currently used fraction calculation. Fractionating measurement involves three steps: sample dosing, sample separation and sample measurement. The principle of fractionation is shown in FIG. 1. In dosing, the sample is dosed into a fractionating tube 10; in separation, the sample is pushed in a fluid flow through the fractionating tube 10, whereby the sample is divided into different fractions. In the measurement step, the sample divided during separation is measured as a function of time and/or flow rate. However, other kind of fractionation may also be used.

Figure 2:
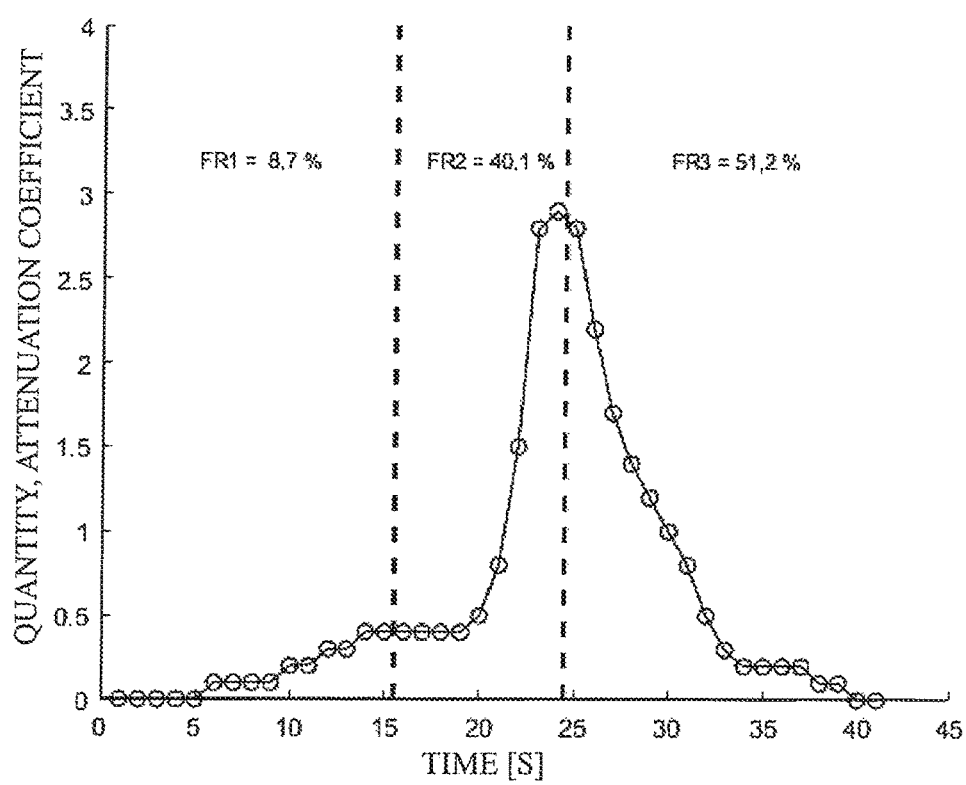
FIG. 2 illustrates an example of illustrates an example of quantity signal as function of time.

Currently used fraction calculation is based on analyzing the changes in a measurement signal related to the particle quantity at different moments of time of the flow. The measurement signal can be based on e.g. attenuation, scattering or depolarization of electromagnetic radiation. For fraction analysis, time limits or equivalent flow rate values are set, and different fractions are defined into their own calculatory classes based on them. FIG. 2 shows an example of this. In FIG. 2, the sample has been defined into three different classes FR1, FR2 and FR3 as a function of time. Of these, FR1 describes the quantity of large fibrous particles, FR2 describes the quantity of medium-sized particles and FR3 describes the quantity of small particles. These definitions apply thorough this document. If the fractionation depends on some other variable than time or flow rate, the variable may be processed in a similar manner as the time or the flow rate are processed in measurement method described in this document. The other variable of the fractionation may be a location, for example.

FIG. 2 illustrates an example of quantity signal as a function of time which depends on or has a know relation to the flow in the fractionating tube 10. On the vertical axis is quantity, attenuation coefficient and on the horizontal axis is moments at which a sample is measured based on the flow rate.

The quantities are calculated as a total sum of the signal values or integral of the signal values in their own limited flow areas. The quantity signal may be an attenuation signal, a depolarization signal or a scattering signal. The signal may also be a combination signal of the above or any other signal proportional to quantity. In the example of the figure, the measurement describing quantity on the y axis is an attenuation signal measured on the visible wavelength. Attenuation calculation will be described in more detail after FIG. 8 where currently used technologies are explained.

Such fraction calculation based on flow rate requires controlled and stable flow during separation and measurement. However, particularly during long-term separation, the control of the flow is challenging. In addition to the flow rate, fractionation occurring during the flow is further affected by e.g. the temperature and viscosity of the fractionation fluid as well as the properties of the tube wall. Changes in these variables are seen as an error in fractionation calculation.

Figure 3:
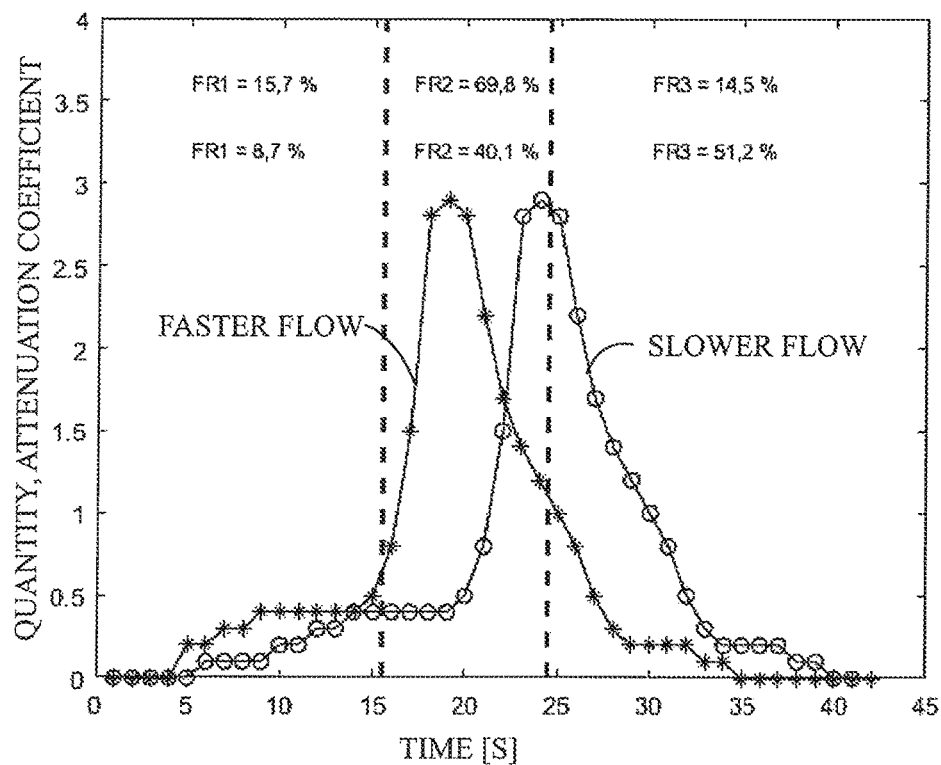
FIG. 3 illustrates an example of an effect of change in flow rate on fraction calculation.

An example of this is shown in FIG. 3 where the flow rate has increased and, as a result, the fractogram arrived about 5 flow units ahead of the previous case. The flow on the horizontal axis refers to moments at which a sample is measured. Hence, FIG. 3 illustrates an example of effect of change in flow rate on fraction calculation. This creates a significant error in calculated fraction contents. In this example, the fraction contents were described as fraction-specific percentages of the total quantity.

Flow conditions affect the Reynolds number according to equation (1). The optimal Reynolds number for tube flow fractionation is 1,000-10,000.

$$Re = \frac{\rho V D}{\mu} \quad (1)$$

where
ρ=medium density
V=flow rate
D=diameter of fractionating tube
μ=medium viscosity Temperature affects the Reynolds number via medium density and medium viscosity. With water above +4° C., both of these properties may decrease as the temperature rises, but the viscosity typically decrease relatively more than density. For this reason, an increase in temperature increases the Reynolds number of water flow. An increase in water temperature from 10° C. to 40° C. doubles the Reynolds number. More generally, that a change in temperature causes a change of the Reynolds number of water flow may result in a failure of or inaccuracy in a measurement of fractions.

In addition to water temperature, also increasing the flow rate or the tube diameter increases the Reynolds number. Thus, if wishing to shorten the fractionation time with a quicker flow while keeping the Reynolds number constant, it is possible to compensate the increase in flow rate by decreasing the diameter of the fractionating tube 10 or by using colder water. A change in temperature can be observed to more strongly affect the separation of fiber fractions than fines fractions.

Figure 4:
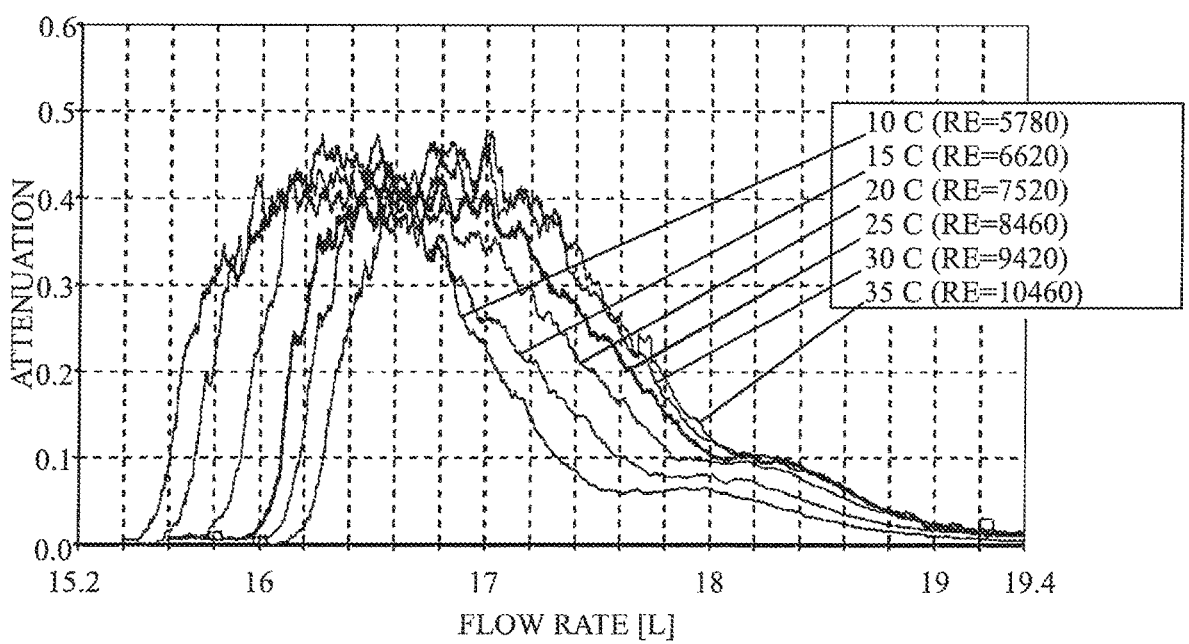
FIG. 4 illustrates an example of an effect of temperature of fractionation water on attenuation signal in coniferous pulp.

FIG. 4 illustrates an example of an effect of temperature of fractionation water on attenuation signal in coniferous pulp. The vertical axis is attenuation, and the horizontal axis is flow rate in liters. The curve that decays the first also rises the first. In that manner, they are in a successive order. The effect of fractionation water on the attenuation signal in a coniferous pulp sample can clearly be seen.

The effect of fractionation water temperature was determined in a test in which the water temperature was changed between 15° C. and 40° C. The test pulps used were eucalyptus pulp and pine pulp. The change in the fractogram of eucalyptus pulp as a result of changing temperature is shown in an example of FIG. 5. The peak of the fractogram changed by about 4 seconds with this temperature change of 25° C. If the fraction limit is set to 34 seconds in the distribution in the figure, fraction 1 represents 91% of the total quantity with 9% remaining in fraction 2. This change is also visible in the fraction content graph in an example of FIG. 6. The content changes as the temperature changes such that fraction 1 decreases by 22 percentage points to 69%. The content of fraction 2 increases by a corresponding proportion.

Figure 5:
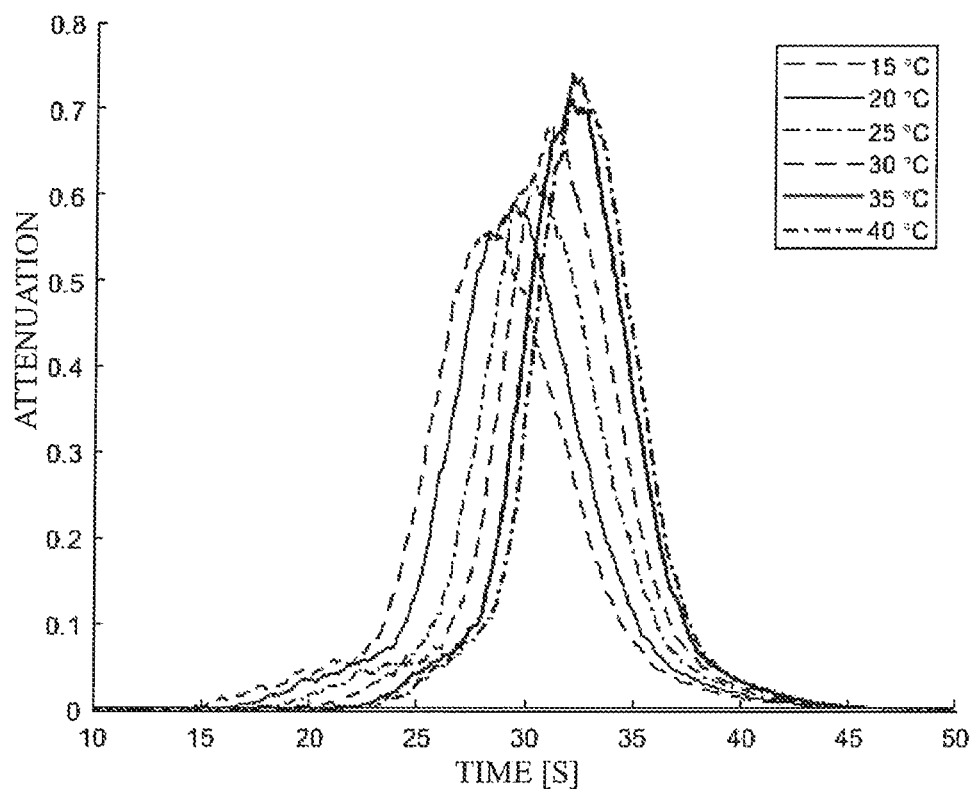
FIG. 5 illustrates an example of an effect of fractionation water temperature in eucalyptus pulp.

FIG. 5 illustrates an example of an effect of fractionation water temperature in eucalyptus pulp. The vertical axis is attenuation, and the horizontal axis is flow time in seconds.

Figure 6:
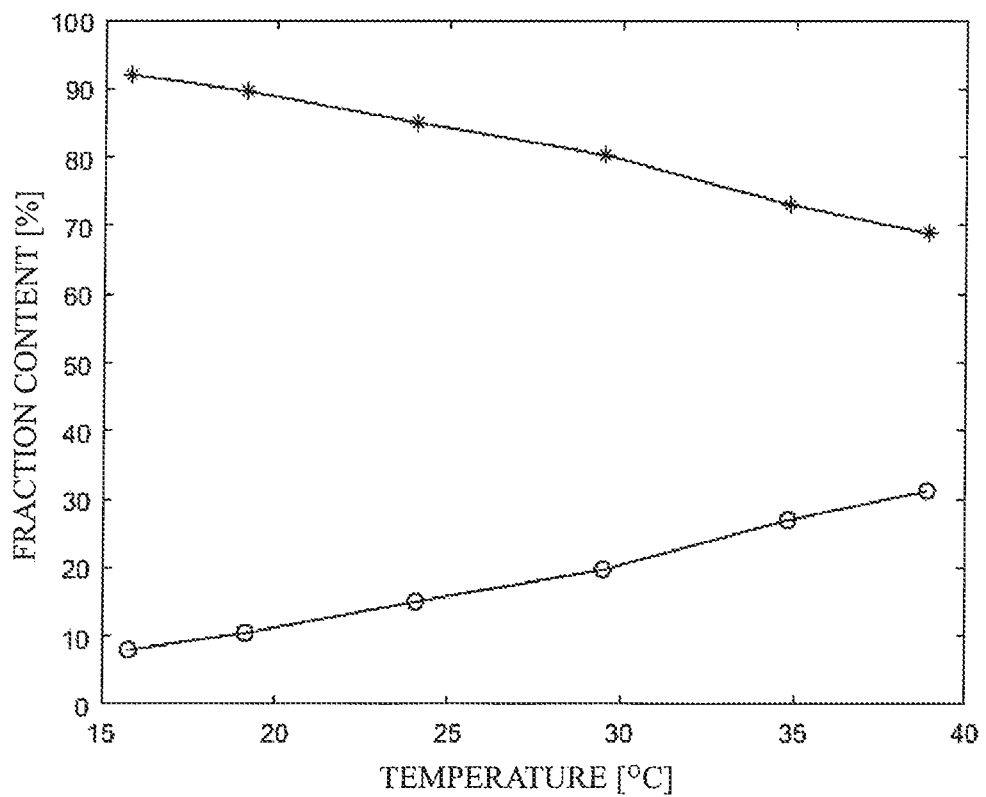
FIG. 6 illustrates an example of a change in fraction content in eucalyptus pulp as temperature changes.

FIG. 6 illustrates an example of a change in fraction content in eucalyptus pulp as temperature changes. The x-axis is temperature and the y-axis is fraction content [%].

Figure 7:
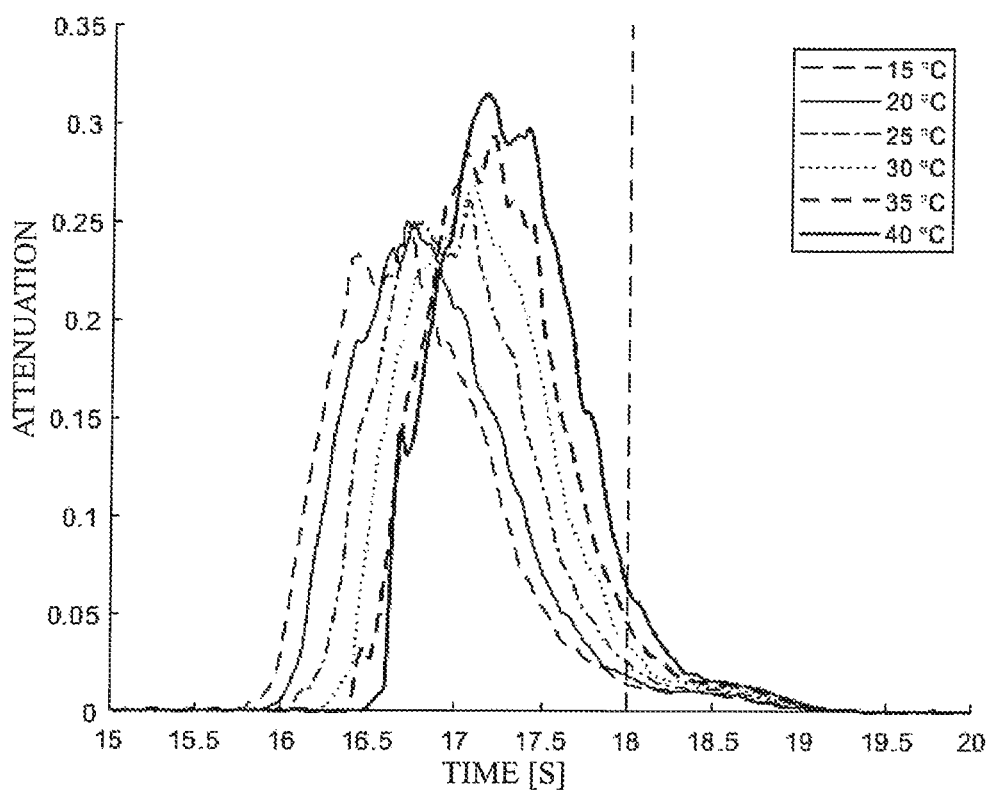
FIG. 7 illustrates an example of an effect of fractionation water temperature in pine pulp.

FIG. 7 illustrates an example of an effect of fractionation water temperature in pine pulp. The vertical axis is attenuation, and the horizontal axis is flow time in seconds.

Figure 8:
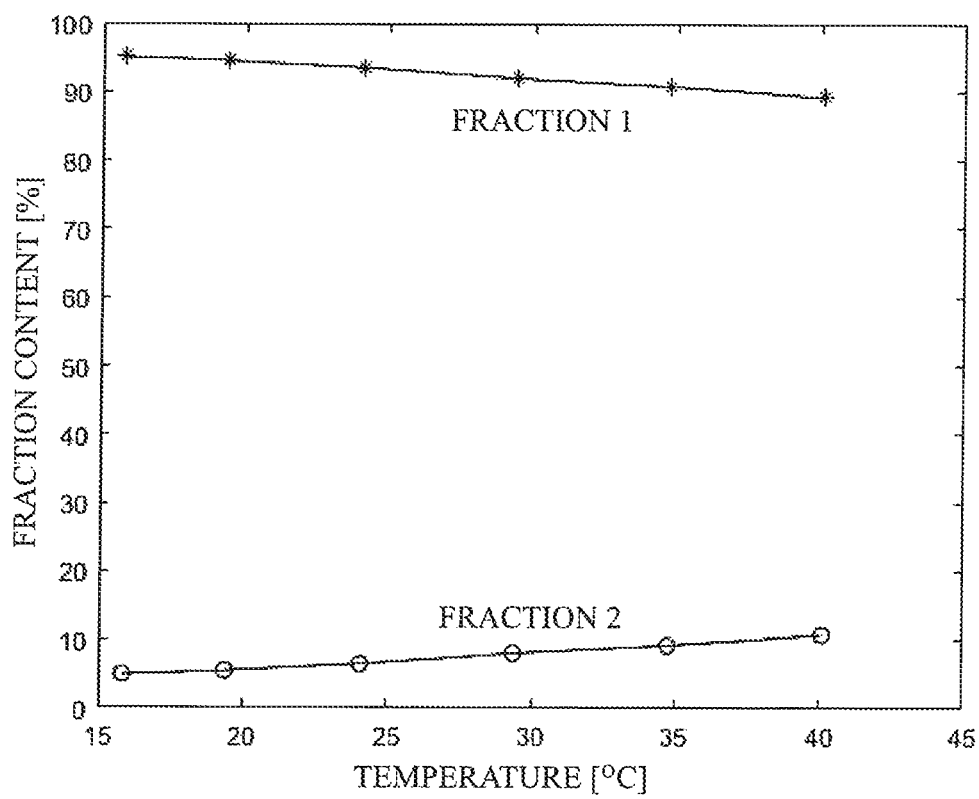
FIG. 8 illustrates an example of a change in fraction contents in pine pulp as the temperature changes.

FIG. 8 shows an example of the change in fraction contents in pine pulp as the temperature changes. The x-axis is temperature and the y-axis is fraction content [%]. The content of fraction 1 in pine pulp decreases from 95% to 90%. Equivalently, the content of fraction 2 increases from 5% to 10%.

Below currently used detection technologies are explained. The measurements and measuring results described in this document utilize optical measurement that is based on measuring the attenuation of light on two different wavelengths and reversing the polarization level in the wavelength of visible light. Light attenuation is designated here by abbreviations AVis and ANir. Attenuation AVis describes attenuation occurring in the visible wavelength range and ANir describes attenuation occurring in the near infrared wavelength range. Abbreviation DVis describes the reversal of polarization occurring in the visible wavelength range. The calculations will be described in the following chapters.

The attenuation coefficient (Attn Coeff, AVis, ANir) describes the quantity of attenuation in light intensity as light travels in a medium. Attenuation may also be called absorbance. Two mechanisms affect the attenuation of light: light absorption and scattering. Absorption refers to the absorption of light energy into matter and scattering refers here to the change in the direction of light when encountering solid matter in a fluid.

Figure 9:
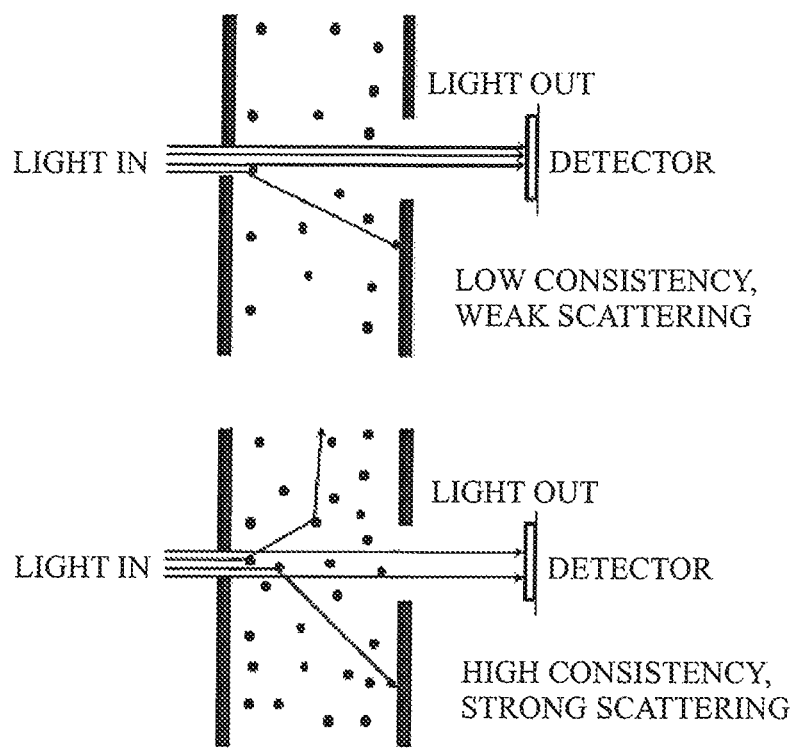
FIG. 9 illustrates an example of attenuation of intensity caused by scattering.

FIG. 9 illustrates example of attenuation of intensity caused by scattering. The intensity of light can be measured using the detector 22 and the attenuation can be determined using the data processing unit 24 (see FIG. 46). A lower consistency causes a weaker scattering than a higher consistency. In consistency (i.e. concentration) measurements, attenuation is caused mainly by the increase in light scattering as a function of consistency; an example of the principle of this effect is shown in FIG. 9. Wood fibers and other particles being positioned on the light path deflect part of the light from its original direction, and the light intensity at the detector decreases as a result. The higher the consistency, the more scattering particles there are on the light path and the more the intensity decreases.

Intensity decreases logarithmically in relation to consistency. The quantity of attenuation is calculated as the relation between the measurement intensity and the intensity of water measurement. Calculation of an AVis signal is as follows:

$$AVis = \ln\left(\frac{IntAVis(\text{Sample})}{IntAVis(\text{Water})}\right) \quad (2)$$

where IntAVis(Sample)=measurement value of AVis measured through sample, and IntAvis(Water)=measurement value of AVis measured through water. IntAvis(Sample) and IntAvis(Water) can be measured by the detector 22, and AVis can be determined by the data processing unit 24 (see FIGS. 46, 47).

Figure 46:
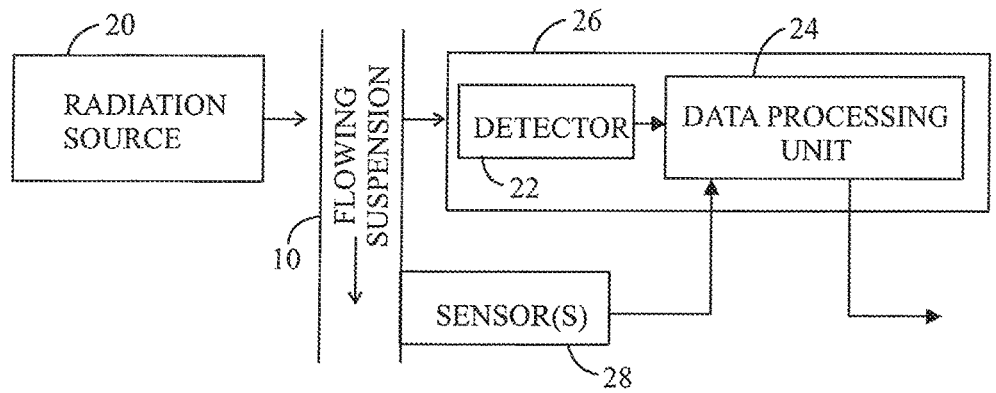
FIG. 46 illustrates an example of an apparatus for measuring flowing suspension.
Figure 47:
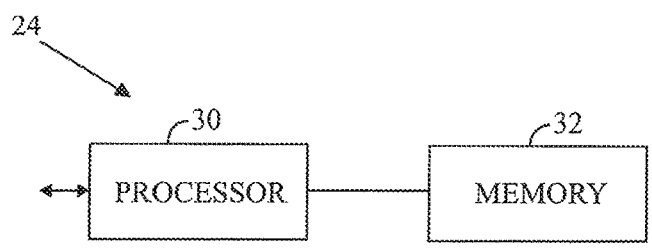
FIG. 47 illustrates an example of a data processing unit.

Equivalently, calculation of an ANir signal is as follows:

$$ANir = \ln\left(\frac{IntANir(\text{Sample})}{IntANir(\text{Water})}\right) \quad (3)$$

where IntANir(Sample)=measurement value of ANir measured through sample, and IntANir(Water)=measurement value of ANir measured through water. IntANir(Sample)

and IntANir(Water) can be measured by the detector 22, and ANir can be determined by the data processing unit 24 (see FIGS. 46, 47).

Dark values, such as caused by a detector's dark current, were removed from all measurement values.

In this case, the attenuation coefficient is thus an attenuation coefficient proportioned to intensity measured through water. Due to this, the attenuation coefficient is zero-based because the attenuation coefficient of pure water may be assumed zero in this calculation method. This is seen in FIG. 10 which shows an example of ANir attenuation coefficient responses of eucalyptus pulp with three different kaolin contents.

Figure 10:
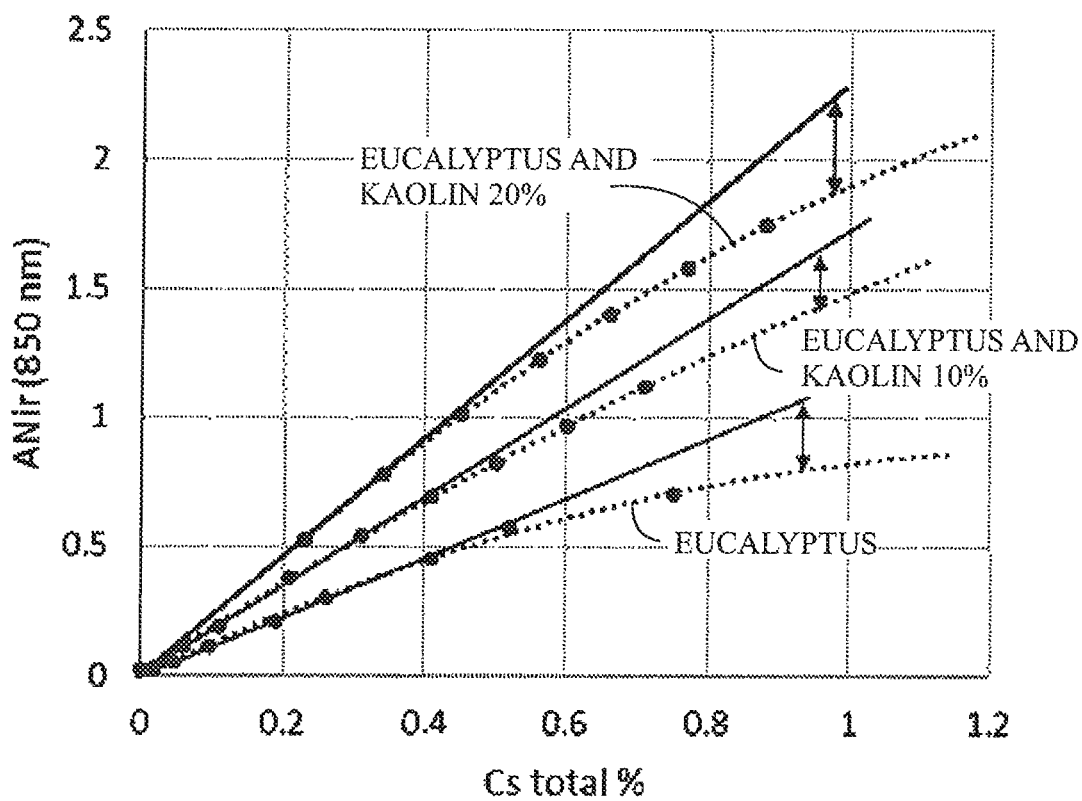
FIG. 10 illustrates an example of ANir attenuation coefficient responses in eucalyptus pulp with three different kaolin contents.

FIG. 10 illustrates an example of ANir attenuation coefficient responses in eucalyptus pulp with three different kaolin contents. The horizontal axis is consistency Cs in %. In addition to being zero-based, the attenuation coefficient may be considered primarily linear in relation to consistency. However, FIG. 10 shows an example that this linearity may increasingly disappear as the consistency increases illustrated here by the dotted lines starting to diverge from the straight lines.

Figure 11:
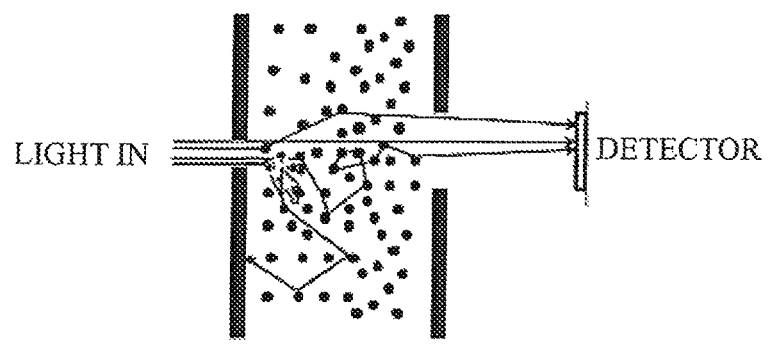
FIG. 11 illustrates an example of an effect of multiple scattering on travel of light.

FIG. 11 illustrates an example of an effect of multiple scattering on travel of light. The non-linearity of the attenuation coefficient response is at least partly due to multiple scattering, which starts to occur as the particle density increases with increasing consistency. In multiple scattering, part of the light diverged from the original light path is directed back to its original direction, whereby the relative increase in attenuation in relation to consistency starts to decrease.

Depolarization measurement or, in short, polarization measurement describes the reversal of polarization as light encounters wood fibers. The principle of measurement calculation is as follows:

$$DVis = \left( \frac{IntDVis(\text{Sample})}{IntAVis(\text{Sample})} \right) \quad (4)$$

where IntDVis(Sample)=measurement value of DVis measured through sample, and IntAVis(Sample)=measurement value of AVis measured through sample. Before this, dark values were removed from both measurement values. IntDVis(Sample) and IntAVis(Sample) can be measured by the detector 22, and DVis can be determined by the data processing unit 24 (see FIGS. 46, 47).

Dividing the measurement value of DVis measured through sample by the AVis intensity value may be used to correct the effect of attenuation on depolarized light.

The depolarization measurement may be zero-based if the water value is removed from the measurements. It may also be considered linear. However, the assumption of the linearity may be valid in a limited consistency range. Increasing the measurement distance may narrow the linear range of measurement. At low consistencies, depolarization reacts to the fiber quantity but, at higher consistencies, to all materials that cause scattering. Depolarization measurement is, however, less oversensitive to fillers in relation to changes in consistency than attenuation measurements.

In accordance with an example of FIG. 2, the known fraction calculation method thus utilizes a measured variable proportional to quantity to describe the quantity of material arriving for measurement at different flow times. The increase in light attenuation coefficient due to increasing particle quantity may be utilized as a variable proportional to quantity. On the other hand, it is possible to use the depolarization of light which increases as the quantity of birefringent material increases. Other measurement methods based on scattering are also used with the currently known solution.

In addition to the conventional measurement signal describing the quantity, the new calculation method utilizes a variable describing the properties of the sample. Hence, the new calculation method provides simultaneous sample property and quantity measurements that may be depicted as distributions irrespective of the flow rate. From the distributions, it is also possible to calculate as characteristic figures fraction-specific integral values or mean fraction-specific gravity center values. The gravity center may mean a weighted average of the values.

A new term fibrous index can be defined in a following manner. In fiber measurements, one potential signal describing sample properties is the ratio between the depolarization signal and the attenuation measurement. This ratio depicts the fibrousness of the sample and this ratio is referred to in this report as a fibrous index (FI).

$$\text{Fibrous Index} = FI = \frac{DVis}{AVis} - DVis_{water} \quad (5)$$

The fibrous index FI can be formed by the data processing unit 24 (see FIGS. 46, 47).

A water value $DVis_{water}$ may be deducted from the depolarization signal, thus providing the ratio starting from zero.

With pure and unbroken fibers, the depolarization is strong and attenuation low, whereby the ratio is high. With fines and fillers, the signals behave vice versa, whereby the ratio is low.

Another new term size index can also be defined as explained below. A short and long wavelength attenuation coefficient ratio is utilized here as a second index describing the properties. It depicts particle dimensions, such as particle size or fiber width or fiber-wall thickness. This attenuation coefficient ratio can be called the size index (SI).

The ratio of the attenuation coefficients of short and long wavelengths describes particle size.

$$\text{Size Index} = SI = \frac{ANir}{AVis} \quad (6)$$

where ANir depicts long wavelength and AVis depicts short wavelength. The ANir may include a band of the near-infrared region, and the AVis may include a band of a visible light. The size index SI can be formed by the data processing unit 24 (see FIGS. 46, 47). The visible light may range from about 400 nm to about 700 nm. The near infrared region may range from 700 nm to 1400 nm.

A variable conversely describing the size index may obtained by dividing the short-wavelength attenuation coefficient by the equivalent long-wavelength attenuation coefficient or vice versa. Instead of the attenuation coefficient, it may also be possible to use other measured variables that react to changes in light intensity. In general, a function of a first wavelength attenuation coefficient and a second wavelength attenuation coefficient may be formed, where the first wavelength and the second wavelength are different wavelengths.

In addition to particle size and shape, attenuation occurring at different wavelengths is affected by the spectral refractive indices of particles and fluid.

When calculating the fibrous index, the depolarization signal and the attenuation signal may be measured on any wavelength of electromagnetic radiation, and there is no need for them to be on the same wavelength.

When calculating the size index, it is possible to use the wavelengths of electromagnetic radiation widely. Extremely short wavelengths, e.g. the ultraviolet range, react most sensitively to small particles. Similar to calculation of the fibrous index, calculation of the size index may also utilize several different measurement signals, of which, a measured variable describing the particle size is produced by means of the calculation method.

The size index measurements may also react to the presence of dissolved material in the fluid; this will be illustrated later in measurement examples.

In addition to a variable describing the quantity, the new calculation method for fractions also requires a variable describing the particle properties which in this step is the ratio between two different signals. The change in ratio describes the change in particle properties during fractionation. Although the properties of the particles, per se, do not chance, the flow of the suspension causes the particles to be sorted into various size classes, which travel in the flow one after another. That is, the particles travel in fractions within the flow. It is also possible to use more than two basic signals in the calculation, with which signals, it is possible to calculate more complex models to describe the properties of flowing material. The models do not need to be proportional but may be produced by any function describing a desired property.

Furthermore, there is no need for the signals to be optical, but as other measurement technologies may also produce variables that describe properties.

In an embodiment, division based on the ratio between signals may be selected such that the signals are zero-based and linear. In the case of attenuation signals, this may be implemented when consistencies are relatively low. Even the depolarization signal is at least somewhat linear at low consistencies. However, linearity is not an absolute requirement.

In fractionation, the sample is divided in the fractionating tube 10 over a long distance and, thus, it may be diluted from the consistency of the original whole sample. This dilution may be used to keep the attenuation and depolarization signals in the linear range.

Figure 12A:
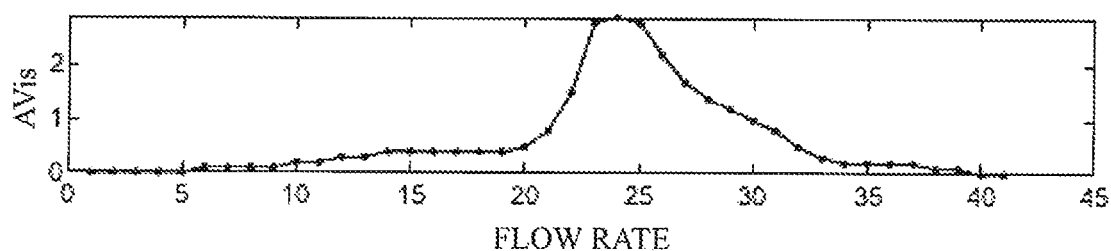
FIGS. 12A and 12B illustrate examples of fractograms describing particle properties and quantity as a function of flow rate.
Figure 12B:
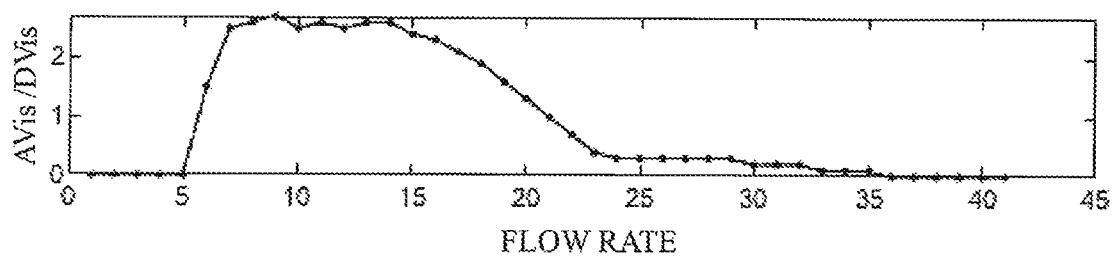

This chapter describes the calculation procedure that produces a distribution. FIGS. 12A and 12B illustrate examples of fractograms describing particle properties (DVis/AVis) and quantity (AVis) as a function of flow rate. The fractogram describing the quantity produced by the attenuation signal (AVis) is in FIG. 12A and the fractogram describing the fibrousness (DVis/AVis) is in FIG. 12B. Alongside the attenuation signal describing the quantity (AVis) in FIG. 12A, a fibrous index describing an equivalent fractogram (DVis/AVis) was calculated (see FIG. 12B). High fibrous index values (DVis/AVis) describe fibers at a low flow rate at the start of the fractogram. As the flow proceeds, the value of the fibrous index (DVis/AVis) decreases as the fibrousness of particles arriving to the measurement decreases.

Combining the quantity variables corresponding to the property classes produces distribution information. This combination is clarified by an example in FIGS. 13-16. In the example figures, the fibrous index (DVis/AVis) describing fibrousness produces a fibrous distribution which may be used to depict how much material corresponding to each fibrous index the material being measured contained. The distribution is produced by classifying each measurement point measured in relation to the flow based on the fibrous index and by calculating the total sum of the quantity signal values corresponding each fibrous class.

Figure 13:
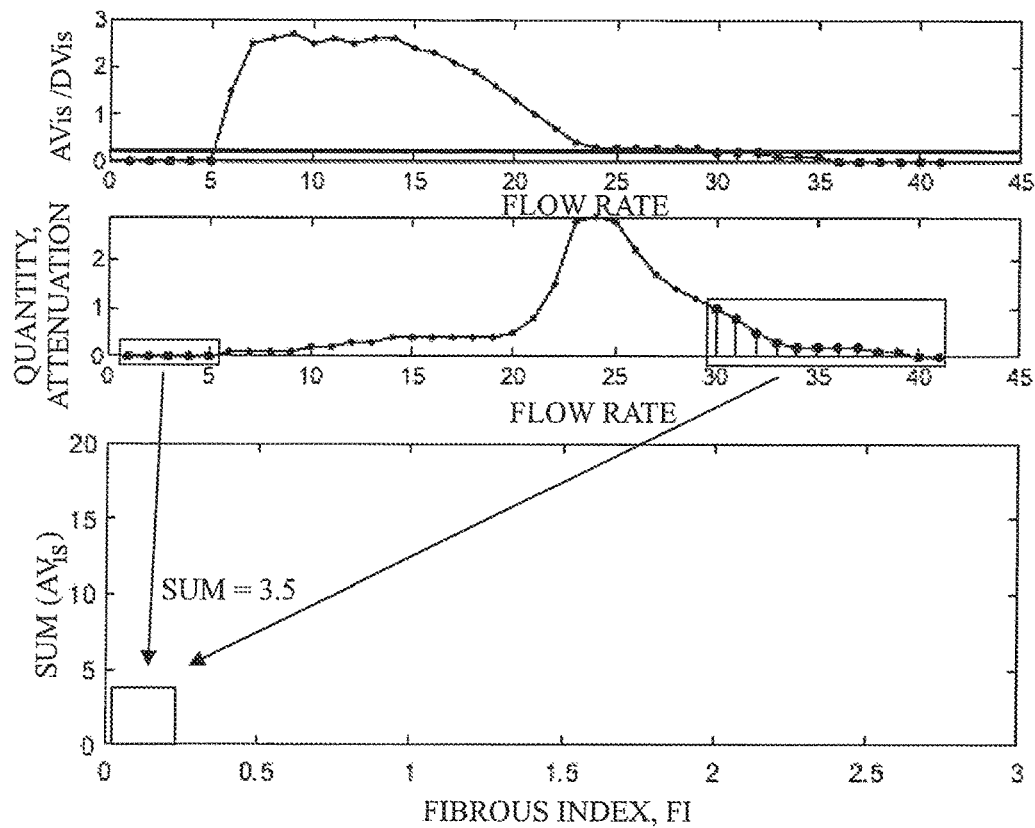
FIG. 13 illustrates an example of mapping of quantity corresponding first property class in fibrous distribution.

In the example, the quantity graph is the attenuation of visible wavelength AVis which is the middle graph in the figures. The lowest graph is the fibrous index distribution produced based on the property and quantity graphs. FIG. 13 illustrates an example of mapping of quantity corresponding first property class in fibrous distribution. The x-axis in the highest graph is the flow rate and the y-axis is the ratio of signals DVis/Avis. The x-axis in the graph in the middle is the flow rate, and the y-axis is the quantity and/or attenuation of the optical signal. The x-axis in the lowest graph is the fibrous index FI and the y-axis is the sum over signal AVis. Values 0-0.25 correspond in this example the first class, whereby the mean value for the class is 0.125. In FIG. 13, there are values being included in this class both in the flow range 0 . . . 5 and the flow range 30 . . . 42. However, AVis quantity values corresponding the values in flow range 0 . . . 5 indicate that there is no material in this flow range, whereby these points do not affect the calculated total sum.

Figure 14:
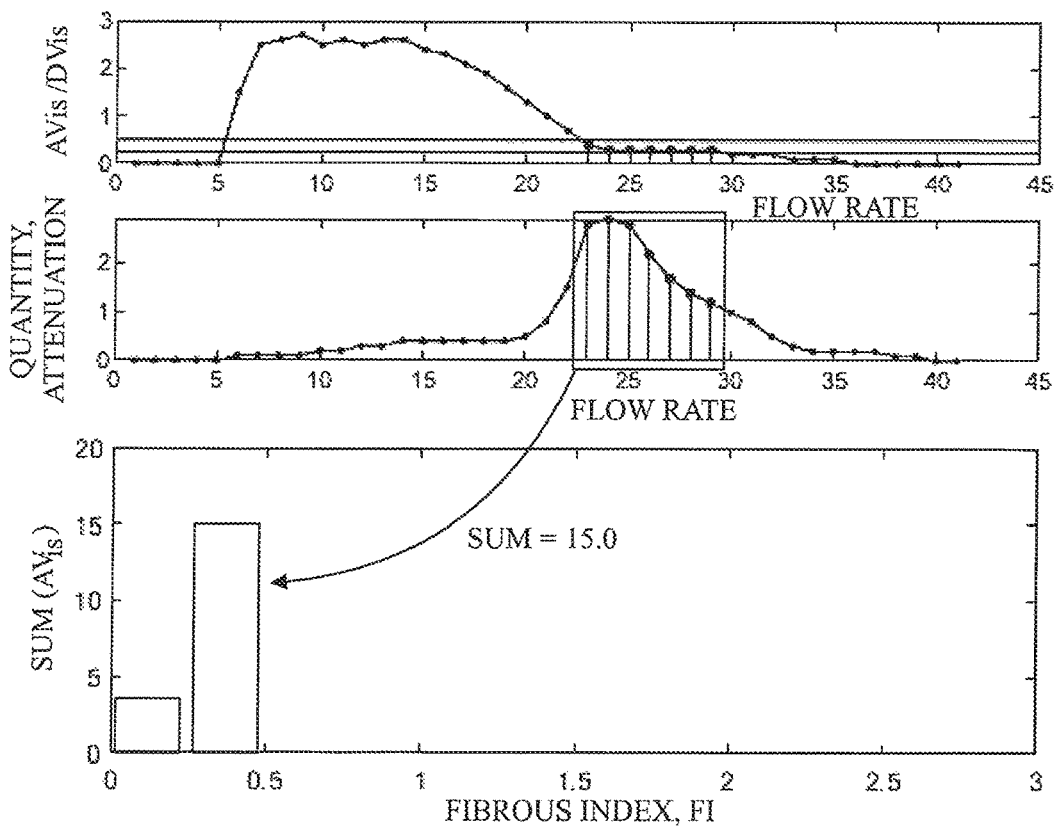
FIG. 14 illustrates an example of mapping of quantity corresponding second property class in fibrous distribution.

The sum of quantity values corresponding this lowest property class is 3.6. The value is located in the distribution graph at the point corresponding the mean value of 0.125. Hence, a (x, y) location is (0.125, 3.6) in the lowest graph. The value thus describes the quantity of most non-fibrous particles in the sample. FIG. 14 illustrates an example of mapping of quantity corresponding second property class in fibrous distribution. The x-axis in the highest graph is the flow rate and the y-axis is the ratio of signals DVis/Avis. The x-axis in the graph in the middle is the flow rate, and the y-axis is the quantity and/or attenuation of the optical signal. The x-axis in the lowest graph is the fibrous index FI and the y-axis is the sum over signal AVis. The calculation of material quantity corresponding the second property class is performed. The second property class is in the range 0.25-0.5 in this example, whereby the mean value corresponding the class is 0.375. The material corresponding this class is measured in the flow range 23 . . . 29. The AVis total sum of these measurement points is 15.0. This sum is located at the point corresponding the mean value 0.375 on the distribution graph at a location where (x, y) coordinates are (0,375, 15).

Figure 15:
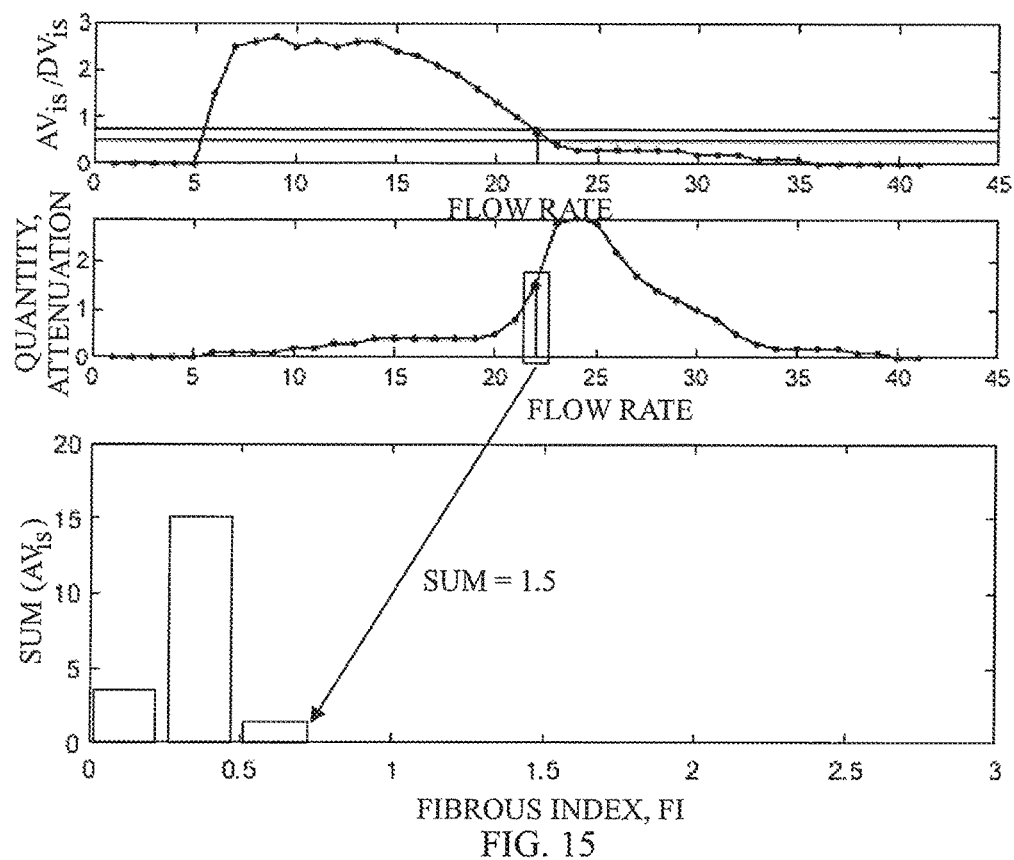
FIG. 15 illustrates an example of mapping of quantity corresponding third property class in fibrous distribution.

FIG. 15 illustrates an example of mapping of quantity corresponding third property class in fibrous distribution. The x-axis in the highest graph is the flow rate and the y-axis is the ratio of signals DVis/Avis. The x-axis in the graph in the middle is the flow rate, and the y-axis is the quantity and/or attenuation of the optical signal. The x-axis in the lowest graph is the fibrous index FI and the y-axis is the sum over signal AVis. There is only one measurement point in the third property class 0.5-0.75 in the flow value 22 shown in example of FIG. 15. This AVis value is 1.5 which is located in the distribution at the value 0.625 of the fibrous index such that (x, y) location is (0.625, 1.5).

Figure 16:
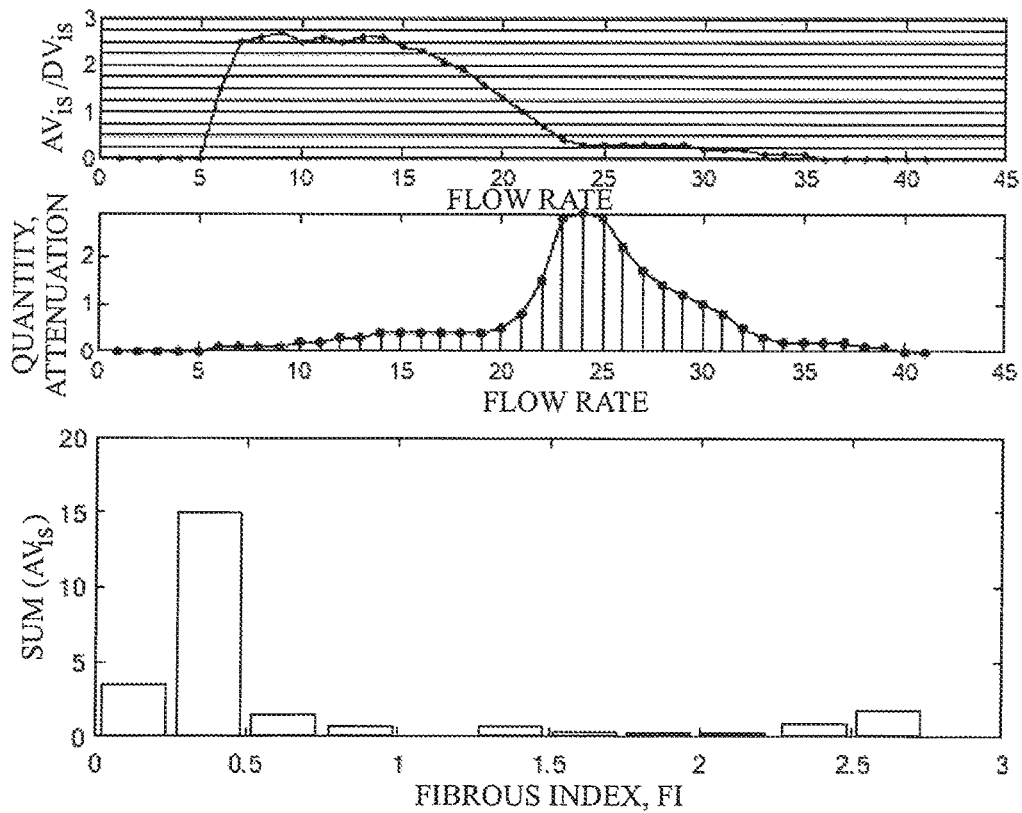
FIG. 16 illustrates an example of mapping of quantity values corresponding property classes in fibrous distribution.

FIG. 16 illustrates an example of mapping of quantity values corresponding property classes in fibrous distribution. The x-axis in the highest graph is the flow rate and the y-axis is the ratio of signals DVis/Avis. The x-axis in the graph in the middle is the flow rate, and the y-axis is the quantity and/or attenuation of the optical signal. The x-axis in the lowest graph is the fibrous index FI and the y-axis is the sum over signal AVis (see equation (2)).

When the whole fractogram is classified in this way, an example of the completed distribution may be obtained. In this example, the low values of the fibrous index thus correspond the quantity of non-fibrous particles and the high value the quantity of fibrous particles. Material having a high fibrous index is usually pure, non-fibrillated fiber. The fibers in the medium range may be e.g. material that has partially retained its fibrousness but been pulverized and fibrillated. The lowest fibrous class contains fines and particularly material that does not include polarization-inducing pulp.

The attenuation response of the visible wavelength range used in the example is different for particles having different fibrous indices. Due to this, the fines and fillers produce a different response in relation to pulp quantity from pure fibers. The fines and fillers may produce a stronger response as attenuation, for example in relation to pulp quantity than pure fibers. This may be considered by calibrating the quantity signal such that a smaller weighting coefficient is given to the quantity measurement in the lower fibrous index range than with higher fibrous indices. The calibration may be performed by measuring particles of known properties and known contents.

Figure 17:
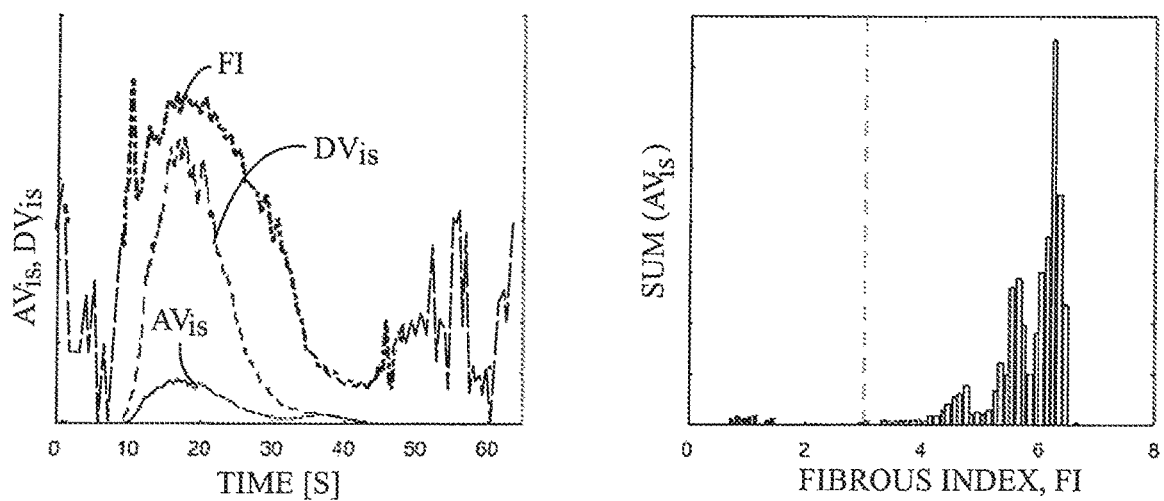
FIG. 17 illustrates an example of a fractionation result of a pine pulp sample utilizing the new calculation method.

FIG. 17 shows an example of a fractionation result of a pine pulp sample utilizing the new calculation method. In the left graph, the lowest line, which is also continuous, shows the AVis signal and the dashed line above the Avis signal shows the DVis signal. The highest line is the fibrous index FI. These signals are shown as a function of flow time. The calculation of flow time was started after the separation sequence as the measurement sequence starts, whereby the sample arrives to the measurement.

At moments of time 10-30 seconds, the sample being measured consists of fibers which peak in quantity at the moment of 18 seconds. The fines in the sample arrive after the moment of time 30 seconds. The fibrous index describing the relation of the DVis and AVis signals is shown with the highest line and is read from the right-hand vertical axis. At the 20-second moment of the fiber fraction, the fibrous value is 6, i.e. the value of the DVis signal is about six times the value of the AVis signal. The higher the fibrous value, the more purely fibrous the sample is. When transferring towards the fines fraction, the fibrousness decreases to about 1, whereby the DVis and AVis values are on the same level with each other. Low fibrous values thus indicate that the sample is, on average, highly non-fibrous at that moment.

At moments of time when the AVis and DVis signals are very low, the fibrous index obtained by division is noisy. However, this noise does not impede the measurement significantly, because the quantity signal at those moments is so low that it does not increase the calculated total sum in practice.

The fibrous index thus describes the fibrousness of the sample but does not primarily react to the quantity of the sample. The AVis and DVis signals react to the quantity of the sample, being significantly at a lower level at the point of the fines fraction. From this, it is possible to directly deduce that the pine pulp sample in question contains very little fines compared with fibrous material.

As already explained FIG. 17 illustrates examples of fibrous index distribution of pine pulp sample based on AVis signal. The x-axis of the left graph is time and the y-axis is the value of the AVis signal. The x-axis of the right graph is the fibrous index FI and the y-axis is a sum of the values of the AVis signal. In the examples of FIG. 17, a limit for fines was set at the fibrous index value of 3, above which is the fiber fraction and, below which, is the fines fraction.

The right-hand side of FIG. 17 shows a fibrous index distribution calculated as described in FIGS. 12 to 16 and their explanation, such that the quantity is described by the total sum calculated from the AVis signal by fibrous index classes.

The fibrous distribution roughly centers on value 6 in this example, i.e. the particles of the sample are relatively fibrous. The fines quantity of the sample is relatively low here.

Figure 18:
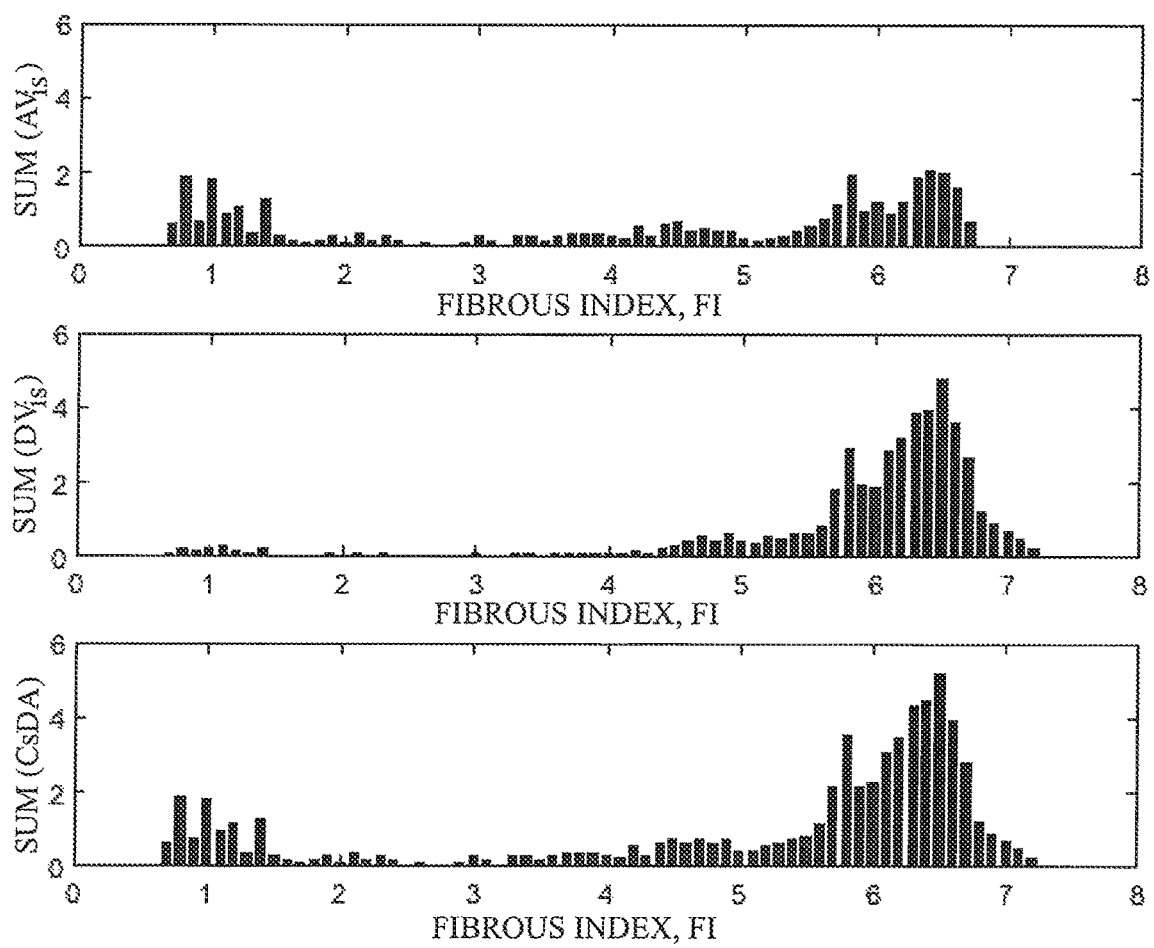
FIG. 18 illustrates an example of a fibrous index distribution of a pine pulp sample using the AVis signal or the DVis signal, respectively, for calculation.

The AVis signal based on attenuation quantity is relatively significantly more sensitive to the quantity of fines than the quantity of fibers when the comparison of quantities is performed based on the mass of dry matter. The situation with the DVis signal based on depolarization is the opposite: fiber sensitivity is relatively higher than fines sensitivity. The two upper graphs in an example of FIG. 18 show an example of a fibrous index distribution of a pine pulp sample using the AVis signal or the DVis signal, respectively, for calculation. The sample is the same as in the example of FIG. 17.

When carrying out pulp content comparisons fraction-specifically, these sensitivity stresses create the need for calibration. In order to have a comparable quantity for the different parts of the distribution, the measurement must be implemented with a weighting coefficient function that weights the quantity of different materials by a coefficient required by their response. When using the AVis signal, the function gives a smaller weighting coefficient to fines than to fibrous material. On the other hand when using the DVis signal, the weighting of fines must be stronger than that of fibrous material. The weighting coefficient function may be linear or non-linear depending on the case. When using measurement methods other than those mentioned above, a suitable weighting coefficient function based on the response behavior may be used for them.

The sensitivity differences of the attenuation coefficient signal and the depolarization signal may be evened out by using a suitable model of them. A commonly used model in the measurements of this document is the Euclidean distance of the AVis and DVis signals from the origin. Here, this is designated as CsDA which describes it being similar to a consistency measurement the calculation of which utilizing the D and A signals. Cs in CsDA refers to consistency, D refers to depolarization and A refers to attenuation. Calculation of the CsDA variable is depicted in Equation 7. CsDA may be considered be based on quantity. CsDA may be converted to consistency by a suitable computation or by using suitably calibrated coefficients.

$$CsDA = \sqrt{AVis^2 + DVis^2} \quad (7)$$

CsDA can be formed by the data processing unit 24 (see FIGS. 46, 47).

The calculation equalizes the sensitivity differences between different components and decreases the need for calibration compared with using only the DVis or AVis signals.

FIG. 18 illustrates examples of fibrous index distribution of the same pine pulp sample utilizing signals AVis, DVis and CsDA. The x-axis is the fibrous index FI and the signals AVis, DVis and CsDA are in the y-axes. The CsDA variable is used as the quantity signal.

The term 'Sum CsDA' used in this document refers to either the sum or integral of CsDA values being included in the fraction in question or to the total sum or integral calculated over all of the fractions. That is, it is the sum total of the bars in the graph.

When analyzing samples containing fibrous particles, the fibrous index works well as a primary measurement according to which it is possible to classify the sample. An advantage of the fibrous index in tube flow fractionation is effective at clearly dividing the sample in the flow based on fibrousness.

However, it is also possible to analyze the sample based on size index, which is particularly justifiable in microfractionation where fractionation is performed in a very small diameter fractioning tube 10. In that case, the particle size is typically very small, and fibrousness is not a significant particle property.

On the other hand, it is also possible to use the size index as a secondary measurement of the fibrous index distribution. In that case, the size index is calculated fraction-specifically for fractions based on the fibrous index.

Figure 19:
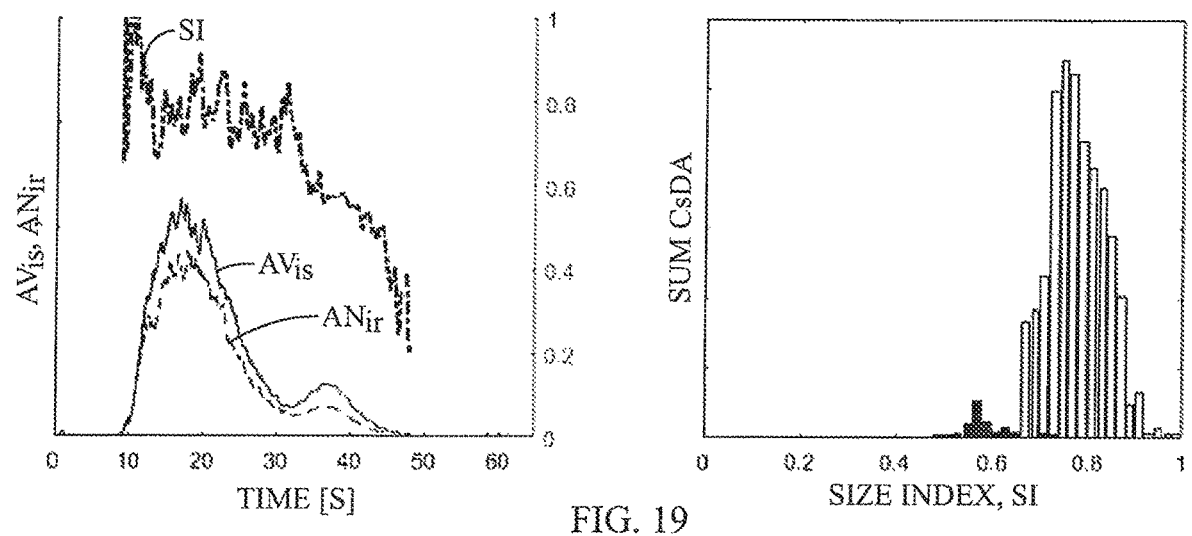
FIG. 19 illustrates examples of fibrous index distribution as primary measurement and size index distribution as secondary measurement.

FIG. 19 illustrates examples of fibrous index distribution as primary measurement and size index distribution as secondary measurement. The left graph shows the size index as a function of flow time, similar to the fibrous index signal in the left graph of FIG. 17. In this case, moments of time where the AVis value is less than 0.001 were omitted from the index calculations to remove insignificant noise points from the fibrous and size index values. In general, values at or below the noise level may be removed from the computations.

The size index signal at the point of the fiber fraction is about 0.8 and decreases towards the fines fraction to below 0.6 in this example (see FIG. 17). This indicates decreasing particle size as a function of flow. It may be assumed that the particle dimension most significantly affecting the size index of the fiber fraction is likely to be fiber wall thickness.

The graph in the right shows fraction-specific size index distributions. The white bars represent the size index distribution of particles above 3 of their fibrous indices and the black bars represent the size index distribution of particles below 3 of their fibrousness. The distribution graph shows the size index of the fibers, which thus probably depicts fiber wall thickness and is significantly higher than the size index depicting the particle size of the fines fraction.

In an embodiment, it is possible to calculate size index distributions for all fractions produced based on the fibrous index, whereby the size distribution data of different particle classes may be distinguished from each other. The width of the classification window used in producing the fibrous index is the only factor limiting the number of fractions. Hence, there may be as many fraction classes as there are bars in the distribution.

In an embodiment, certain characteristic figures may be derived from the distributions similar to those examples above to depict the fraction-specific quantity and properties of the measured sample.

When nano-scale particles are measured, the primary interest is in size index of particles. In some cases the fibrous index may be the secondary measurement thus characterizing the crystallinity of nanocrystals.

Integrating the entire fibrous and/or size distribution gives the total consistency of the sample. By integrating the distribution by fractions, fraction-specific consistency may be obtained. For example, long-fiber consistency, medium-fiber consistency and fines consistency. Where high accuracy is required, the quantity signal used in consistency definitions may be calibrated by means of a weighting coefficient function. Even without calibration, however, the ratio of the values describes the relative quantity changes in fines and fibers in relation to the total consistency.

In an embodiment, it is possible to produce e.g. fraction-specific gravity center values, weighted average values, mean values or distribution symmetry based values. Fraction-specific weighted averages, which may also considered gravity centers, depict the mean property of the fraction in question. For example, the gravity center of the fibrous index for the fines fraction in the example of FIG. 17 is about 1 and for the fiber fraction about 6. If the gravity centers move towards higher values, it may be confirmed that the particles of the fraction in question have, on average, become more fibrous. Similarly, as the gravity centers of the size index distribution move towards lower values, the mean particle size may decrease and, as the gravity centers move to higher values, the mean particle size may increase.

Figure 20:
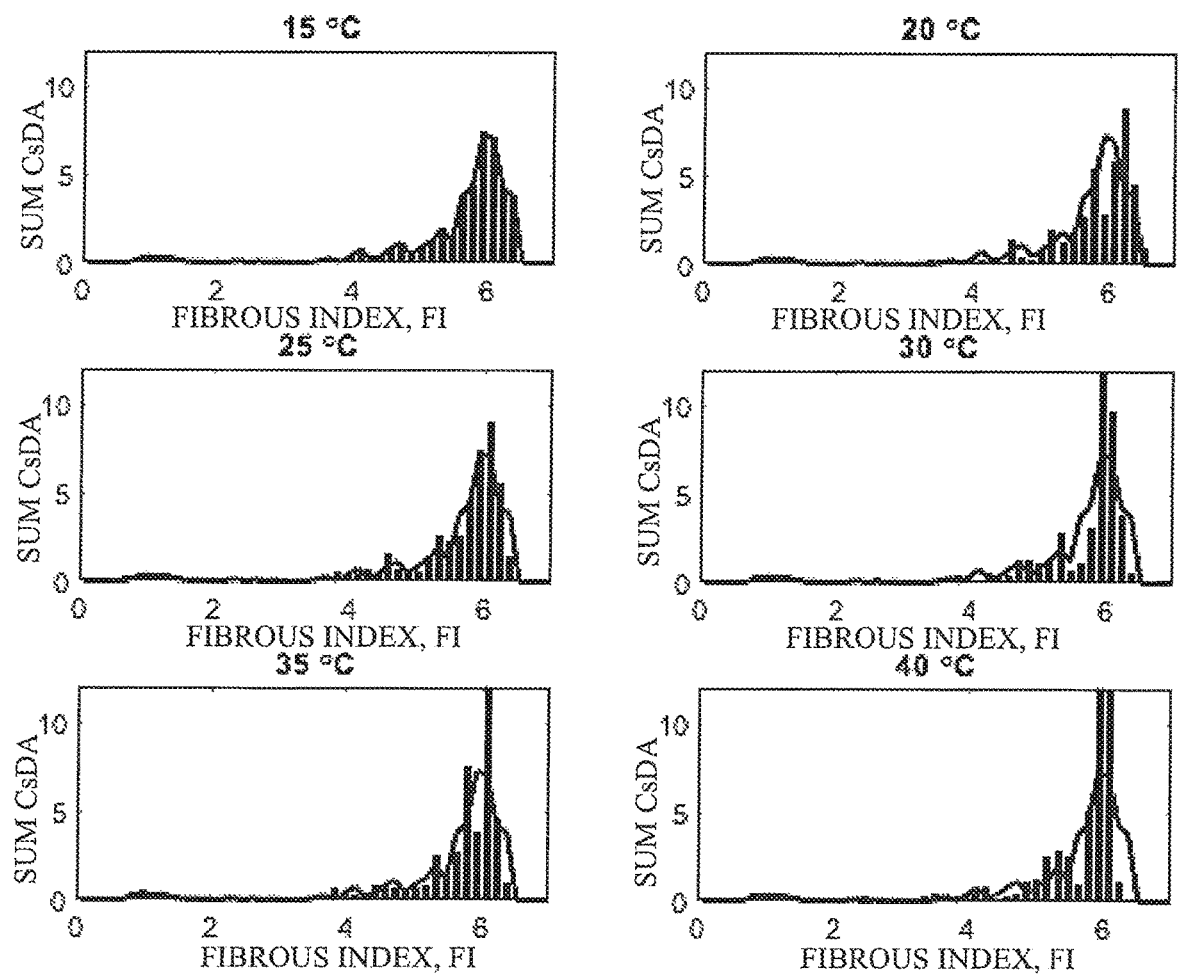
FIG. 20 illustrates an example of fibrous distribution in pine pulp as water temperature changes from 15° C. to 40° C.

FIG. 20 illustrates examples of fibrous distribution in pine pulp as water temperature changes from 15° C. to 40° C. The fibrous index is in the x-axis and the value of the fibrous index is in the y-axis. In an embodiment, effect of fractionation water temperature in fractograms may be compensated by using new calculation method, presented in this document. The quantity signal is here CsDA. A reference value of a measurement performed in the temperature of 15° C. is shown with a continuous line and the measurements with bars i.e. it is shown in the graph that is upper right in FIG. 20. The distributions do not change significantly even though there is a significant change in fractionation at different temperatures.

Fractions may change significantly as the fractionation temperature changes, even though the sample pulp and the flow speed remains the same.

Figure 21:
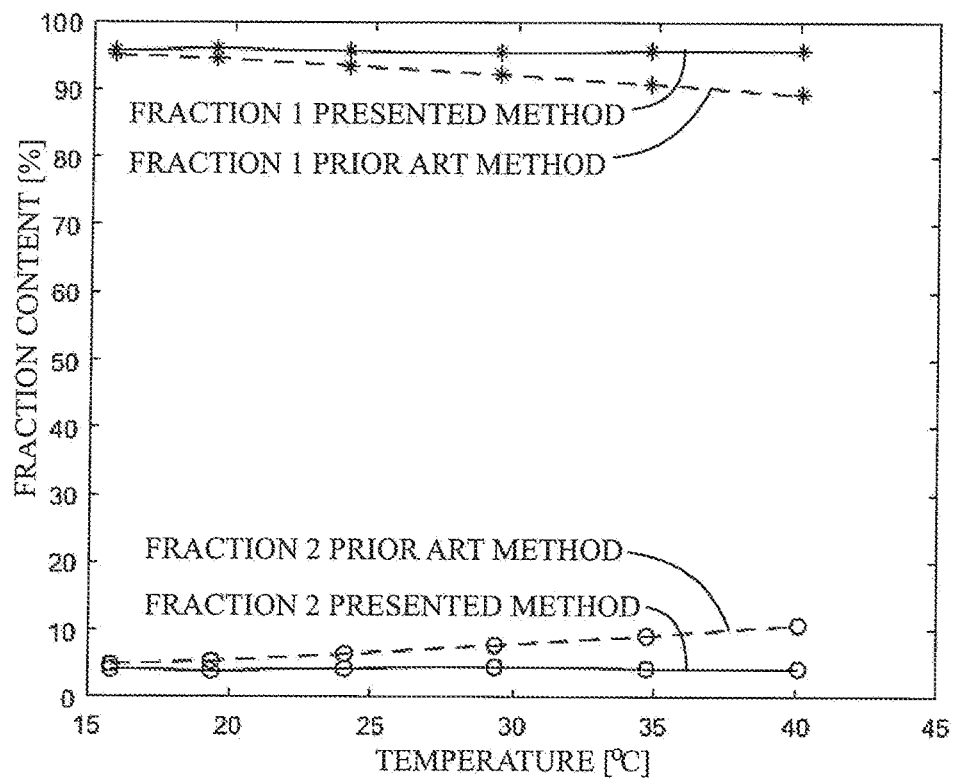
FIG. 21 illustrates an example of changes in fraction content as function of temperature in pine pulp sample with the prior art liter-based calculation method and with the new calculation method.

FIG. 21 illustrates examples of changes in fraction content as function of temperature in pine pulp sample with the prior art liter-based calculation method and with the new calculation method presented in this document. The fiber fraction content according to the prior art method is named fraction 1 prior art fiber fraction content according to the present method is named fraction 1 prior present method. The fines fraction content according to the prior art method is named fraction 2 prior art and the fines fraction content according to the present method is named fraction 2 prior present method. With the new calculating method presented in this document, the contents have remained significantly more stable than with the method based on liters.

Figure 22:
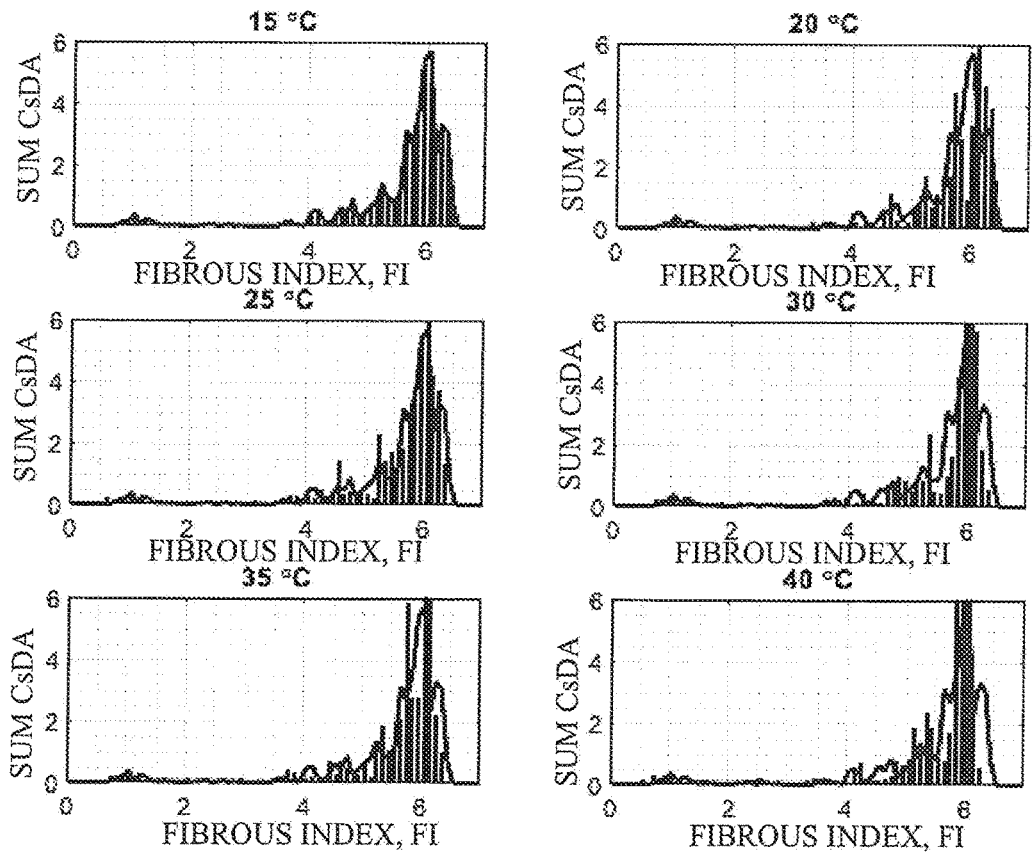
FIG. 22 illustrates an example of fibrous index distributions of eucalyptus pulp over temperature changes from 15° C. to 40° C.
Figure 23:
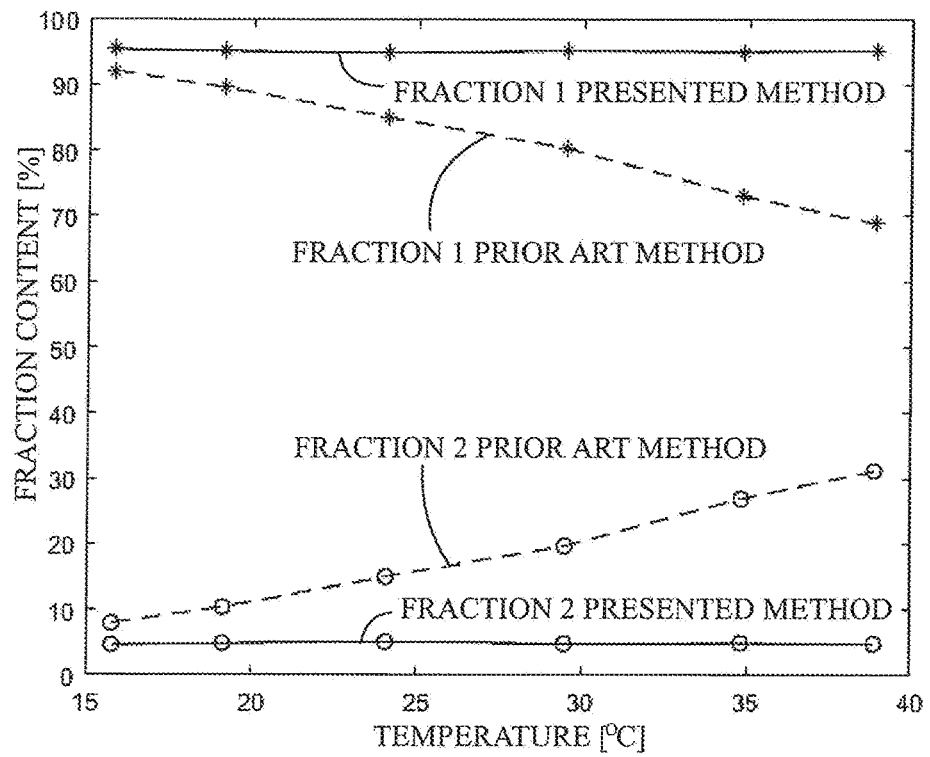
FIG. 23 illustrates examples of changes in fraction content as function of temperature in eucalyptus pulp sample with liter-based prior art calculation method and with the new calculation method.

As an example, the results of a similar test performed with eucalyptus pulp are shown in examples of FIGS. 22, 23. Examples of the fibrous distribution is shown in FIG. 22. An example of the fraction content results of the test are shown in FIG. 23. Thus, the fraction calculation based on the new calculation method may be used to eliminate the fractionation error caused by temperature.

FIG. 22 illustrates examples of fibrous index distributions of eucalyptus pulp over temperature changes from 15° C. to 40° C. The fibrous index is in the x-axis and the value of the fibrous index is in the y-axis. A reference value of a measurement performed in the temperature of 15° C. is shown with a continuous line and the measurements with bars (see FIG. 20).

FIG. 23 illustrates examples of changes in fraction content as function of temperature in eucalyptus pulp sample with liter-based prior art calculation method and with the new calculation method presented in this document. The fiber fraction content according to the prior art method is named fraction 1 prior art fiber fraction content according to the present method is named fraction 1 prior present method. The fines fraction content according to the prior art method is named fraction 2 prior art and the fines fraction content according to the present method is named fraction 2 prior present method. As can be seen, the new calculation method is temperature independent.

According to FIGS. 20 and 22, the distributions of both pulp types lean in high temperatures towards lower fibrous values compared with low temperatures. This may be due to the fact that, in higher temperature, the fractionation divides the sample to a shorter time/flow period, whereby fibers different of their quality do not totally separate from each other but arrive partially intermeshed. Due to this, simultaneously with purely long fibers there may also be non-fibrous material being measured and, then, the value of the fibrous index describes the mean fibrousness of the particles at the same moment in the measurement.

A summary of the new calculation method presented in this document may be described in the following manner and the following may be used as distribution characteristic figures:

Integrals calculated by fractions which indicate consistency or concentration fraction-specifically;

Total integrals of distributions which describe total consistency or total concentration Gravity centers or other equivalent characteristic figures calculated fraction-specifically in relation to a property graph describing the property in question and its possible change;

Gravity centers or other equivalent characteristic figures calculated for the whole distribution in relation to a property graph describing the property in question and changes in the gravity center or equivalent characteristic figure describing the change in the property in question for the whole sample;

Symmetry of distribution in relation to a property graph describing the weighting of material quantity for different properties—this may also be performed either fraction-specifically or for the whole sample;

Secondary properties calculated in relation to a primary property—e.g. size indices of different fractions based on the fibrous index.

To perform what is explained above, an apparatus for measuring flowing suspension comprises a radiation source configured to direct wave motion to the flowing suspension, a flow of the flowing suspension causing particles of the flowing suspension to be sorted on the basis of their sizes. The size may refer to a volume of a particle while the particle's shape may vary, for example. A person skilled in the art is familiar with this kind of field-flow fractionation, per se. The field-flow fractionation can be used to separate particles of suspension that is made to flow through the fractionating tube 10.

The wave motion may be optical radiation or acoustic radiation, for example. The wave motion excludes particle radiation, where the particles are typically atomic or subatomic particles. A measuring arrangement may measure first values of a first parameter of the wave motion interacted with the flowing suspension at a first wavelength band of the wave motion. Each of the first values may be a value of a single measurement or an average of a plurality of measured values. The measuring arrangement may measure second values of the at least one of following: a second parameter of the wave motion interacted with the flowing suspension, and the first parameter of the wave motion interacted with the flowing suspension at a second wavelength band of the wave motion, the measurement of the first values and the second values being synchronized with each other value by value. In a similar manner to the first values, each of the second values may be a value of a single measurement or a value based on a plurality of measurements. The measuring arrangement may form at least one comparison, each comparison being configured to relate to one of the first values and one of the second values. The measuring arrangement may form a distribution which has at least one of first values as a function of one of the comparisons for replacing a representation of attenuations of the wave motion through the sample with respect to consistency.

In an embodiment, the measuring arrangement may measure the first values of the first parameter that depends on a consistency of the flowing suspension. The measuring arrangement may form the at least one comparison that depends on physical properties of the particles of the flowing suspension.

In an embodiment, the apparatus may comprise a tube flow fractionator in which the flowing suspension flows.

In an embodiment, an optical radiation source may direct optical radiation to the flowing suspension, the radiation comprising at least one beam that is polarized or a plurality of beams at least one of which is polarized and at least one separate beam is non-polarized. A measuring arrangement may measure attenuations of the electromagnetic radiation interacted with the flowing suspension. The measuring arrangement may measure parameters of polarization of the electromagnetic radiation interacted with the suspension, the measurements of attenuations and the parameters of polarization being synchronized. The measuring arrangement may then form comparisons of the parameters of polarization and the attenuations, each of the parameters and each of the attenuations of a comparison corresponding to each other on the basis of synchronization. The measuring arrangement may finally distribute the attenuations with respect to the comparisons between the parameters of polarization and the attenuations.

In an embodiment, the measuring arrangement may form the comparisons which are measured with wavelengths having a known relation to each other. In order to perform the distribution the measuring arrangement may compute, for at least one of at least two value ranges of the parameters of polarization, a sum of the attenuations, which are measured synchronously with the parameters of polarization, the parameters of polarization being within one of the at least two value ranges, the value ranges being non-overlapping. The measuring arrangement may associate, one by one, each of the sums and each of the value ranges, each used for computing said sum, with each other for forming the distribution of the sums of the first values as a function of the value ranges.

In an embodiment, the optical source may direct the electromagnetic radiation of at least two different wavelengths to the flowing suspension; and the measuring arrangement may form size indices by comparing the attenuations of the different wavelengths passed through a same section of the flowing suspension with each other.

This kind of measurement allows to form a quality signal, which in turn allows the elimination of flow speed information related to the flowing suspension. As a function of quality and quantity measurements it is possible to form distributions, which can be used to form characteristic values.

In the case of particles that are mainly fibers or the like, fibrous index may be used. In the case of particles that are non-fibers or less like fibers, size index or the like may be used.

On the basis of fractions that have been formed using the fibrous index or size index or the like, it is possible to determine secondary quality values. Size indices of separate fractions may be formed on the basis of the determined fibrous indices, for example. Fibrous indices of separate fractions may be formed on the basis of the determined size indices, the fibrous indices then representing a degree of crystallization of each of the fractions, for example. Fluorescence indices of separate fractions may be formed on the basis of the determined size indices, the fluorescence indices representing percentage or amount of fluorescent material in the sample, for example.

The measurement of consistency is important in the manufacturing of pulp and paper. Consistency is defined as the mass content of dry matter in relation to the total volume. According to standardized methods (ISO, Tappi, SCAN), consistency determination is performed by filtering, drying and weighing the sample. In many applications, the dry matter contains components that may differ greatly from each other. Components of different size, shape and specific weight create considerable challenges particularly in optical consistency measurement. Often, the measurements require as separate measured variables ash consistency, depicting the quantity of fillers, and fiber consistency, depicting the quantity of wood-based material. Summed up these provide the total consistency. The separate measurement of ash and fiber consistency is challenging to implement as a process measurement.

Fractionation enables temporally separated measurement of different types of components in the sample. Then, a mixture of components with different responses constituting a conventional measurement problem may be split into suspensions of components of similar consistency response, thus enabling genuinely component-specific measurement and calibration. The new calculation method presented in this document may be used to simplify the demanding mechanical structure of fractionation and thus it may enable the use of fractionation as part of an independent process consistency meter. Above all, the calculation enables separate consistency measurements of fines, ash and fiber fractions providing that it is possible to separate these components into their own fractions in the fractionation. The calculation also provides fraction-specific particle size information.

Examine now effect of pulp type on fibrous distribution. The test device in the study of pulp-type responses was the fractionator equipped with measurement using one 950 nm wavelength band in where both depolarization and attenuation are measured. Because of only one wavelength, only fibrous index may be calculated from the results. However, it is also possible to perform the measurement with more than one wavelength band like in the other measurement tests described in this document.

A test in the following example included 5 different samples:
TMP reject refining feed (TMP RJ Feed), TMP after reject refining (TMP RJ After), Unsorted TMP (TMP),
Pine pulp and
Eucalyptus pulp (Euca).
Of these, consistency dilutions were prepared in the range 0.1% Cs to 1.6% Cs.

Figure 24:
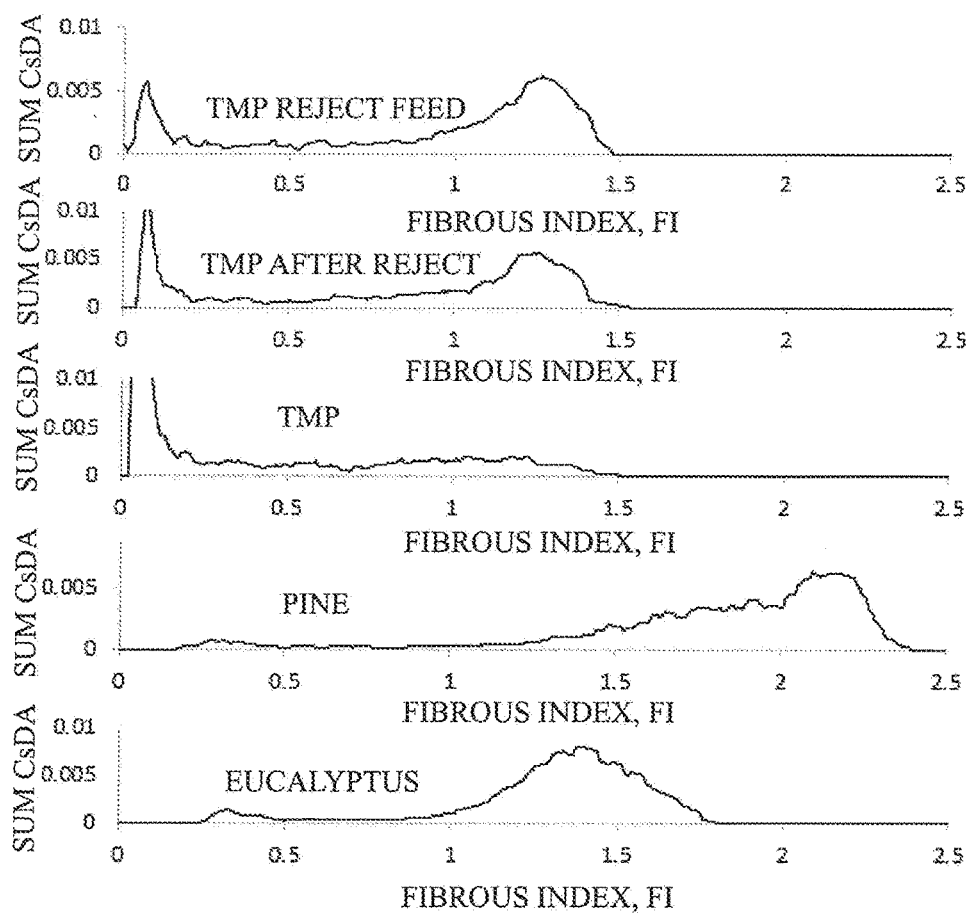
FIG. 24 illustrates examples of distributions of sample pulps at 0.7% consistency.

FIG. 24 illustrates examples of distributions of sample pulps at 0.7% consistency. The horizontal axis is the fibrous index and the vertical axis depicts equivalent quantity values. The quantity values are fraction-specific total sums of CsDA values according to Equation 7. Here, the distributions were divided into two fractions as an example, and the limit value of the two fractions was set to the fibrous index value of 0.6, which is also an example. Thus in this example, the fines fraction FR1 includes values below 0.6 and the fiber fraction FR2 values above 0.6. FIG. 24 shows how the refined mechanical pulps (TMP) may contain significant quantities of fines, whereas the chemical pulps may have no significant fines content. The sample in the middle of the figure, TMP, is original unscreened refined mechanical pulp, which has the highest fines content, whereas the fiber fraction evenly contains fibers of different qualities in the fibrous index range of 0.6-1.4.

Reject pulp screened from the TMP is topmost in FIG. 24. This pulp was taken as a reject refining feed sample. The fines content of the reject TMP is low compared with the unscreened TMP sample. The fiber fraction still significantly includes fibrous particles, which is shown in distribution values at fibrous index value 1.3.

The second graph from the top in FIG. 24 is an example of a sample taken after reject refining. Here, the quantity of fibrous material decreased and the quantity of fines equivalently increased.

Example of the chemical pulp samples are shown at the bottom of FIG. 24: second from bottom is pine pulp and at the bottom is eucalyptus pulp. The chemical pulp fibers are more uniform and fibrous than the mechanical pulp fibers. This is visible in the higher fibrous index value. The longer fiber length of pine pulp compared with eucalyptus pulp is visible in the weighting of the distribution towards higher fibrous values. The fines fraction for chemical pulps used in this discussion of results includes a lower quantity of sample material in the range 0.3-0.6. No particles are in the range below 0.3, from which is it is possible to interpret that the fines in the chemical pulp are of a very different quality compared with the mechanical pulps.

Figure 25:
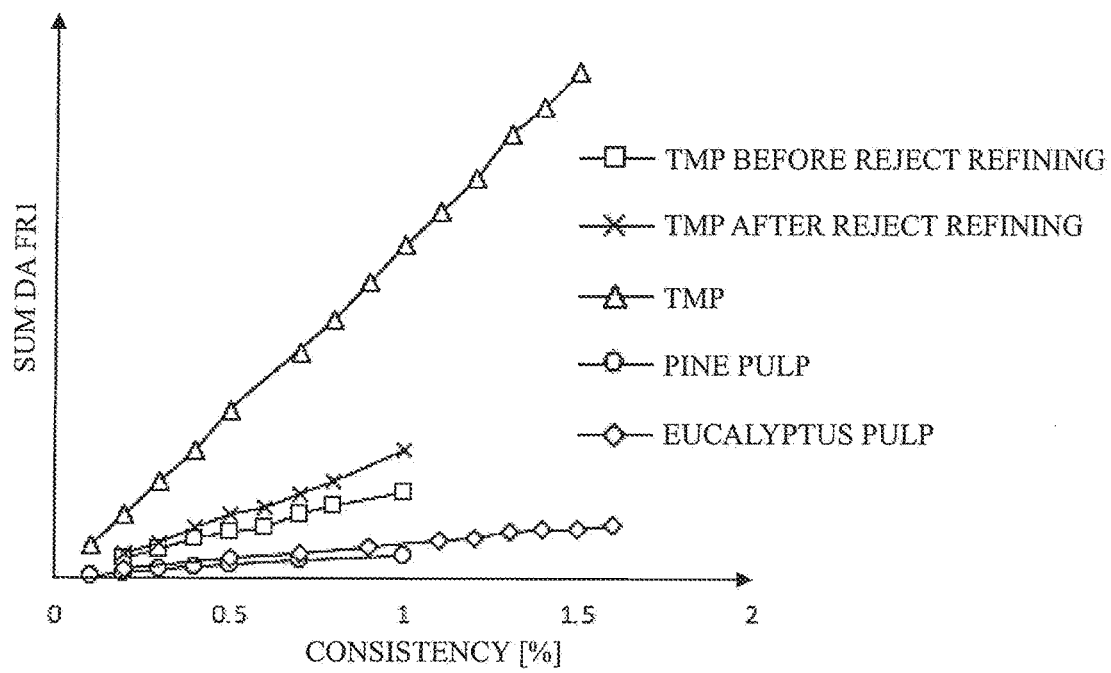
FIG. 25 illustrates examples of responses of sample pulp fines fractions as function of total consistency.

FIG. 25 illustrates examples of responses of sample pulp fines fractions as function of total consistency. Consistency responses of dilutions may be obtained by integrating the distributions fraction-specifically. The horizontal axis is consistency and the vertical axis depicts equivalent quantity values. The quantity values are fraction-specific total sums of CsDA values according to Equation 7. Then the obtained fraction integrals may be represented as a function of laboratory consistency. FIG. 25 shows an example of the responses of fines fraction FR1 to sample pulps measured in different total consistencies. The high fines content of unscreened TMP is visible as a strong response and, equivalently, the low fines content of pulps is visible as a low response. The effect of reject refining on fines is visible as the higher fines response of refined pulp. It is noteworthy in this result that the responses are zero-based and linear across the whole consistency range. This enables one-point calibration performed solely with one confirmation value.

FIG. 25 illustrates examples of responses of sample pulp fines fractions as function of total consistency. The x-axis is consistency [%] and the y-axis is SUM DA FR1. In FIG. 25, the abbreviation SUM DA FR1 means SUM CsDA of FR1.

Figure 26:
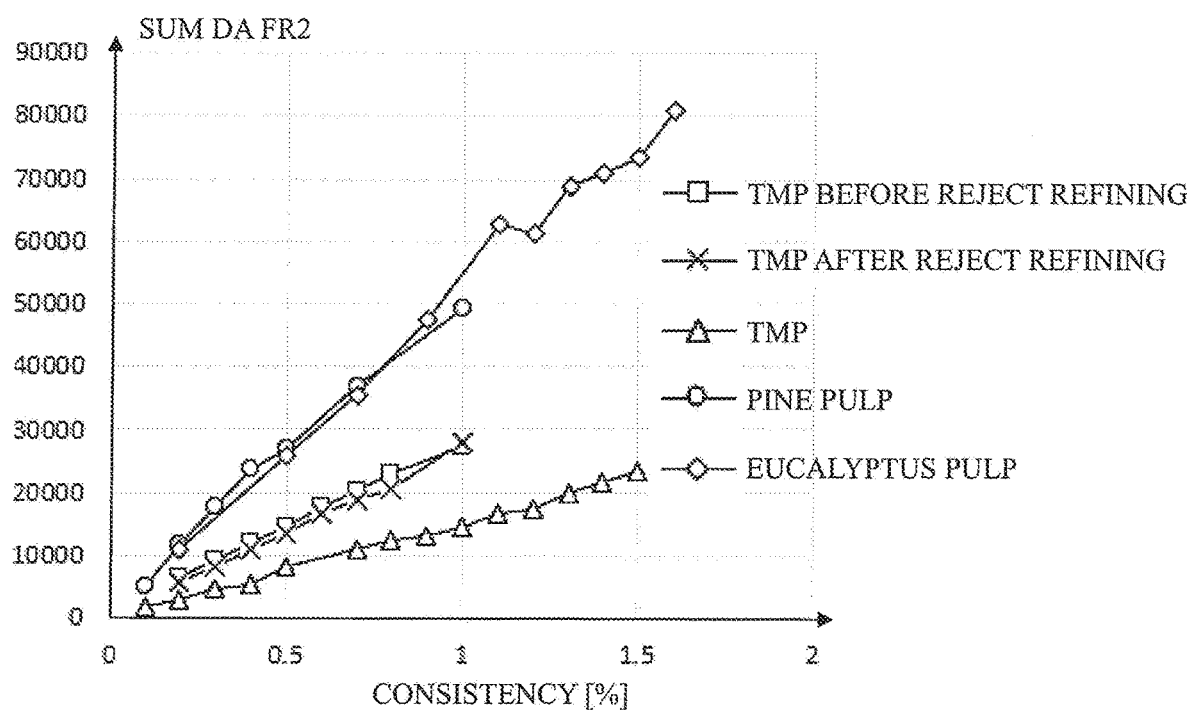
FIG. 26 illustrates examples of responses of sample pulp fiber fractions FR2 as function of total consistency.

FIG. 26 illustrates examples of responses of sample pulp fiber fractions FR2 as function of total consistency. The x-axis is consistency [%] and the y-axis is a sum of DA FR2. In FIG. 26, the abbreviation SUM DA FR2 means SUM CsDA of FR2. The horizontal axis is consistency and the vertical axis depicts equivalent quantity values. The quantity values are fraction-specific total sums of CsDA values according to Equation 7. The responses follow a logical pattern: the chemical pulps without fines have the highest responses, while the TMP responses are lower than the chemical pulps, unscreened TMP being the lowest.

Figure 27:
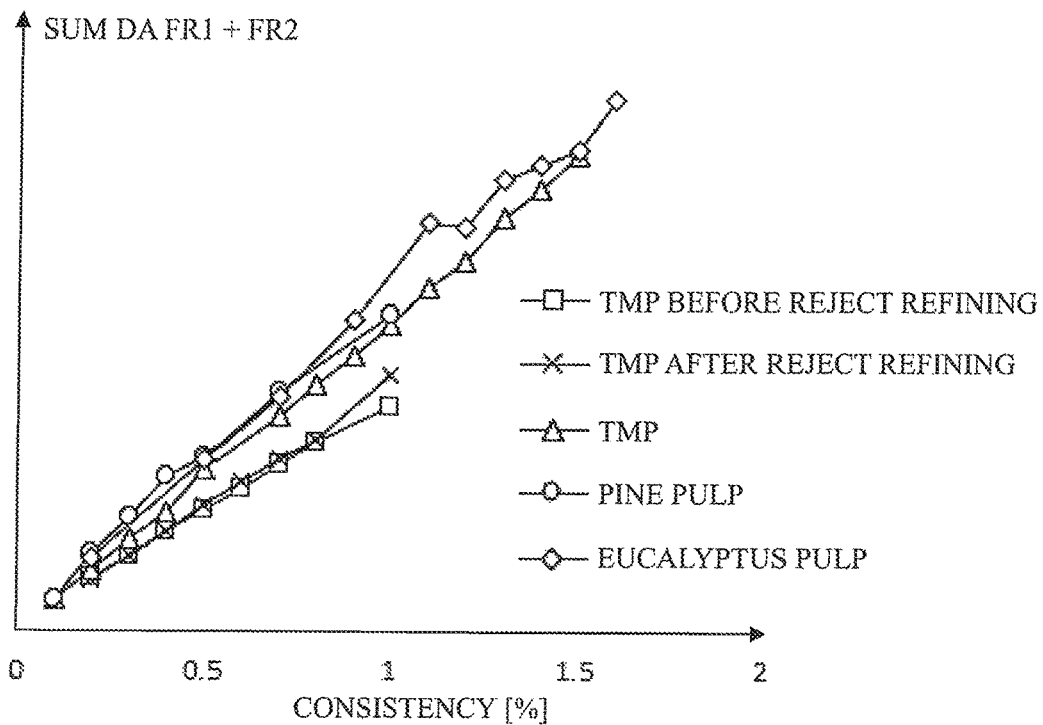
FIG. 27 illustrates an example of total combined responses of sample pulp fines and fiber fractions as function of total consistency, and the consistency responses of whole pulps with total combined fiber and fines responses.

FIG. 27 illustrates examples of total combined responses of sample pulp fines and fiber fractions as function of total consistency, and the consistency responses of whole pulps with total combined fiber and fines responses. The x-axis is consistency [%] and the y-axis is a sum of DA FR1 and FR2 in an arbitrary scale. In FIG. 26, the abbreviation SUM DA FR1+FR2 means SUM CsDA of FR1 and FR2. The quantity values are fraction-specific total sums of CsDA values according to Equation 7. The responses are very close to each other and are still linear and zero-based.

Considering that the responses are non-calibrated, the results are promising. The CsDA signal used in the measurements balances the reciprocal response difference of fibers and fines that is normally a common problem in optical measurements.

Depolarization and attenuation utilized as basic measurements may be zero-based and this property may be transferred to the calculated CsDA signal. The fractionating measurement method dilutes the sample such that the responses may be kept at least approximately linear over a wide consistency range. The linearity and zero-basedness enable working and simple one-point calibration by means of a sole confirmation efficient. The mutual similarity between the responses of the fines and fiber fraction in the CsDA signal makes it possible that, even when non-calibrated, the measurement error may be minimized.

Examine now effects of different fiber types and calcium carbonate on responses.

In a test surveying the responses of fiber types and calcium carbonate, long-fiber pulp (LF), short-fiber pulp (SF) and ground calcium carbonate (GCC) were mixed in various ratios. The sample names designate the mutual ratio of pulp samples by the numbers preceding LF and SF. Preceding the abbreviation GCC is a ratio depicting the relative share of fillers of the total fines. For example, OLF 100SF 50GCC means that 100% of the fibers in the sample mixture are short fibers and that calcium carbonate accounts for 50% of the total fines.

DESIGNATION EXAMPLES

The total consistency of all samples was a constant 0.5% Cs. When analyzing the results, the fines limit was set to a fibrous index of 1.

Figure 28:
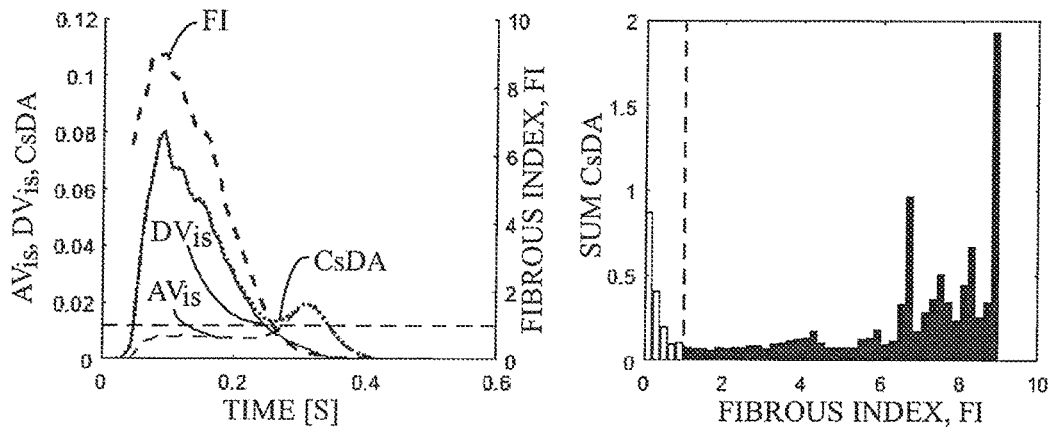
FIG. 28 illustrates examples of fractograms and distributions of pulp containing solely long fibers.
Figure 28:
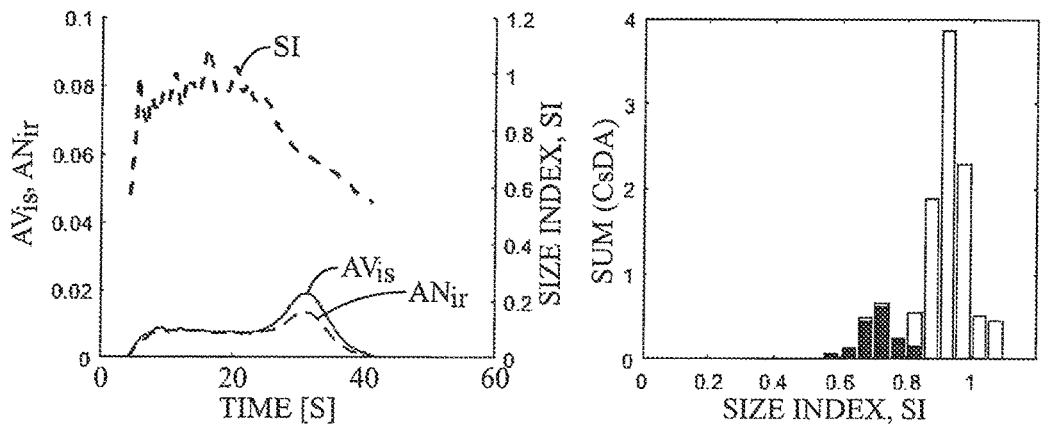

FIG. 28 illustrates examples of the fractograms and distributions of pulp containing solely long fibers. The majority of pulp is in the fiber fraction. The maximum of the fibrous index is close to 10 and the weight falling within the range of 6 . . . 9. The pulp contains many materials of different fibrousness. The size index of the fiber fraction is on average about 0.95 i.e. the fibers are relatively thick-walled or thick diameter/width, for example. The pulp also contains a significant quantity of fines, with an average size index of about 0.7. The bars of fines are white in the upper right graph and black in the lower right graph. The bars of fibers are black in the upper right graph and white in the lower right graph. Here the time scale 0 s to 0.06 s is actually 0 s to 60 s. The same also applies to FIGS. 29 to 34.

Figure 29:
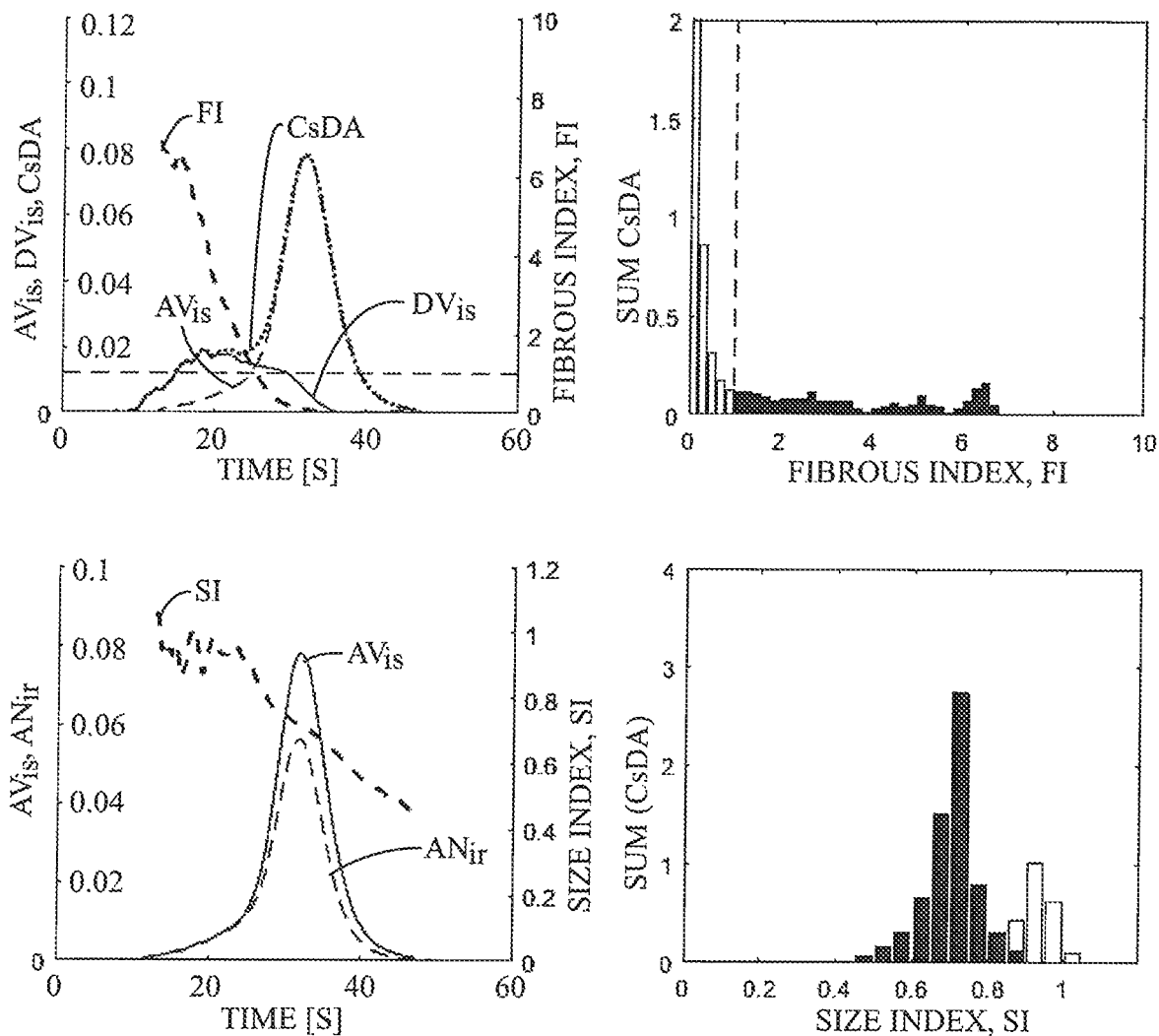
FIG. 29 illustrates an example of fractograms and distributions of pulp containing solely short fibers.

FIG. 29 illustrates examples of the fractograms and distributions of pulp containing solely short fibers. The fibrous index of the pulp leans towards lower values than the long-fiber pulp in the example of FIG. 28. The size index of the fiber fraction is also slightly lower in this pulp. There is significantly more material included in the fines fraction in the short-fiber pulp compared with the long-fiber pulp, and the lowest size index value is 0.45. This indicates that the size of the finest fines is smaller in this pulp compared with the long-fiber pulp. The bars of fines are white in the upper right graph and black in the lower right graph. The bars of fibers are black in the upper right graph and white in the lower right graph.

Figure 30:
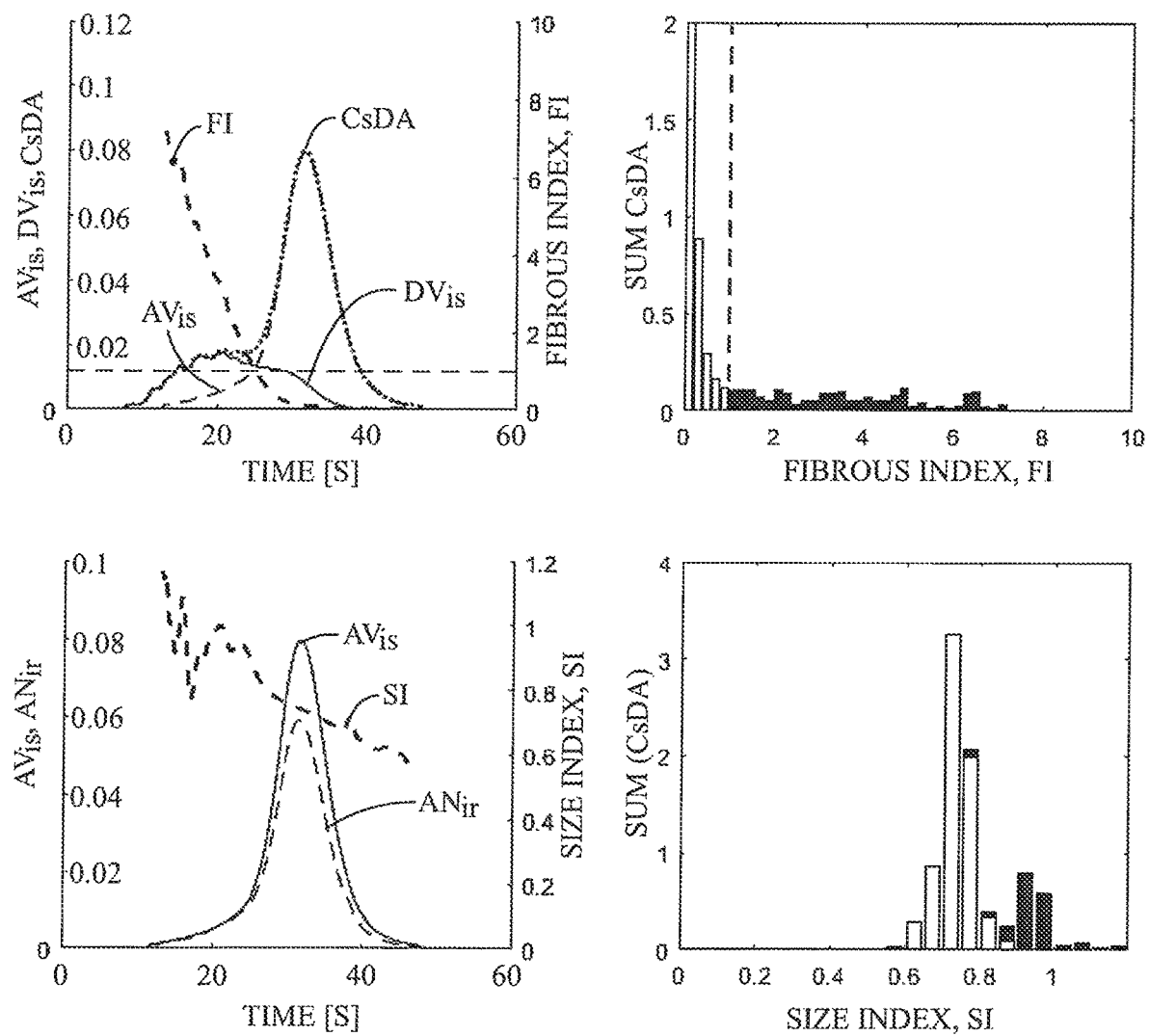
FIG. 30 illustrates examples of fractograms and distributions of pulp consisting of 90% of short-fiber pulp and 10% of calcium carbonate.

FIG. 30 illustrates examples of fractograms and distributions of pulp consisting of 90% of short-fiber pulp and 10% of calcium carbonate. The bars of fines are white and the bars of fibers are black in graphs on the right side. The fines content determined based on the fibrous index slightly increases and its size index moves towards slightly higher values.

The increase in size index is due to the larger particle size of added calcium carbonate compared with wood-based fines. The calcium carbonate fraction and the fines fraction arrive overlapped in the flow, whereby both components are simultaneously present in the measurement. Hence, the measurement describes both components on average.

Examine now what happens when calcium carbonate is added to long-fiber pulp.

Figure 31:
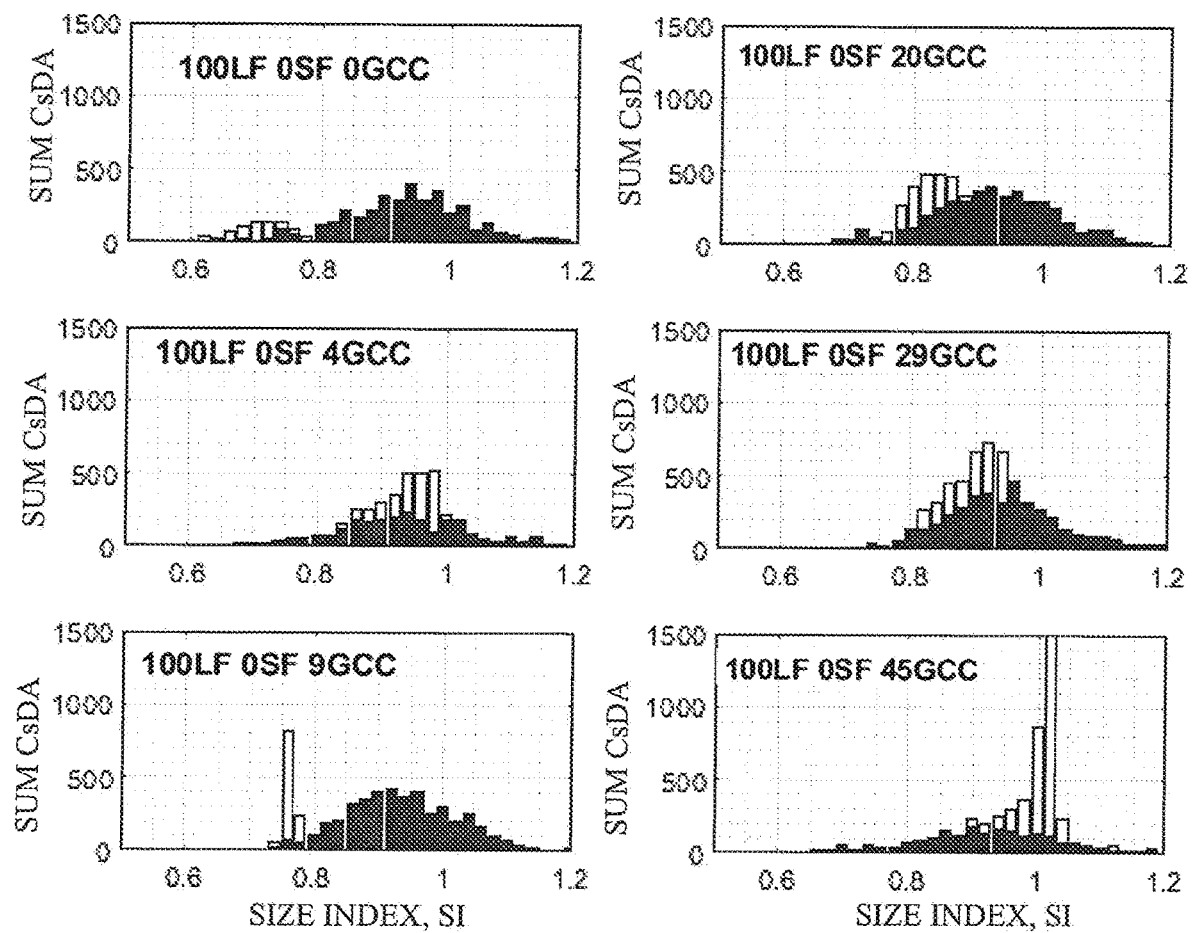
FIG. 31 illustrates examples of size index distributions when adding calcium carbonate to long-fiber pulp in different ratios.

FIG. 31 illustrates examples of size index distributions when adding calcium carbonate to long-fiber pulp in different ratios. The x-axis is the size index SI and the y-axis is SUM CsDA in a common scale. A change may be caused in the size index distribution of the fines fraction in long-fiber pulp by adding calcium carbonate. Wood-based fines represented by white bars in the top left initial situation graph create a distribution in the range 0-160. In the end situation graph in the bottom right, with GCC content of 45%, the distribution shifts to the range 100-1500. The size index SI of fines appears, so to speak, to climb to the other side of the size distribution of the fiber fraction depicted in black due to the effect of calcium carbonate.

Examine now TMP added with eucalyptus pulp and kaolin.

In the test, a pulp mixture of 60% TMP and 40% eucalyptus pulp was prepared. To this mixture, kaolin was mixed in different ratios and the consistency of each mixture was set at 0.3% Cs. Fractograms and distributions of the pulp mixture not containing kaolin at 0.3% Cs consistency are shown in an example of FIG. 32. In an example of FIG. 33, fractograms and distributions for a sample containing 50% TMP eucalyptus pulp and 50% kaolin are shown.

Three different fractions are now distinguished in the fractogram graphs: In the CsDA variable at moments of time 0-20 seconds shown in the example of FIG. 32, the fibers are mainly the largest and least processed fibers in the TMP pulp. At moments of time 20-30 seconds, the fibers are eucalyptus fibers and fibers of the shorter fraction of TMP. At moments of time 30-50 seconds, the material is mostly TMP fines.

Figure 33:
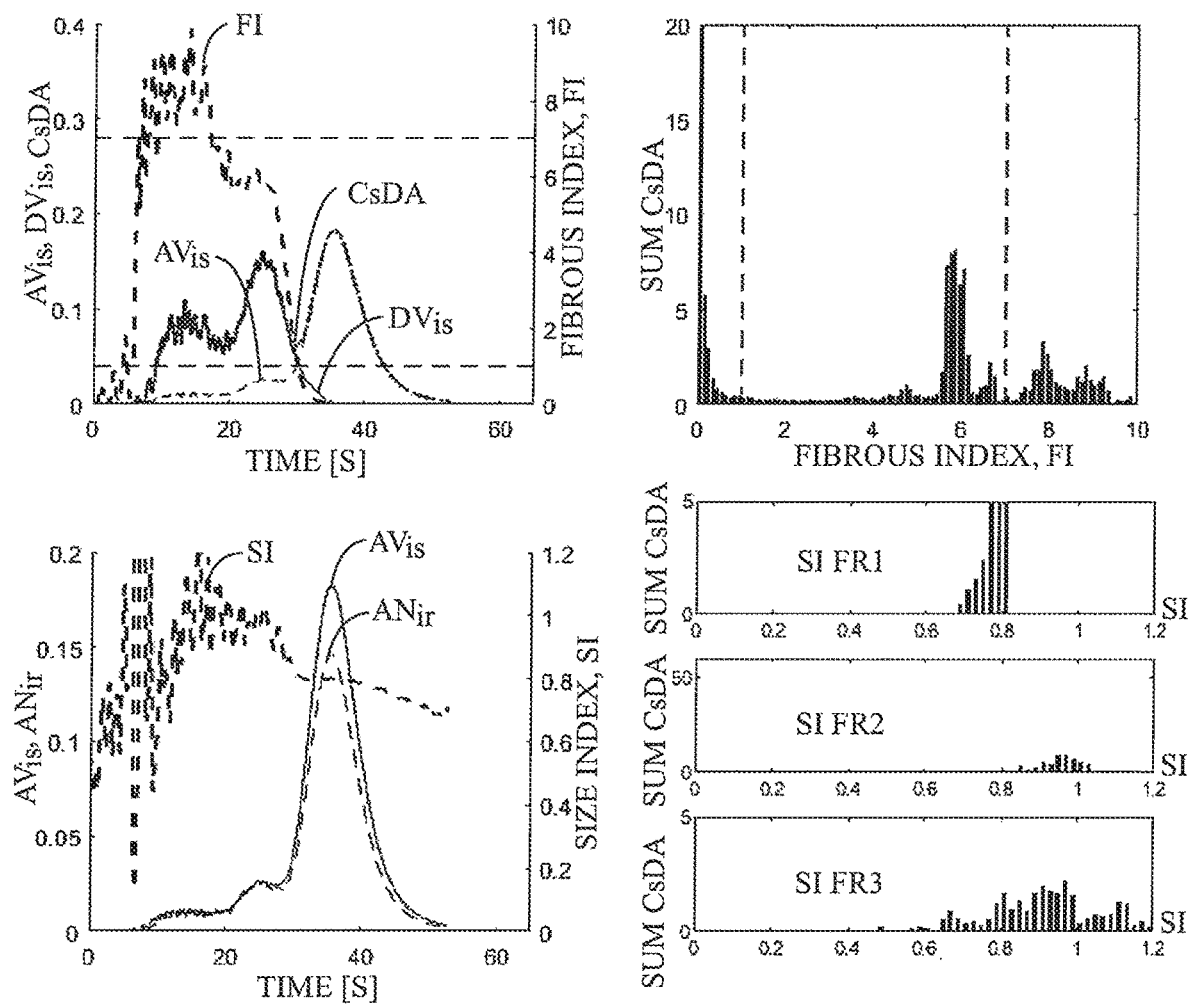
FIG. 33 illustrates an example of fractograms and distributions of pulp mixture containing half of 60% TMP and 40% eucalyptus pulp and half of kaolin at total consistency of 0.3% Cs.

The CsDA variable shown in the example of FIG. 33 otherwise corresponds the same fraction but, at the point of the fines fraction, there are kaolin particles along with the wood-based fines.

The size indices of the measurements are presented as separate graphs for the three fractions at the bottom right of the figures.

Figure 32:
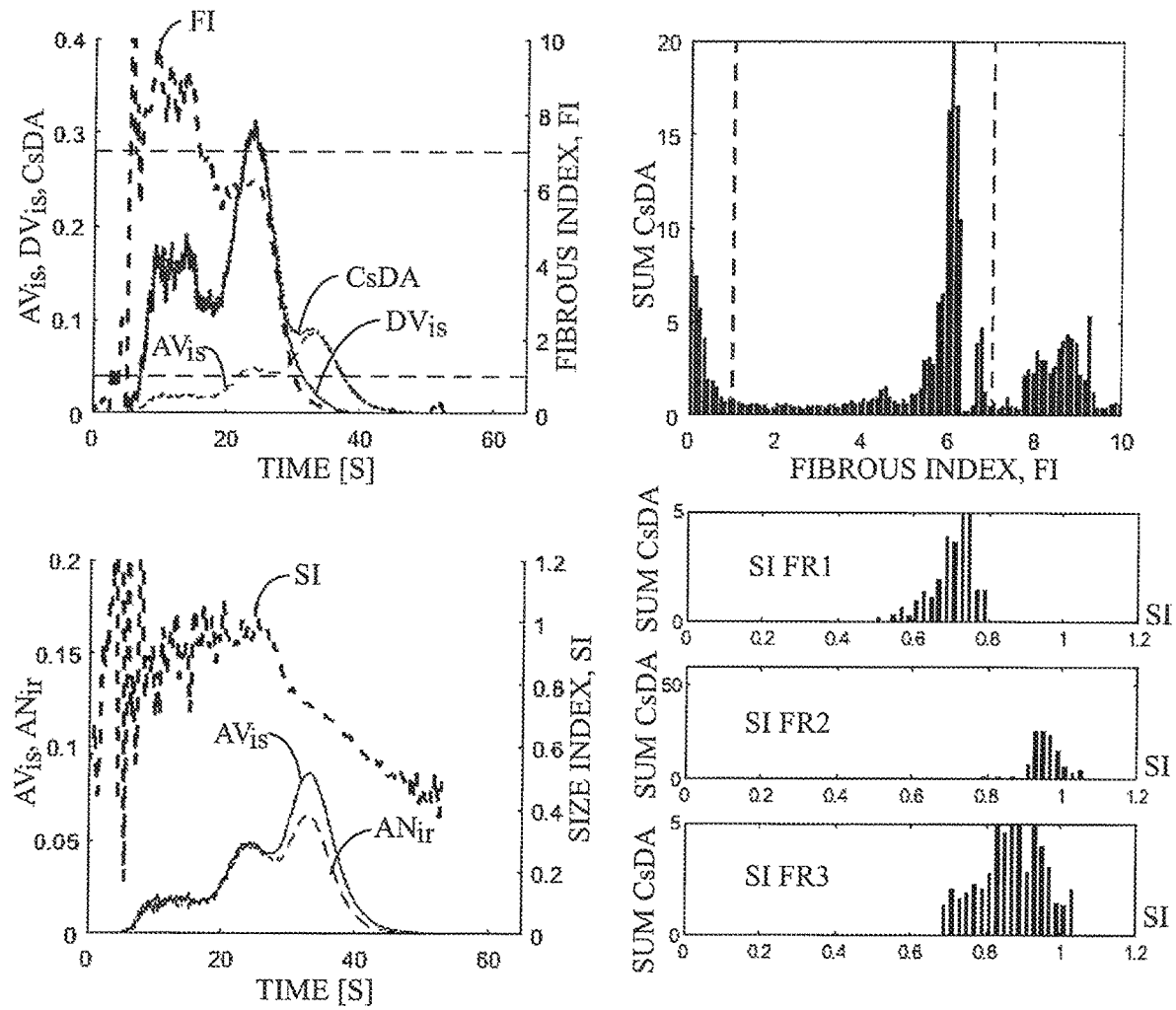
FIG. 32 illustrates an example of fractograms and distributions of pulp mixture containing 60% TMP and 40% eucalyptus pulp at total consistency of 0.3% Cs.

FIG. 32 illustrates examples of fractograms and distributions of pulp mixture containing 60% TMP and 40% eucalyptus pulp at total consistency of 0.3% Cs. In FIGS. 32 and 33 CsDA is presented as a function of the size index SI of the fractions FR1, FR2, FR3.

FIG. 33 illustrates examples of fractograms and distributions of pulp mixture containing half of 60% TMP and 40% eucalyptus pulp and half of kaolin at total consistency of 0.3% Cs.

Examine now dissolved lignin, black liquor. In the chemical pulp process, there is a significant need for measuring the quantity of lignin dissolved in black liquor in addition to the kappa number.

A test for measuring the lignin content of black liquor was carried out in which black liquor was added by 2.4% for original sample consisting 0% of black liquor.

Figure 34A:
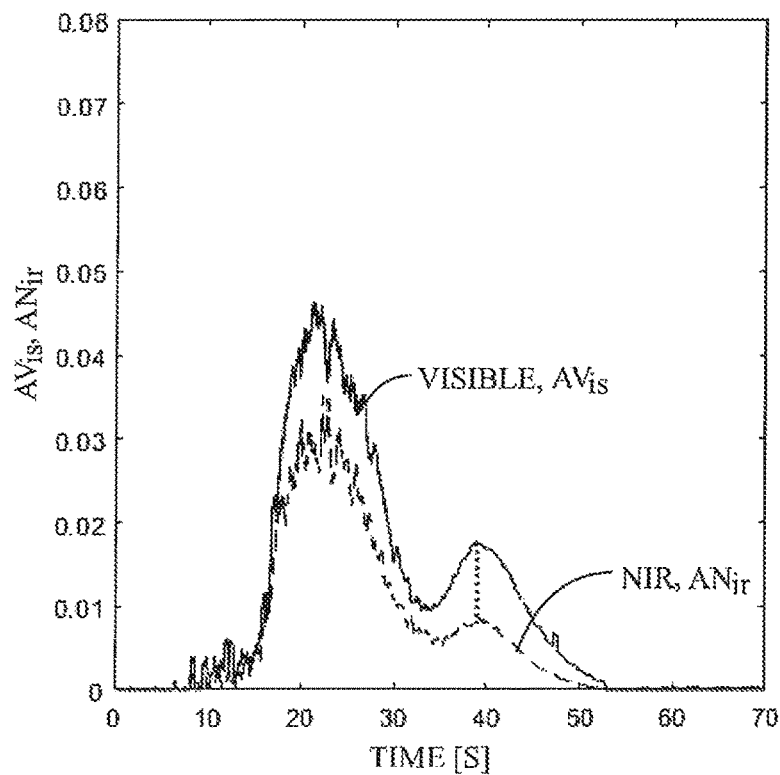
FIGS. 34A and 34B illustrate examples of an effect of black liquor on attenuation coefficient fractogram.
Figure 34B:
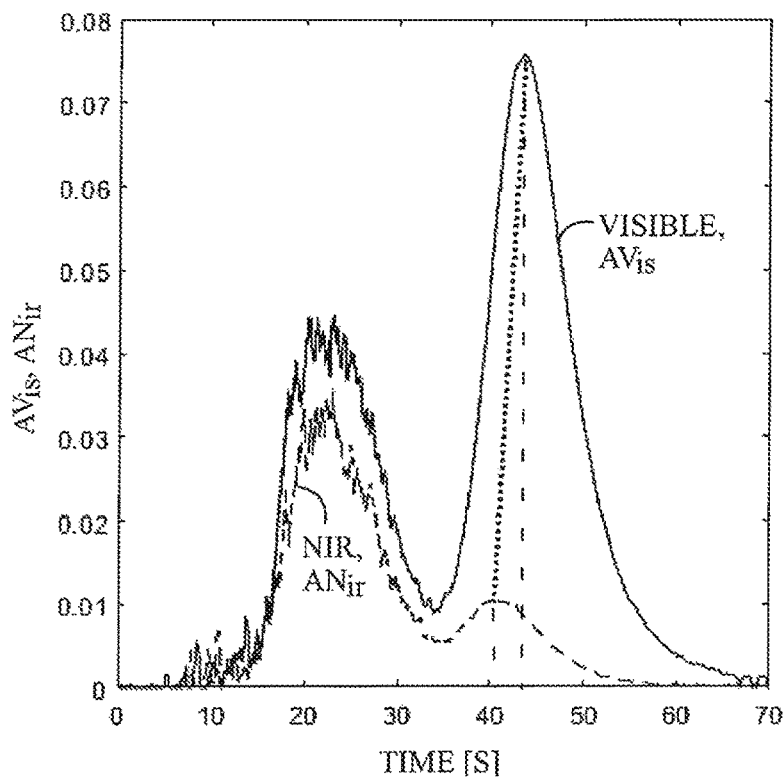

In an example of FIGS. 34A and 34B illustrate examples of an effect of black liquor on attenuation coefficient fractogram. FIG. 34A shows the original sample containing no black liquor, and FIG. 34B shows a sample containing 2.4% black liquor. ANir operating in the infrared range does not react so strongly to additions of black liquor as AVis of the blue wavelength in the visible range.

The peaks in the fines/black liquor content of the attenuation curves of sample containing no black liquor are set on both wavelengths at the same moment of time. When adding black liquor, the AVis peak is transferred to significantly later moments of time than the equivalent ANir peak (see the dashed line between the peaks). Based on sample containing no black liquor, it is possible to evaluate that the AVis attenuation caused by particles triggers a peak at the moment of 40 seconds and the quantity of particles decreases to zero at the moment of about 52 seconds. Sample containing lots of black liquor peaks at the moment of about 42 seconds. As the graphs show, the fines particles and the dissolved fluid overlap significantly in these measurements.

To be able to determine the size and quantity of particles and the concentration and quantity of dissolved material separately, attenuation changes caused by, on one hand, particles and, on the other hand, medium absorption need to be separated from each other. This is best implemented if particles and dissolved element may be separated in fractionation. Thus by means of scattering measurement combined with attenuation measurement or some other measured variable indicating the presence of particles, it may be possible to determine if the attenuation at the flow point in question describes the quantity of particles or the quantity of dissolved material.

The properties of the dissolved material may in this case even be determined by means of spectroscopy or other suitable methods describing material properties. These properties may used to identify various material components.

If the fractions of fines and dissolved material are overlapping after fractionation, the content of materials affecting attenuation may be classified utilizing a known fines size distribution and attenuation on different wavelengths.

Whereas the attenuation coefficient values are mutually subtractable, the difference between the black liquor samples and the original sample may be considered to significantly describe the attenuation caused by black liquor.

By using even longer NIR wavelengths instead of the currently used ANir wavelength, it is possible to find a wavelength that reacts in a limited manner or does not react to lignin at all but only to, for example, particles. The attenuation signal of the longer wavelength thus serves as a measurement indicating solids and the attenuation of the shorter wavelength reacts both to solids and dissolved material. If in such a case the effect of fines on the AVis signal in relation to the ANir signal is known, it may be possible to calculate by means of the ANir signal the share of the AVis signal that originates from fines particles. The rest of the AVis signal may then be interpreted absorption caused by black liquor or some other material dissolved in fluid. In this case, it would be useful to know the response of the pure fines fraction, and the fractionation should be stable in relation to flow. The size distribution of the fines fraction is often quite constant in chemical pulp processes, which may enable utilizing such a calculation method.

It may also be possible to use other measurements for identifying the fines fraction, such as e.g. scattering measurement which indicated the presence of fines. If no scattering is detected in the measurement, it may be interpreted that the attenuation at the moment of measurement signal is significantly formed from absorption produced by dissolved material.

Advantages in chemical pulp process measurement can be summoned as follows.

Fractionation enables washing the sample in the fractionating tube 10 for the kappa number measurement. This may replace separate washing units in the measurement and pure fibers in a water suspension may be obtained for the kappa number measurement.

Lignin content measurement of the solution is enabled.

Effective fractionation also enables measurement of a separate fines kappa number.

A test related to measurements in the de-inking process included samples taken from four different points of the flotation process. There were 3-4 parallel samples from all sample points. According to the measurements, changes mainly occur in the fines fraction.

4 parallel samples from primary flotation accept-position 3 parallel samples from primary flotation feed-position 3 parallel samples from secondary flotation accept-position 3 parallel samples of final pulp The changes in the size index of fines fraction FR1 seem to be more stable than that of fibers. The size of fines particles decreases until the accept of the secondary flotation and increases in the final pulp. The changes in the mean gravity center values of the size index of the fines fraction may be due either to the removal of small particles from the fines fraction or to material being transferred from the fiber fraction to the fines fraction along with refining. The higher fines content of the final pulp may be caused by screening before bleaching, in which, the smallest particles are removed from the pulp.

Figure 35:
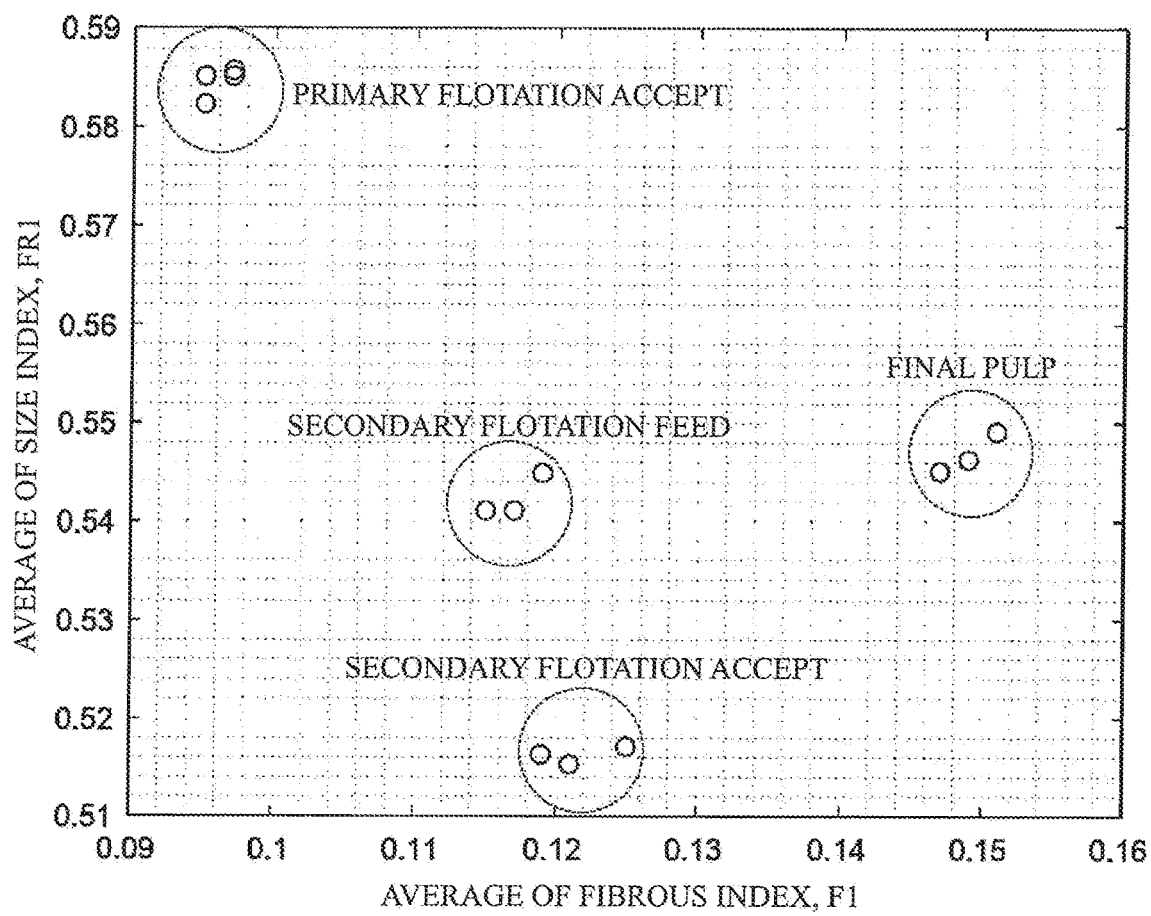
FIG. 35 illustrates an example of changes in size index of fines fraction as function of fibrous index.

FIG. 35 illustrates an example of changes in size index of fines fraction as function of fibrous index. The y-axis is an average of the size index SI, and the x-axis is the fibrous index FI. The gravity centers of the size index and an average of the fibrous index of the fines fraction FR1 of various phases of the process in relation to each other are shown. As the flotation proceeds, the particle size of the fines decreases and fibrousness increases. The increase in fibrousness may be caused by the flotation removing larger non-fibrous ink and dirt particles more than smaller cellulose-containing particles. The increase in fibrousness and size index of the final pulp are possibly due to screening before bleaching, in which, the finest fines are removed from the pulp.

Figure 36:
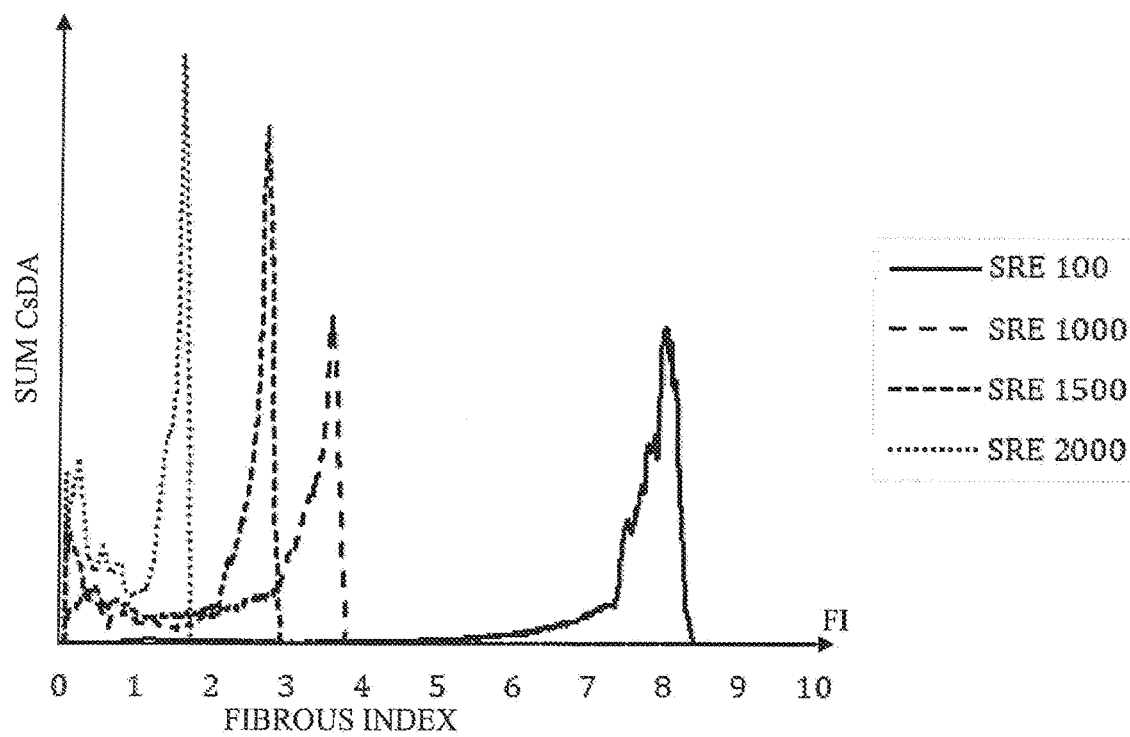
FIG. 36 illustrates an example of the fibrous index at different refining intensities.

Examine now refining effects. In this test, the effect of refining intensity on particle properties was studied. FIG. 36 illustrates an example of the fibrous index at different refining intensities. The y-axis represents SUM CsDA in an arbitrary scale and the x-axis is the fibrous index FI. The fibrous index distributions of unrefined pulp and pulp refined by three different refining intensities are shown. The fibrous index distribution reacts to the changes in refining intensity.

Figure 37:
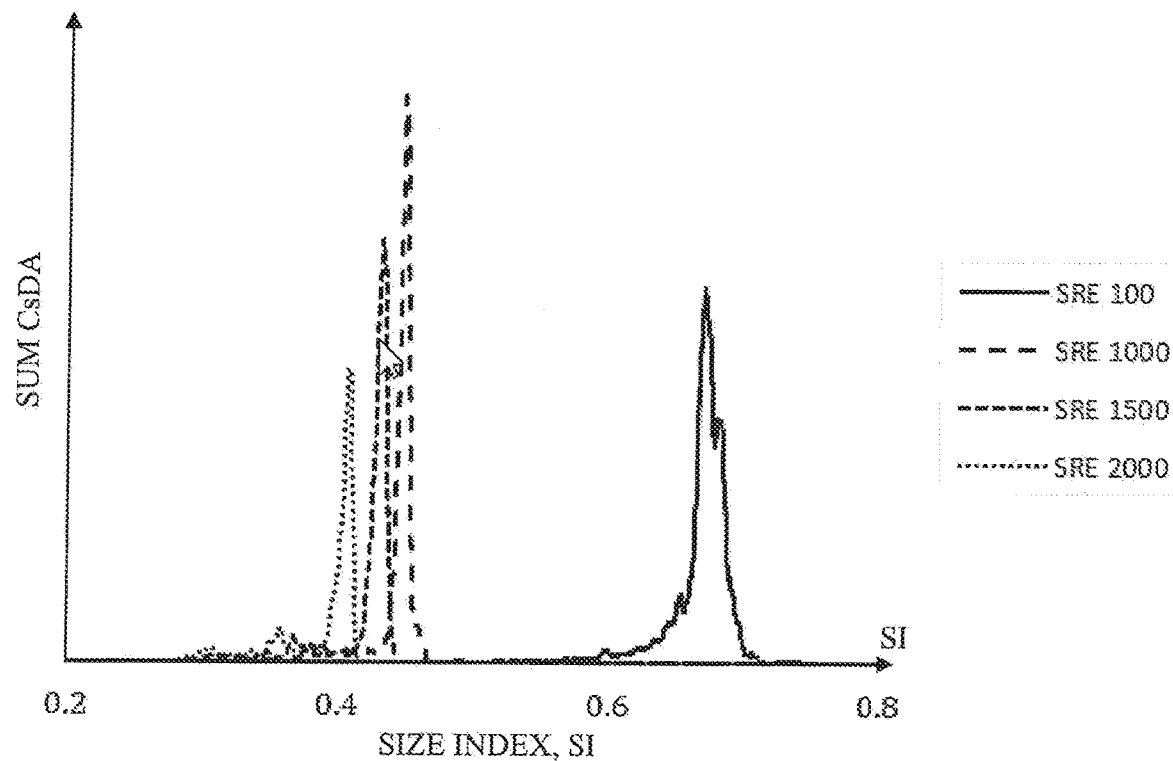
FIG. 37 illustrates an example of the size index distribution at different refining intensities.

FIG. 37 illustrates an example of the size index distribution at different refining intensities. The y-axis represents SUM CsDA in an arbitrary scale and the y-axis is the size index SI. The size index distributions of unrefined pulp and pulp refined by three different refining intensities are shown.

The size index of particles changes as expected: the more power used for refining, the more fragmented the particles.

Figure 38:
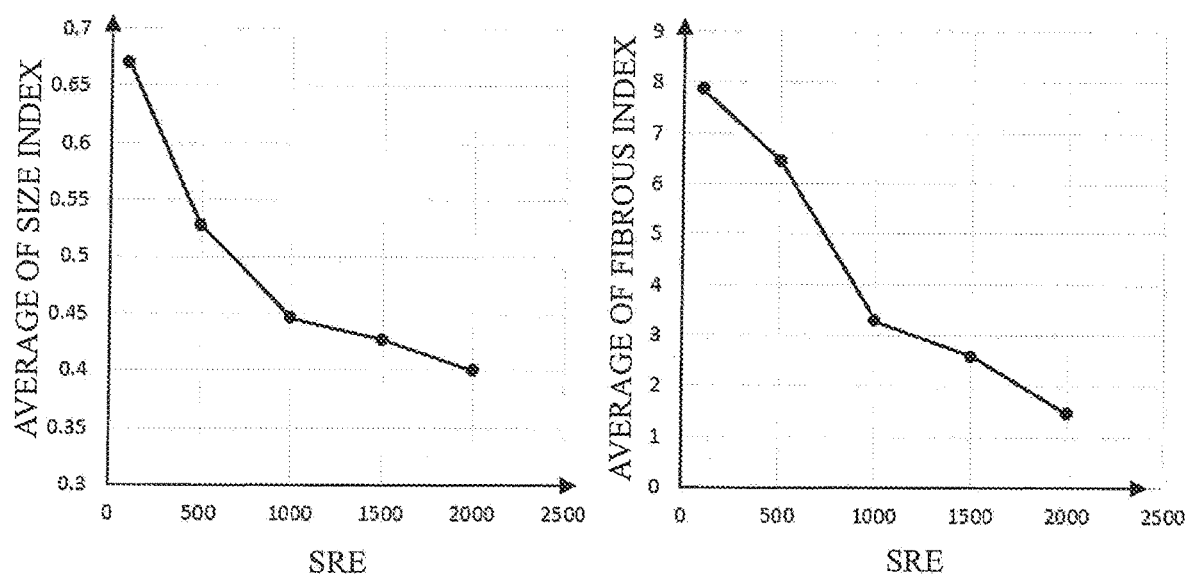
FIG. 38 illustrates an example of refining intensity on size index and fibrous index.

FIG. 38 illustrates an example of effect of refining intensity SRE, which refers to Specific Refining Energy, on size index SI and fibrous index FI. Both the size index and the fibrous index decrease with increasing SRE.

Fractionation also enables the monitoring of fiber refining based on fibrousness (fibrillation), fines accumulation and probably also on fines quality and fiber wall width.

Examine now nanomaterial measurements as an embodiment. There is an increasing need for measuring micro- and nano-sized particles. As nano-sized particles cannot be seen by normal light microscopes, particle analyses are typically performed by time-consuming electron microscopy.

The measurements described below are performed by a microfractionator with a fractionating tube 10 of the diameter of approximately 5 mm.

Figure 39:
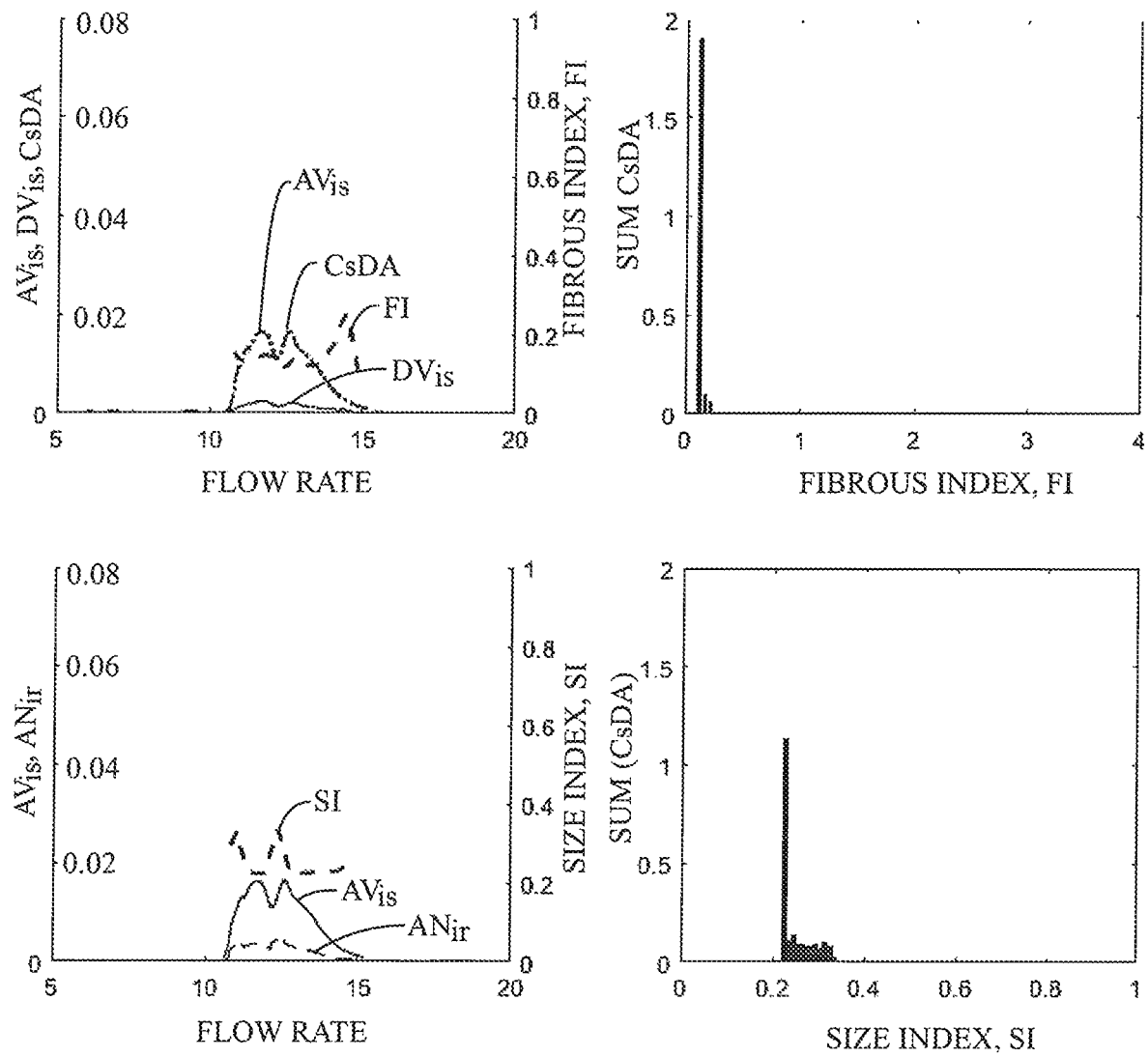
FIG. 39 illustrates an example of fractograms and distributions of well-mixed dissolving pulp sample.

FIG. 39 illustrates an example of fractograms and distributions of well-mixed dissolving pulp sample. In the diagram on the upper left, the x-axis is flow rate, the y-axis is and at the right side the fibrous index FI. In the diagram on the lower left, the x-axis is flow rate, the y-axis at the left is, and the right side the size index SI. In the diagram on the upper right, the x-axis is the fibrous index FI and the y-axis is the sum of CsDAs. In the diagram upper right, the bars refer to the fraction FR1 only because other fractions FR3 and FR2 are non-existent or exist only marginally. In the diagram lower right, the bars refer to the fines only because fibers are non-existent or exist only marginally.

The fractograms and distributions of a dissolved pulp sample containing purely nanomaterial and have been mixed well before the measurement. The fibrous index appears in the range 0.1 . . . 0.2, i.e. quite low. The values of the size index distribution are also very low, at 0.2 . . . 0.35. The highest peak is at a value of below 0.25. This indicates extremely small particle size.

Figure 40:
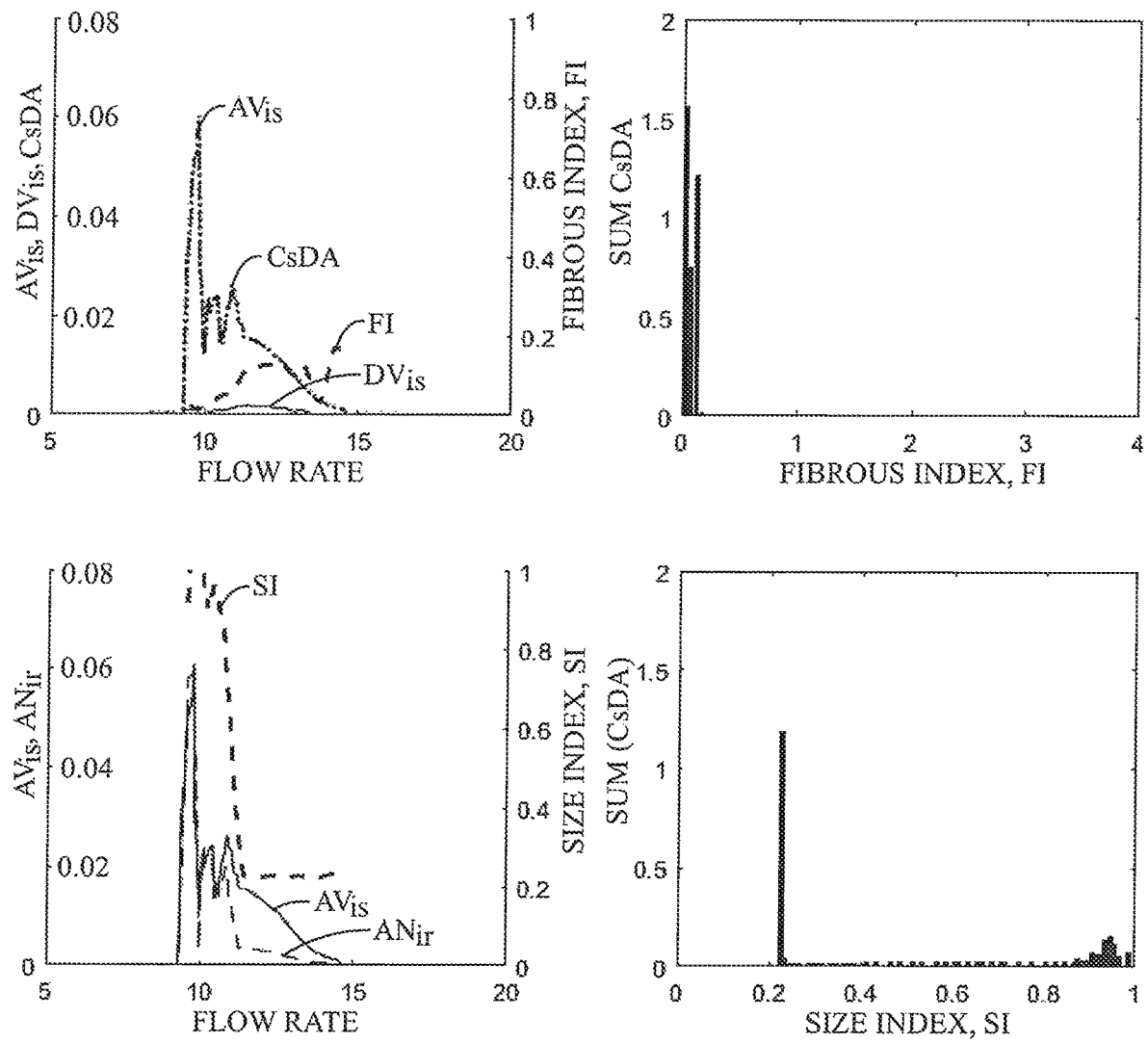
FIG. 40 illustrates an example of where the same sample is poorly mixed.

In an example of FIG. 40 illustrates an example where the same sample is poorly mixed. In the diagram on the upper left, the x-axis is flow rate, the y-axis at the left is and at the right side the fibrous index FI. In the diagram on the lower left, the x-axis is flow rate, the y-axis at the left is, and the right side the size index SI. In the diagram upper right, the bars refer to the fraction FR1 only because other fractions FR3 and FR2 are non-existent or exist only marginally. In the diagram lower right, the bars refer to the fines only because fibers are non-existent or exist only marginally.

Here, the particles are not totally separate from each other and the agglomerates are clearly detectable in the size index distribution. The distribution peaks at point 0.25, but the distribution continues until value 1 of the size index. A particle or agglomerate appearing in this range is probably in the micrometer size range.

Figure 41:
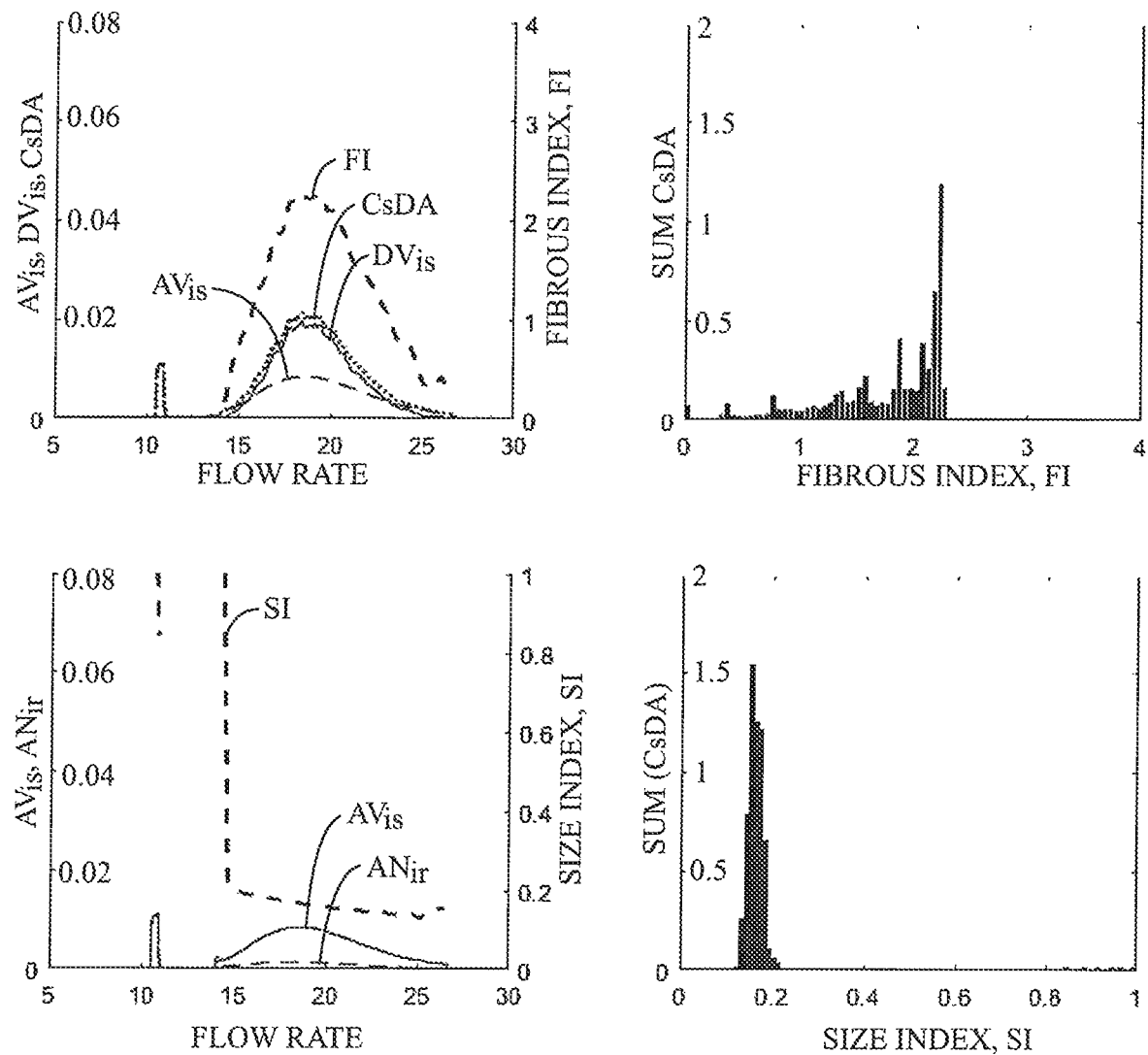
FIG. 41 illustrates an example of fractograms and distributions of nanocrystal sample.

In an example of FIG. 41 illustrates an example of fractograms and distributions of nanocrystal sample.

In the diagram on the upper left, the x-axis is time (in seconds), the y-axis at the left is and at the right side the fibrous index FI. In the diagram on the lower left, the x-axis is flow rate, the y-axis at the left is, and the right side the size index SI. Like in FIG. 40, the bars of the diagrams on the upper right refer to the fraction FR1 only because other fractions FR3 and FR2 are non-existent or exist only marginally. In the diagram lower right, the bars refer to the fines only because fibers are non-existent or exist only marginally.

The width of the crystals is in the nanometer range and their length some hundreds of nanometers. The size distribution of this sample is in the range below 0.2. Here, the dimension primarily affecting the measurement may probably be the nanocrystal length. If the measurement wavelength is sufficiently shortened, the crystal width data may also be obtained, although, for this, extremely short wavelengths are required.

Here, the strong effect of polarization, which increases the fibrous index values, is particularly interesting. This enables the measurement of the crystallinity of nanocrystals, for which, there is also a significant need.

For nanomaterials, the size index may be used as the primary measurement, in relation to which other properties, such as crystallinity, may be evaluated by means of polarization or e.g. the presence of fluorescent components in the sample by fluorescence measurements. Other measurements describing sample properties may, naturally, also be used as primary or secondary measurements.

Examine now applications of the presented measurements in other industries. Such applications can be considered embodiments of the measurements of this document. In addition to pulp and paper manufacture, also other processes in the mechanical process industry, such as e.g. the mining and minerals industry, recycling industry, food industry, pharmaceutical industry, and environmental technology industry, require particle size distributions and measurements indicating particle concentration. Tube flow fractionation and the related calculation method described in this report are applicable in these industries. In addition to size distribution, measurement of other property distributions is also possible using the methods described in this document.

The calculation method considering the properties of particles or fluid simplifies the technical structure and makes measuring results more robust. This enables the application of tube flow fractionation for measuring very diverse samples.

In principle, it is possible to fractionate any sample containing particles. There is no need for the sample to be a suspension or dispersion; it is possible to dose e.g. various powders into the fractionation fluid. If the dosing volume or mass may be standardized, the measurement may be used for measuring contents or concentrations. However, these require the consideration of many practical conditions.

In addition to fluid media, tube flow fractionation may be implemented using air flow or other types of gas flow for measuring dry samples. The calculation method described in this report is also applicable to gas flow based fractionation. It is possible to apply the presented measurements in environmental observations. A large proportion of environmental measurements are water-based. The measurement of the humus content of natural waters, for example, poses significant challenges. Humus may occur as agglomerates of different sizes, presenting problems particularly for traditional optical online methods in measuring whole samples. Measurement utilizing fractionation and quality classification would create a new scope for the measurement via the size distribution of humus agglomerates. In addition to classification based on size index, the measurement methods could include e.g. fluorescence measurement for determining aromatic components.

Measuring substances dissolved in waters often requires particle-free samples, which are particularly difficult to obtain in online measurements. Fractionation creates a particle-free sample, thus enabling measurement of the content of diluted substances.

The condition of natural waters and waste waters is monitored, for example, by various zooplankton and phytoplankton analyses. Such samples containing plankton could be classified fractionated according to size index and reference measurements into different classes describing the condition of water. Reference measurements could include e.g. fluorescence measurement. Some plankton organisms are too small to be detected by light microscopy. However, it should be possible by size index measurement based on light attenuation in its own fraction.

Fractionation based measurement is required in the measurement of both industrial and municipal wastewaters. Fractionation pretreatment may be used in analyzing particle size in the flocculation process and the dosage of flocculants may be adjusted based these particle size data. On the other hand, polymer overdosage is indicated by the signal produced by free polymer in the size index distribution when considering extremely small particles.

Measurement of oxygen demand is an important aspect of nutrient loading analysis. These measurements require particle-free samples which are difficult to obtain in field conditions. Fractionation may make at least part of the fractogram particle-free, whereby the share of particle-free dissolved material of the fractogram is measurable.

Fractionation measurement may also be used in tackling the current major global issue of microplastic loading of different waters or sediments. Particles of many size classes are considered microplastics. The most problematic to measure are the smallest particles, some of which measure less than a micrometer in size, and are not visible under a light microscope. Separating these particles by fractionation and applying e. g. size index based measurement enable the production of size distribution data on samples containing microplastics. It is also possible to identify microplastic fractions e.g. by fluorescence measurements.

Minerals may also be measured utilizing what is taught in this document. Particle size distribution measurement based on tube flow fractionation together with possible secondary measurements may be utilized in the grinding, classification, concentration and granulation of minerals. Particularly, examining suspensions containing small particles is possible and provides additional value. Particle size distribution data facilitates control of processes and evaluating the success or recovery of partial processes.

For example, the manufacturing process of precipitated calcium carbonate (PCC) used as fillers may be intensified utilizing particle size distribution data.

Additionally, food industry may also benefit from these kind of measurements. Namely, numerous particle size distribution measurement needs may be met by fractioning preparation in the food industry.

In milk processes, monitoring of e.g. fat breakdown may be performed by fractionation measurement. Other measurable characteristic data include the quantity and size distribution of casein micelles. Processing milk into cheese is also a process that may utilize particle size distribution data. In addition to size distribution, dissolved materials are also measurable in a similar way to measurements in the pulp and paper industry. Fractionation based measurements describing properties and quantities may also be applied in several other areas of the food industry. For example, refractive index measurement, either on its own or combined with some other measurements, for measuring saccharides is a potential application.

Furthermore, measurements in oil industry may be performed in the manner described in this document. In oil industry processes, there are numerous applications where the fractioning measurement method is applicable. Fractionation may be utilized for separating different fractions the properties and quantities of which may be measured for most parts. The indication and size distribution analysis of particles in oil is enabled by fractioning measurement.

Similarly, this methodology has interesting potential in the measurement and control of the pyrolysis process and in pharmaceutical and health industry. In the pharmaceutical industry, there is considerable need for size distribution measurement, particularly for the detection and analysis of nanomaterials.

When measuring various human and animal blood, urine etc. samples, it is possible to apply fractionation, particularly at the micro scale.

Fractionation may be applied in the size distribution and color measurements of paint or printing color pigments as well as many other analyses in the paint and printing industry.

An advantage of the method is that a quick overview of the particle size distribution of the sample is obtained with a small sample size, which enables monitoring production processes in real time.

Examine now future possibilities. The measurements described in this document were mainly implemented utilizing light attenuation and depolarization.

In fiber measurements, the fibrous index based on polarity level reversal is a usable basic signal, which may be supported by size index calculation based on spectral attenuation. In addition to these, measurements based on the scattering intensity of light present other viable possibilities in detection of detecting technologies.

By means of scattering intensity, it may be possible to indicate if attenuation changes occurring in the measurement are due to a scatter change caused by particle changes or to absorption caused by dissolved material. On the other hand, spectrally implemented measurement of scattering intensity enables the measurement of absorption changes in the surface or internal structure of particles. In pulp and paper samples, absorption changes in the particle surface describe e.g. the brightness of fibers or the modified kappa number in pulp digestion. The measurement of scattering intensity may be based on measuring diffuse reflection or direct scattering intensity.

A potential optical measuring technology may be a measurement based on the fluorescence of light. The fluorescence effect may be utilized e.g. when measuring lignin quantity supporting attenuation and scattering or as its own measurement. Another possible application of fluorescence is the indication and quantity measurement of optical brighteners. It is also possible to utilize fluorescence in identifying and measuring different grades of plastic particularly in the area of microplastics analysis.

The use of a flow cuvette enables the application of many other measurement technologies. Optical measurements may include e.g. diffractive methods based on light interference, methods based on the Raman effect and scanning methods. Methods based on the attenuation, scattering, diffraction and delay changes of microwaves and soundwaves are also possible.

Other possible detection technologies include also laser diffraction and charge measurements.

The sensitivity of the optical (present) measurements may be improved, in an embodiment, by utilizing measurement optics measuring as large an area as possible. This decreases measuring noise caused by flow. If it is possible to use a slow flow at the moment of measurement, very stable measurements may be obtained even with difficult samples. Furthermore, carrying out measurement as simultaneously as possible with different signals significantly decreases noise. A challenge in fractionation is the similar fractionation of fillers and wood-based fines of the same dimensions and, thus, their simultaneous arrival at measurement. These particles, different from each other, yet under the measurement at the same time, cannot be easily distinguished from each other, whereby the obtained measurement describes the mean properties and quantity of these particle classes.

In the paper industry, there is a particularly strong need for separate measurements for filler consistency and wood-based fines consistency. Similar needs may also be in other industries.

To solve this problem, it may be possible, in an embodiment, to utilize the differences in specific weights of the particles. For example, the start section of the fractioning tube 10 is installed vertically upwards, whereby the lighter fines particles in the flow travel faster than the heavy filler particles in the flow direction. If necessary, return downwards is implemented by a tube spiral, whereby the mutual relation between the force vector parallel with the flow and the gravitational force vector controls the heavier particles on the edge of the fractionating tube 10 and thus to the slowest flow. The heavy filler particles thus arrive separately from the fines fraction and they may thus also be measured as a separate fraction.

In an embodiment, another possible approach may be to install a fractioning tube coil horizontally such that the flow occurs perpendicular to the direction of gravity. Gravity thus draws heavier particles towards the tube wall and thus to the slower flow.

In order to accelerate fractionation and achieve better separation, it may be possible to use a more viscous medium than water, e.g. ethanol, in an embodiment. This may also be implemented such that the more viscous medium is solely in the part of the fractionating tube 10 where the sample travels, and the rest of the fractionating tube 10 may be water-filled. In this case, the water pushes the ethanol and the sample in it forwards. Actual fractionation thus occurs in the ethanol environment.

Using refractive index adjustment in an embodiment, it is possible to decipher the refractive index of a particle. Particles are immersed in fluids of certain refractive indices and measured by a measurement comparable with scattering. A sample, in which the refractive index of the fluid is close to the refractive index of the particles, produces the lowest scattering. This is visible as a low scattering intensity or low attenuation value. The refractive index of fluid implementing the scattering minimum equals the refractive index of the particles.

The immersion method does not work for samples that contain particles with different refractive indices as these confuse the measurement.

Fractionation may be utilized in separating particles with different refractive indices according to different moments of time in the flow. If fractionation is performed in a fluid with an equivalent refractive index to specific particles, these particles may be made invisible in the measurement with respect to scattering. In such a case, the only thing affecting the measurement is absorption possibly differing from the fluid. For example, by adjusting the refractive index of fractionation fluid to correspond to the refractive index of wood-based fines, it is possible to make filler particles arriving at the same time as these fines visible without the simultaneous effect of the fines.

The immersion method still requires the adjustment of the refraction index of water or other fluid in the sample either by changing the water or by adding a component adjusting the refractive index to the fluid. The immersion method is better suited for originally dry samples than for wet samples.

Particles in samples often adhere to each other in clumps for a number of reasons. In many processes, e.g. paper machine retention adjustment, de-inking of recycled pulp by flotation or waste water flocculation, these agglomerates or flocs may be promoted by various chemicals. In some situations, particles produce agglomerations naturally.

The strength of the bonds causing these agglomerations is often important data with respect to process management or follow-up.

In tube flow fractionation, water turbulence disperses the particle agglomerations. The stronger the bonds, the stronger the turbulence needed to break them. This effect may be utilized e.g. by performing separate fractionations of a given sample in different flow conditions. In an embodiment, the flow conditions may be adjusted by changing the flow rate, fluid temperature or fluid viscosity in the fractioning tube 10. Furthermore, the turbulence that breaks up bonds may be adjusted e.g. by using tubes of different shapes, reducers, flow elbows or changes in the internal part of the fractionating tube 10. The material choice of the internal surface of the fractionating tube 10 may also affect the friction coefficient of the tube wall, which again has an effect on turbulence and, through that, fractionation.

Figure 42:
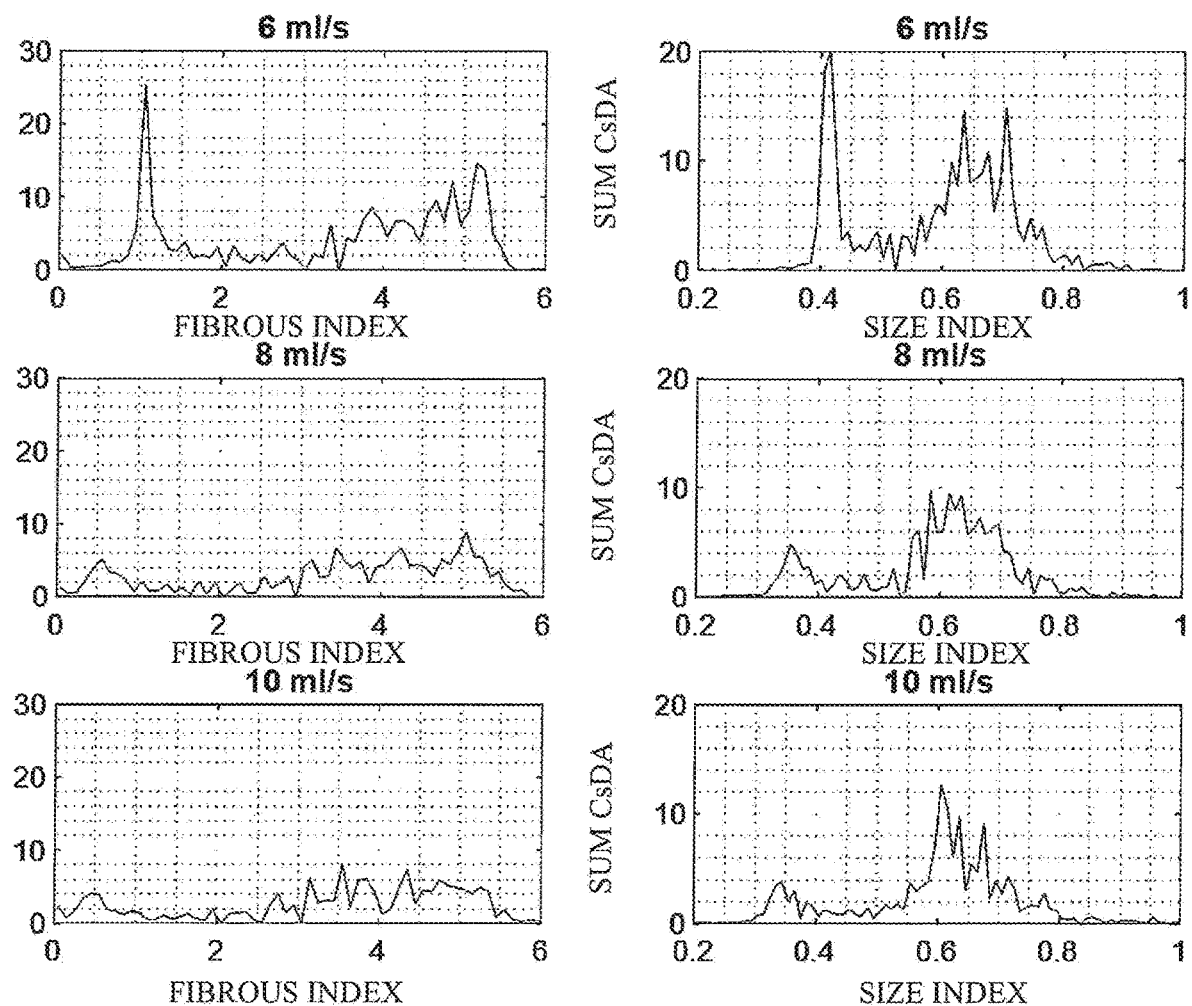
FIG. 42 illustrates an example of fibrous and size indices of refined chemical pulp at different fractioning rates.

FIG. 42 illustrates an example of fibrous and size indices of refined chemical pulp at different fractioning rates. This is a test result for a chemical pulp. The y-axis is SUM CsDA and the x-axis is the fibrous index (left) or size index (right). The sample includes micro-sized and even nano-sized materials. The sample was fractionated by three different rotational speeds of the pump and the same three flow rates. The results show that significant changes in particle size occur particularly in the fines fraction. With a slow flow rate of 6 ml/s, the fines are in a size grade with a size index peak value of 0.42. Similarly, the fibrous index has a significant peak at value 1 and there is no significant signal below it. When accelerating the flow, the fines distribution becomes shallower and reaches significantly lower size index values, all the way down to 0.35, which means extremely small particles. From this, it is possible to deduce that fines particles have a tendency to agglomerate with each other and this agglomeration sensitivity, and partially the strength of the bonds, may be measured by fractionating parallel samples of the same pulp with different flow rates. Another detectable change is the slight move in the size and fibrous index distribution of the fiber fraction towards small particles. This is probably due to the adhesion of small particles on the surface of fibers and remaining in the fibers with a low flow rate. However, the fines detach from the fibers when the flow rate is increased. Agglomeration may be seen to have a similar effect on both the size index distribution and the fibrous distribution.

These effects may stand out in the distribution figures produced by the new calculation method. In traditional fraction distributions based on flow, these are difficult to distinguish.

FIG. 42 illustrates examples of fibrous and size indices of refined chemical pulp at different fractioning rates. The x-axis is fibrous index and the y-axis is SUM CsDA.

Figure 43:
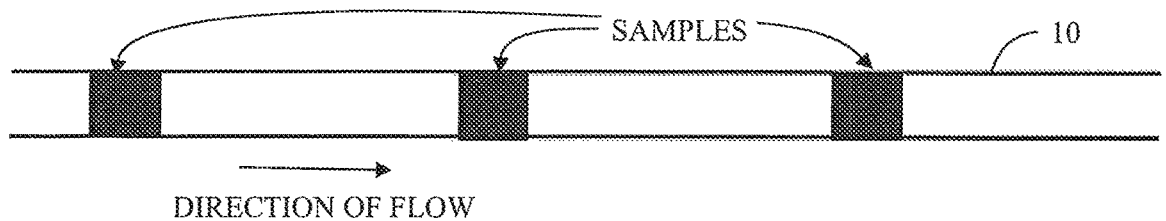
FIG. 43 illustrates an example of positions of multiple samples in the fractionating tube at one moment during fractionation.

In an embodiment an example of which is illustrated in FIG. 43, the statistical significance of fractionation measurement may be improved by feeding several samples into the fractioning tube 10 successively, while ensuring that there is sufficient space for the samples to fractionate without becoming mixed up with the neighboring samples. The statistical significance of the distributions of these samples may be improved by summing them up or taking a mean value of them. The black areas in the top part of FIG. 43 illustrate the positioning of multiple samples in the fractionating tube 10 during fractionation. The particle size distribution of the samples takes place by the flow in the fractionating tube 10.

In order to achieve constant flow at the moment of measurement, the feeding of the samples may be synchronized based on the measurement signal. Every time the measurement identifies water between the measured samples, a new sample may be fed at the start end of the fractioning tube 10. Although the flow always stops at the point of each new sample, this does not disturb the measurement. It is advantageous for the flow to be stabilize, so that the same flow rate prevails during measurements.

Figure 44:
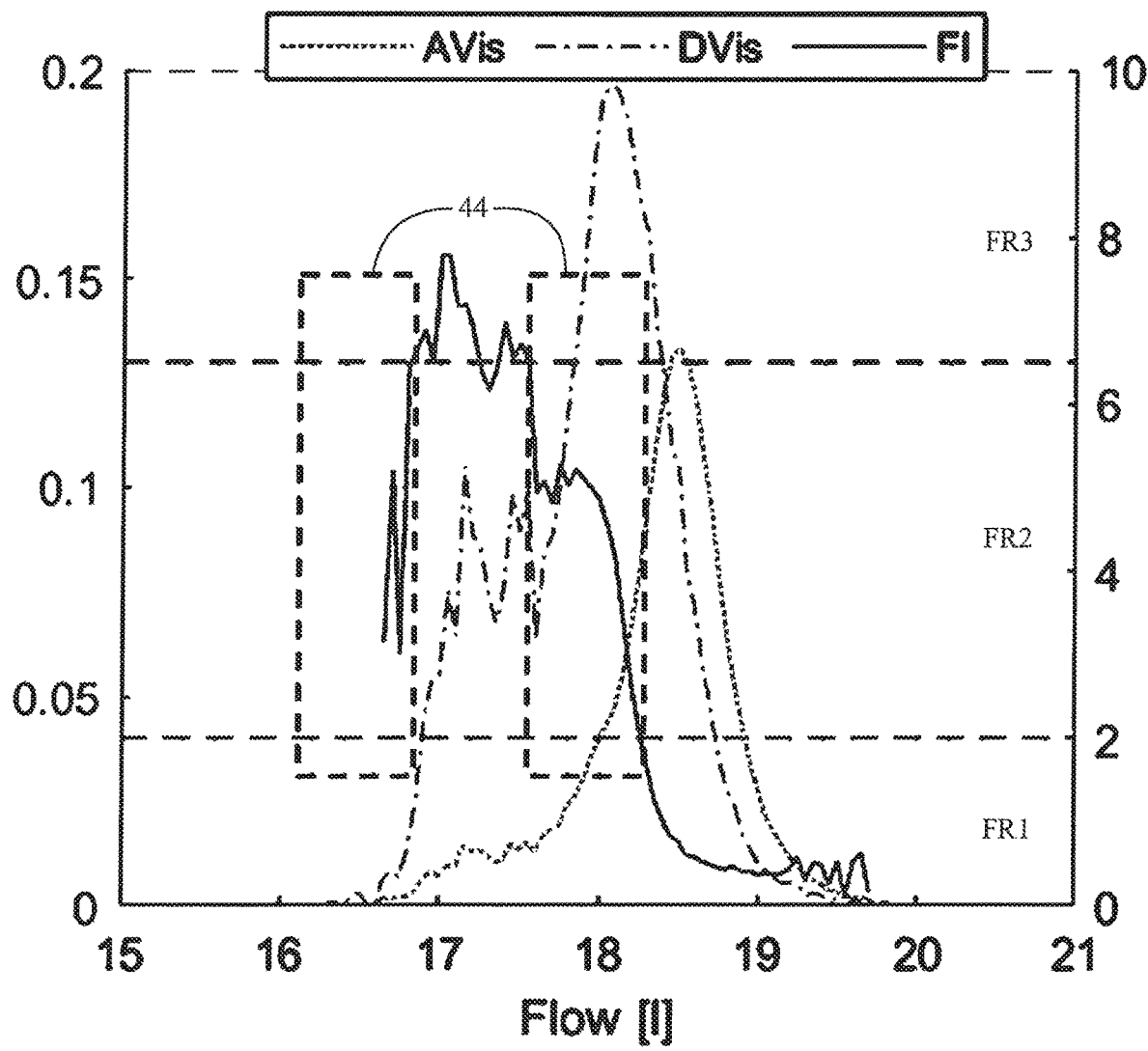
FIG. 44 illustrates an example of where flocs and short fibers are separated based on their arrival order.

FIG. 44 illustrates an example where flocs and short fibers are separated based on their arrival order. In the example of FIG. 44, the sample was divided into three fractions based on their fibrous index. The fraction ranges are FR1=0-2, FR2=2-6.5 and FR3=6.5-10. Material accumulates in medium fraction FR2 at different moments in relation to the flow. These times are demarked by the dashed rectangles 44 in FIG. 44. At the beginning, in the range below 17 liters, the material consists of large-sized fiber bundles. Next, in the 16.8-17.6 liter range, pure fibers classified in fraction FR3 arrive. After this in the 17.6-18.5 liter range, the arriving material consists of smaller fibers among which there may also be non-fibrous material. The accumulation produced by these two materials which are different from each other and limited by the dashed rectangles 44 appears in the distribution in the same fibrous index range even though they are very different in terms of their properties. If necessary, these materials may be separated into their own fractions by considering the arrival order of the fractions. Considering the arrival order does not require liter quantity information. However, if the measurement is performed with an apparatus in which the flow has been stabilized and the flow quantity is known, it may be utilized in separating fractions.

Figure 49:
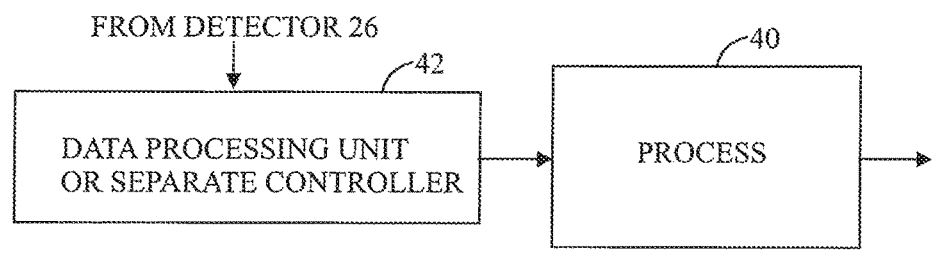
FIG. 49 illustrates an example of a control arrangement.

A process control apparatus, which may be the same as the data processing unit 24 in FIGS. 46 and 47 or a separate controller of the process may be used for controlling a process measured using flowing suspension, receives process information from a measurement apparatus for measuring suspension flowing in the tube fractionator (see FIG. 49). The measurement apparatus comprises a radiation source that directs wave motion to the flowing suspension, a flow of the flowing suspension causing particles of the flowing suspension to be sorted on the basis of their sizes. A measuring arrangement measures first values of a first parameter of the wave motion interacted with the flowing suspension at a first wavelength band of the wave motion. The measuring arrangement measures second values of the at least one of following: a second parameter of the wave motion interacted with the flowing suspension, and the first parameter of the wave motion interacted with the flowing suspension at a second wavelength band of the wave motion, the measurement of the first values and the second values being synchronized with each other. The measuring arrangement forms at least one comparison, each comparison relating to one of the first values and one of the second values. The measuring arrangement forms a distribution, which has at least one of the first values as a function of one of the comparisons, as the process information. Then the process control apparatus controls the process on the basis of the process information.

Figure 45:
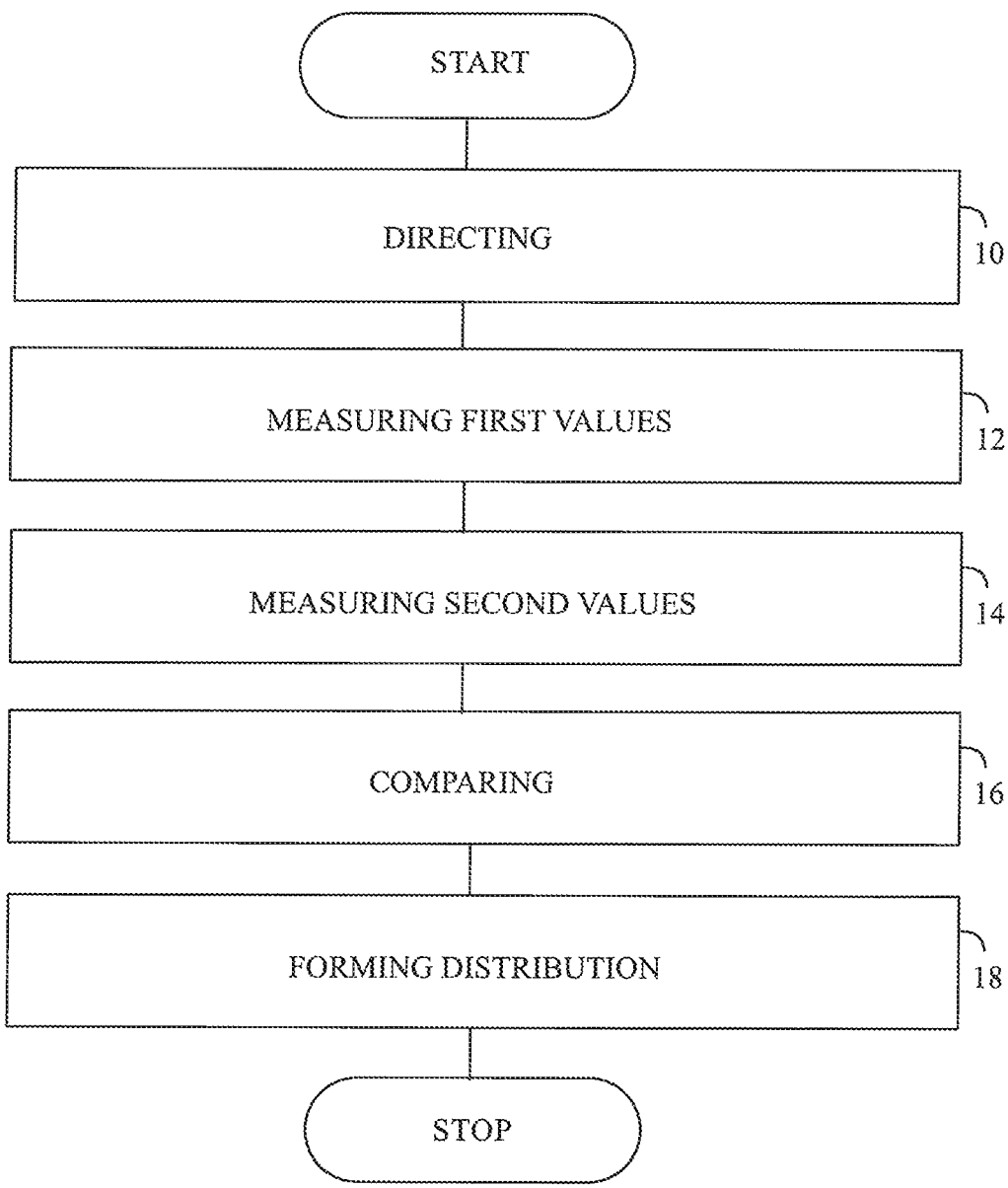
FIG. 45 illustrates an example of a flow chart of flowing suspension.

In a method of measuring flowing suspension which is illustrated in FIG. 45, wave motion is directed in step 10 to the flowing suspension, a flow of the flowing suspension causing particles of the flowing suspension to be sorted on the basis of their sizes. First values of a first parameter of the wave motion interacted with the flowing suspension is measured at a first wavelength band of the wave motion in step 12. Second values of the at least one of following are measured in step 14: a second parameter of the wave motion interacted with the flowing suspension, and the first parameter of the wave motion interacted with the flowing suspension at a second wavelength band of the wave motion, the measurement of the first values and the second values being synchronized with each other. At least one comparison is formed in step 16, each comparison relating to one of the first values and one of the second values. A distribution, which has at least one of first values as a function of one of the comparisons, is formed in step 18 for replacing a representation of attenuations with respect to consistency in order to avoid the dependency on the flow and/or time.

In an embodiment, the first values of the first parameter that depends on a consistency of the flowing suspension may be measured. the at least one comparison that depends on physical properties of the particles of the flowing suspension may be formed.

In an embodiment, a tube flow fractionator may be used, within which the flowing suspension flows.

In an embodiment, electromagnetic radiation may be directed to the flowing suspension, the radiation comprising at least one beam that is polarized or a plurality of beams at least one of which is polarized and at least one separate beam is non-polarized. Attenuations of the electromagnetic radiation interacted with the flowing suspension may be measured. Parameters of polarization of the electromagnetic radiation interacted with the suspension may be measured, the measurements of attenuations and the parameters of polarization being synchronized. Comparisons of the parameters of polarization and the attenuations may be formed, each of the parameters and each of the attenuations of a comparison corresponding to each other on the basis of synchronization. The attenuations may be distributed with respect to the comparisons.

In an embodiment, size indices may be formed by comparing the attenuations of the different wavelengths interacted with a same section of the flowing suspension with each other.

In an embodiment, each of the parameters of polarization may be measured by measuring a degree of polarization or a degree of depolarization.

In an embodiment, optical radiation may be directed to the flowing suspension, the optical radiation comprising at least one beam of polarized optical radiation or a plurality of beams at least one of which is polarized and at least one separate beam is non-polarized.

In an embodiment, the sum of the size indices may be corrected by an Euclidean distance of the attenuations and the polarization parameters that correspond to each other.

In an embodiment, the comparison may be formed between the parameters of the polarization and the attenuations both measured with a same wavelength. In order to form the distribution computing, for at least one of at least two value ranges of the parameters of polarization, a sum of the attenuations may be computed, the attenuations being measured synchronously with the parameters of polarization, the parameters of polarization being within one of the at least two value ranges, and the value ranges being non-overlapping. Each of the sums and each of the value ranges may be associated, one by one to each other, where each of the value ranges are used for computing said sum, for forming the distribution of the sums of the first values as a function of the value ranges.

In an embodiment, an Euclidean distance of the parameters of polarization and the attenuations may be formed; and performing the association by associating, one by one, each of the sums of attenuations and each of the Euclidean distances, each corresponding to said sum, with each other for forming a distribution of the sums of the attenuations as a function of the Euclidean distances.

In an embodiment, forming a consistency of one or more fractions may be formed by integrating the sums over one or more of the value ranges within the fractions.

In an embodiment, a mean gravity center value of the size indices of fines fraction may be formed for defining ash content of the fines fraction.

FIG. 46 illustrates an example of an apparatus for measuring flowing suspension. The apparatus comprises a radiation source 20 that directs wave motion to the flowing suspension in the fractionating tube 10 or in tube after the fractionating tube where the fractions are ready. The wave motion may be electromagnetic radiation or acoustic radiation, for example. The flow of the flowing suspension has caused particles of the flowing suspension to be sorted on the basis of their size.

Although FIG. 46 shows that the wave motion passes through the flowing suspension, it is also possible to receive the wave motion in a direction the deviates from the direction of the transmission or the wave motion.

A measuring arrangement 26 comprises a detector 22. The detector 22 may be a semiconductor detector, for example. In an embodiment, when the wave motion is optical radiation, the detector 22 may comprise at least one photosensor or a spectrometer, for example. In an embodiment, when the wave motion is acoustic radiation, the detector 22 may comprise at least one acoustic transducer, for example. The detector 22 may measure first values of a first parameter of the wave motion at a first wavelength band of the wave motion, and second values of the wave motion interacted with the flowing suspension at a second wavelength band of the wave motion, for example. In this case, the parameter is common to both of the values because it is a question of attenuation of the wave motion, but the values are based on different wavelengths. Alternatively, the second values may be of a second parameter of the wave motion interacted with the flowing suspension, which is different from the first parameter. The parameters may relate to attenuation and polarization, for example. The measurement of the first values and the second values are performed in a synchronized manner or the measured results are synchronized in a data processing unit 24 of the measuring arrangement 26. The synchronization may mean that the values compared with each other are measured at the same moment from the same sample. If the measurements of the compared values are performed at different moments, the synchronization means that same sample is measured at a first moment and, after the sample has travelled a distance, the sample is measured at a second moment. Here the expression at the same moment may also mean that the measurement of the compared values may be performed at different moments but the temporal difference between the measurements is so small that the sample they measure is the same within a tolerance. That is, the sample has moved so little that the effect of the movement to the measurement value(s) is smaller than or equal to noise or a desired measurement tolerance. Alternatively, the detector 22 may travel with respect to the sample the distance between the measurements of the compared values.

Figure 48:
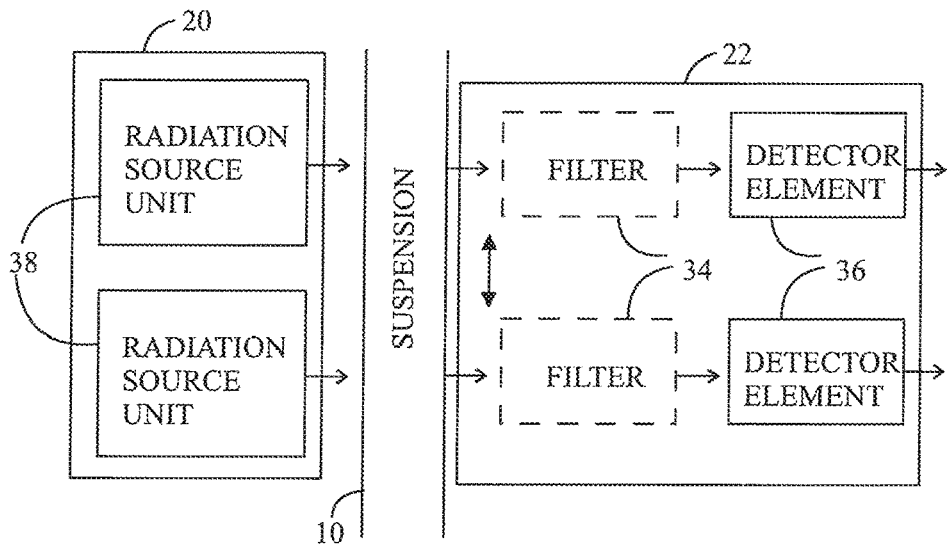
FIG. 48 illustrates an example of a general measurement configuration of the measurement apparatus.

For wavelength based attenuation measurements, the detector 22 may have filters 34 for passing a suitable wavelength band to the detector 22. In an embodiment an example of which is illustrated in FIG. 48, the detector 22 has a detector element 36 for each wavelength band measured. In an embodiment, the detector 22 has one detector element and filters temporarily locate in front of the detector element for measuring the first and second values. That is, the filters may move to and from a detector element.

In an embodiment, the radiation source 20 may transmit two different wavelength bands simultaneously or temporally successively. Then the detector 22 may be used without the above mentioned filters. The radiation source 20 may have one or more radiation source units 38 for outputting the wavy motion in one or more wavelengths.

A person skilled in the art is familiar with measurements of attenuation of wavelength bands, per se. That is why FIG. 48 is a general overview of several possibilities.

For polarization measurement, the detector 22 may have one or more polarization filters in front of the detector 22. For this example, filters 34 in FIG. 48 can be considered the polarization filters. Turning of the polarization or degree of the polarization may be measured with one or more detector elements 36 of the detector 22. At the moment of measurement(s), the suspension may flow or it may be still or in a non-flowing state.

The at least one sensor 28 may measure consistency, temperature and/or flow (speed/rate), for example. The sensor 28 may be a semiconductor sensor. A person skilled in the art is familiar with various sensors 28, per se.

Additionally, there may be a clock for measuring time.

The data processing unit 24 then forms at least one comparison, each comparison being configured to relate to one of the first values and one of the second values. This comparison is based on equations (2)-(6).

The measurements of the first and second values that are compared may be performed at the same moment or at successive moments. Different wavelengths may be detected at the same moment using two or more detector elements or a common detector element may receive different wavelengths successively through different filters, each of the filters being configured to filter the incoming wave motion at successive moments. That is, the filters may change one by one in front of the detector 22 as a function of time. Filters are, however, not necessary if the radiation source 20 outputs different wavelengths as a function of time.

Finally, the data processing unit 24 is configured to form a distribution which has at least one of first values as a function of one of the comparisons as illustrated in FIGS. 13-16 and in their description.

FIG. 47 illustrates an example of the data processing unit 24, which may comprise one or more processors 30 and one or more memories 32 including a suitable computer program code. The one or more memories 32 and the computer program code may, with the one or more processors 30, cause the data processing unit 24 to perform the steps of measurement described in this document.

FIG. 49 illustrates an example of a control arrangement. The process control apparatus 42 may be the data processing unit 24 or a separate controller, which may comprise, like the data processing unit 24, one or more processors and one or more memories including a suitable computer program code. The process control apparatus 42 control the process 40 based on the distribution which has at least one of the first values as a function of one of the comparisons. Examples of the process 40 are found in pulp and paper manufacture, also other processes in the mechanical process industry, such as e.g. the mining and minerals industry, recycling industry, food industry, pharmaceutical industry, and environmental technology industry, for example or the like as mentioned earlier in this document.

Embodiments of the presented measurement method may be implemented as a logic circuit solution or computer program. Correspondingly, the process control may utilize the measured information of the control of the process may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus for measuring a flowing suspension, wherein the apparatus comprises:
a radiation source configured to direct wave motion to the flowing suspension, a flow of the flowing suspension causing particles of the flowing suspension to be sorted on the basis of their sizes, the radiation source comprising an optical radiation source configured to direct optical radiation as said wave motion to the flowing suspension, the optical radiation comprising (i) at least one beam that is polarized or (ii) a plurality of beams at least one of which is polarized and at least one separate beam that is non-polarized; and
a measuring arrangement configured to measure first values of a first parameter of the wave motion interacted with the flowing suspension at a first wavelength band of the wave motion;
wherein the measuring arrangement is configured to measure second values of the at least one of following: a second parameter of the wave motion interacted with the flowing suspension, and the first parameter of the wave motion interacted with the flowing suspension at a second wavelength band of the wave motion, the measurement of the first values and the second values being synchronized with each other;
the measuring arrangement is configured to form at least one comparison, each comparison being one of the first values of the wave motion as compared to one of the second values of the wave motion; and
the measuring arrangement is configured to form a distribution which has at least one of the first values as a function of one of the comparisons.

2. The apparatus of claim 1, wherein the measuring arrangement is configured to measure the first values of the first parameter that depends on a consistency of the flowing suspension; and
the measuring arrangement is configured to form the at least one comparison that depends on physical properties of the particles of the flowing suspension.

3. The apparatus of claim 1, wherein the apparatus comprises a tube flow fractionator in which the flowing suspension is configured to flow.

4. The apparatus of claim 1, wherein the measuring arrangement is configured to measure attenuations of the optical radiation interacted with the flowing suspension;
the measuring arrangement is configured to measure parameters of polarization of the optical radiation interacted with the suspension, the measurements of attenuations and the parameters of polarization being synchronized;
the measuring arrangement is configured to form comparisons of the parameters of polarization and the attenuations, each of the parameters and each of the attenuations of a comparison corresponding to each other on the basis of synchronization; and
the measuring arrangement is configured to distribute the attenuations with respect to the comparisons between the parameters of polarization and the attenuations.

5. The apparatus of claim 4, wherein the measuring arrangement is configured to form the comparisons which are measured with wavelengths having a known relation to each other;
in order to perform the distribution the measuring arrangement is configured to compute, for at least one of at least two value ranges of the parameters of polarization, a sum of the attenuations, which are measured synchronously with the parameters of polarization, the parameters of polarization being within one of the at least two value ranges, the value ranges being non-overlapping; and
the measuring arrangement is configured to associate, one by one, each of the sums and each of the value ranges, each used for computing said sum, with each other for forming the distribution of the sums of the first values as a function of the value ranges.

6. The apparatus of claim 4, wherein the optical source is configured to direct the optical radiation of at least two different wavelengths to the flowing suspension; and the measuring arrangement is configured to form size indices by comparing the attenuations of the different wavelengths passed through a same section of the flowing suspension with each other.

7. A process control apparatus for controlling a process measured using a flowing suspension which is configured to cause particles of the flowing suspension to be sorted on the basis of their sizes, wherein the process control apparatus receives process information from a measurement apparatus for measuring suspension flowing in a tube fractionator, the measurement apparatus comprising:
a radiation source configured to direct wave motion to the flowing suspension, a flow of the flowing suspension causing particles of the flowing suspension to be sorted on the basis of their sizes, the radiation source comprising an optical radiation source configured to direct optical radiation as said wave motion to the flowing suspension, the optical radiation comprising (i) at least one beam that is polarized or (ii) a plurality of beams at least one of which is polarized and at least one separate beam that is non-polarized;
a measuring arrangement configured to measure first values of a first parameter of the wave motion interacted with the flowing suspension at a first wavelength band of the wave motion;
the measuring arrangement configured to measure second values of the at least one of following: a second parameter of the wave motion interacted with the flowing suspension, and the first parameter of the wave motion interacted with the flowing suspension at a second wavelength band of the wave motion, the measurement of the first values and the second values being synchronized with each other;

the measuring arrangement is configured to form at least one comparison, each comparison being one of the first values of the wave motion as compared to one of the second values of the wave motion;

the measuring arrangement is configured to form a distribution, which has at least one of the first values as a function of one of the comparisons, as the process information; and the process control apparatus is configured to control the process on the basis of the process information.

8. A method of measuring a flowing suspension, the method comprising:

directing optical radiation as wave motion to the flowing suspension, the optical radiation comprising (i) at least one beam that is polarized or (ii) a plurality of beams at least one of which is polarized and at least one separate beam that is non-polarized, a flow of the flowing suspension causing particles of the flowing suspension to be sorted on the basis of their sizes;

measuring first values of a first parameter of the wave motion interacted with the flowing suspension at a first wavelength band of the wave motion;

measuring second values of the at least one of following: a second parameter of the wave motion interacted with the flowing suspension, and the first parameter of the wave motion interacted with the flowing suspension at a second wavelength band of the wave motion, the measurement of the first values and the second values being synchronized with each other;

forming at least one comparison, each comparison being one of the first values of the wave motion as compared to one of the second values of the wave motion; and forming a distribution which has at least one of first values as a function of one of the comparisons.

9. The method of claim 8, the method further comprising measuring the first values of the first parameter that depends on a consistency of the flowing suspension; and forming the at least one comparison that depends on physical properties of the particles of the flowing suspension.

10. The method of claim 8, the method further comprising using a tube flow fractionator within which the flowing suspension flows.

11. The method of claim 8, the method further comprising, measuring attenuations of the optical radiation interacted with the flowing suspension;

measuring parameters of polarization of the optical radiation interacted with the suspension; the measurements of attenuations and the parameters of polarization being synchronized;

forming comparisons of the parameters of polarization and the attenuations, each of the parameters and each of the attenuations of a comparison corresponding to each other on the basis of synchronization; and distributing the attenuations with respect to the comparisons between the parameters of polarization and the attenuations.

12. The method of claim 11, the method further comprising forming size indices by comparing the attenuations of the different wavelengths interacted with a same section of the flowing suspension with each other.

13. The method of claim 11, the method further comprising measuring each of the parameters of polarization by measuring a degree of polarization or a degree of depolarization.

14. The method of claim 11, the method further comprising correcting a sum of the size indices by an Euclidian distance of the attenuations and the polarization parameters that correspond to each other.

15. The method of claim 11, the method further comprising forming the comparison between the parameters of the polarization and the attenuations both measured with a same wavelength;

in order to form the distribution computing, for at least one of at least two value ranges of the parameters of polarization, a sum of the attenuations, which are measured synchronously with the parameters of polarization, the parameters of polarization being within one of the at least two value ranges, the value ranges being non-overlapping; and associating, one by one, each of the sums and each of the value ranges, each used for computing said sum, for forming the distribution of the sums of the first values as a function of the value ranges.

16. The method of claim 15, the method further comprising forming an Euclidian distance of the parameters of polarization and the attenuations; and performing the association by associating, one by one, each of the sums of attenuations and each of the Euclidian distances, each corresponding to said sum, with each other for forming a distribution of the sums of the attenuations as a function of the Euclidian distances.

17. The method of claim 15, the method further comprising forming a consistency of one or more fractions by integrating the sums over one or more of the value ranges within the fractions.

18. The method of claim 11, the method further comprising a mean gravity center value of the size indices of fines fraction for defining ash content of the fines fraction.

* * * * *